US010364102B2

(12) United States Patent
McCafferty et al.

(10) Patent No.: US 10,364,102 B2
(45) **Date of Patent: *Jul. 30, 2019**

(54) APPARATUS, SYSTEM AND METHOD FOR MATERIAL HANDLING AND/OR PROCESSING

(71) Applicant: ZME, LLC., Caldwell, ID (US)

(72) Inventors: Matthew Robert McCafferty, Caldwell, ID (US); Zachary Gerald Soles, Nampa, ID (US)

(73) Assignee: ZME, LLC., Caldwell, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/687,955

(22) Filed: Aug. 28, 2017

(65) Prior Publication Data

US 2018/0099814 A1 Apr. 12, 2018

Related U.S. Application Data

(62) Division of application No. 15/388,484, filed on Dec. 22, 2016, now Pat. No. 9,745,137.

(60) Provisional application No. 62/345,202, filed on Jun. 3, 2016, provisional application No. 62/379,448, filed on Aug. 25, 2016, provisional application No. 62/379,471, filed on Aug. 25, 2016, provisional application No. 62/379,546, filed on Aug. 25, 2016.

(51) Int. Cl.
*B65G 19/02* (2006.01)
*B65G 25/10* (2006.01)

(52) U.S. Cl.
CPC ............ *B65G 19/02* (2013.01); *B65G 25/10* (2013.01)

(58) Field of Classification Search
CPC .......... B65G 25/08; B65G 25/10; A21B 1/02; A21B 1/50; A21B 3/13; A21B 3/131; A21B 3/133; A21B 1/24; A21B 1/46; H05B 3/00; H05B 3/0004; H05B 3/0009; H05B 3/03; H05B 3/06
USPC .................... 99/358, 360–362; 219/387, 398
See application file for complete search history.

(56) References Cited

U.S. PATENT DOCUMENTS 2,103,469 A * 12/1937 Kremer ................ H05B 3/0004 34/246
3,310,150 A 3/1967 Southard
4,075,949 A 2/1978 Davis
4,323,152 A 4/1982 Wiknich
4,476,973 A 10/1984 Kessler
4,476,976 A 10/1984 Smith
4,484,676 A 11/1984 Plumridge et al.
(Continued)

FOREIGN PATENT DOCUMENTS

GB 1258257 12/1971

*Primary Examiner* — Mark A Deuble
(74) *Attorney, Agent, or Firm* — AP Patents

(57) ABSTRACT

An indexing or ratcheting conveyor configured to advance a load includes a frame defining the inlet end and the outlet end of the conveyor, a first device with a gravity rocking pushers and a powered member configured to advance the load in a direction from the inlet end to the outlet end of the conveyor. The conveyor can also include a second device configured to move the load, disposed at the outlet end only, in a direction from the outlet end to the inlet end prior to discharge of the load outwardly from the outlet end. The conveyor can be used as a component of an oven configured to cook or bake dough in containers with electrical resistance.

20 Claims, 49 Drawing Sheets

(56) References Cited

U.S. PATENT DOCUMENTS

| | | | | |
|---|---|---|---|---|
| 4,584,466 | A * | 4/1986 | de Mola | A47J 39/006 165/918 |
| 4,592,273 | A * | 6/1986 | Yonezawa | A21B 1/02 426/244 |
| 4,603,770 | A | 8/1986 | Hartness | |
| 5,042,392 | A | 8/1991 | Brethorst | |
| 5,115,907 | A | 5/1992 | Pomara, Jr. | |
| 5,195,630 | A | 3/1993 | Donovan et al. | |
| 5,320,212 | A | 6/1994 | Mcintosh et al. | |
| 5,320,213 | A | 6/1994 | Mcintosh et al. | |
| 5,850,904 | A | 12/1998 | DeBrosse et al. | |
| 6,852,242 | B2 | 2/2005 | Sun et al. | |
| 7,269,935 | B2 | 9/2007 | Jafari | |
| 7,367,445 | B2 | 5/2008 | Mazurek | |
| 9,028,902 | B2 * | 5/2015 | Evseev | A21C 1/02 426/498 |
| 9,103,595 | B2 | 8/2015 | Ciurkot | |
| 9,476,647 | B2 | 10/2016 | Yang et al. | |
| 9,745,137 | B1 | 8/2017 | McCafferty et al. | |
| 2013/0161156 | A1 | 6/2013 | Ono | |

* cited by examiner

APPARATUS, SYSTEM AND METHOD FOR MATERIAL HANDLING AND/OR PROCESSING

CROSS-REFERENCE TO RELATED APPLICATIONS

The present application is a Divisional of a prior non-provisional U.S. patent application Ser. No. 15/388,484 titled "APPARATUS, SYSTEM AND METHOD FOR MATERIAL HANDLING AND/OR PROCESSING" and filed on Dec. 22, 2016 by Applicant ZME LLC. The present application is also related to and claims priority from a provisional U.S. patent application No. 62/345,202, titled "Conveyor" and filed on Jun. 3, 2016 by Applicant ZME LLC; a provisional U.S. patent application No. 62/379,471, titled "ELECTRICAL RESISTANCE COOKING APPARATUS" and filed on Aug. 25, 2016 by Applicant ZME LLC; a provisional U.S. patent application No. 62/379,448, titled "CONVEYOR WITH A LIFTING DEVICE" and filed on Aug. 25, 2016 by Applicant ZME LLC; and a provisional U.S. patent application No. 62/379,546, titled "DOUGH COOKING PRODUCTION LINE" and filed on Aug. 25, 2016 by Applicant ZME LLC. The foregoing references are hereby incorporated herein by reference in their entirety.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND

1. Technical Field

The subject matter relates to conveyors for transporting material. It further relates to indexing conveyors for transporting closely placed loads in a linear direction. It further relates to systems methods utilizing conveyors.

2. Description of Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Generally, indexing conveyors are used for advancing product(s) in material handling applications. Such indexing conveyors can be used as a component of another material handling equipment. Some material handling machines may use a push cylinder with a wide paddle above a table top to advance product(s). Some material handling machines may use a bar that is attached to two parallel chains (the chains are parallel to the conveyor body). Some material handling machines or conveyors may also use gravity drop-out pushers.

Generally, dough can be cooked or baked by electrical resistance. Cooked or baked dough can be used as bread loafs or can be transformed into crumbs by secondary operation(s).

Generally, production line(s) may utilize conveyors for advancing product(s) in material handling and/or processing applications. Generally, production line(s) may utilize robotic devices for placing the product onto conveyor or removing the product therefrom. Generally, production line(s) may utilize devices configured to urge product movement in a selected direction.

BRIEF DESCRIPTION OF THE DRAWINGS

The accompanying drawings are incorporated in and constitute part of the specification and illustrate various embodiments. In the drawings.

DETAILED DESCRIPTION OF EXEMPLARY EMBODIMENTS

Figure 1:
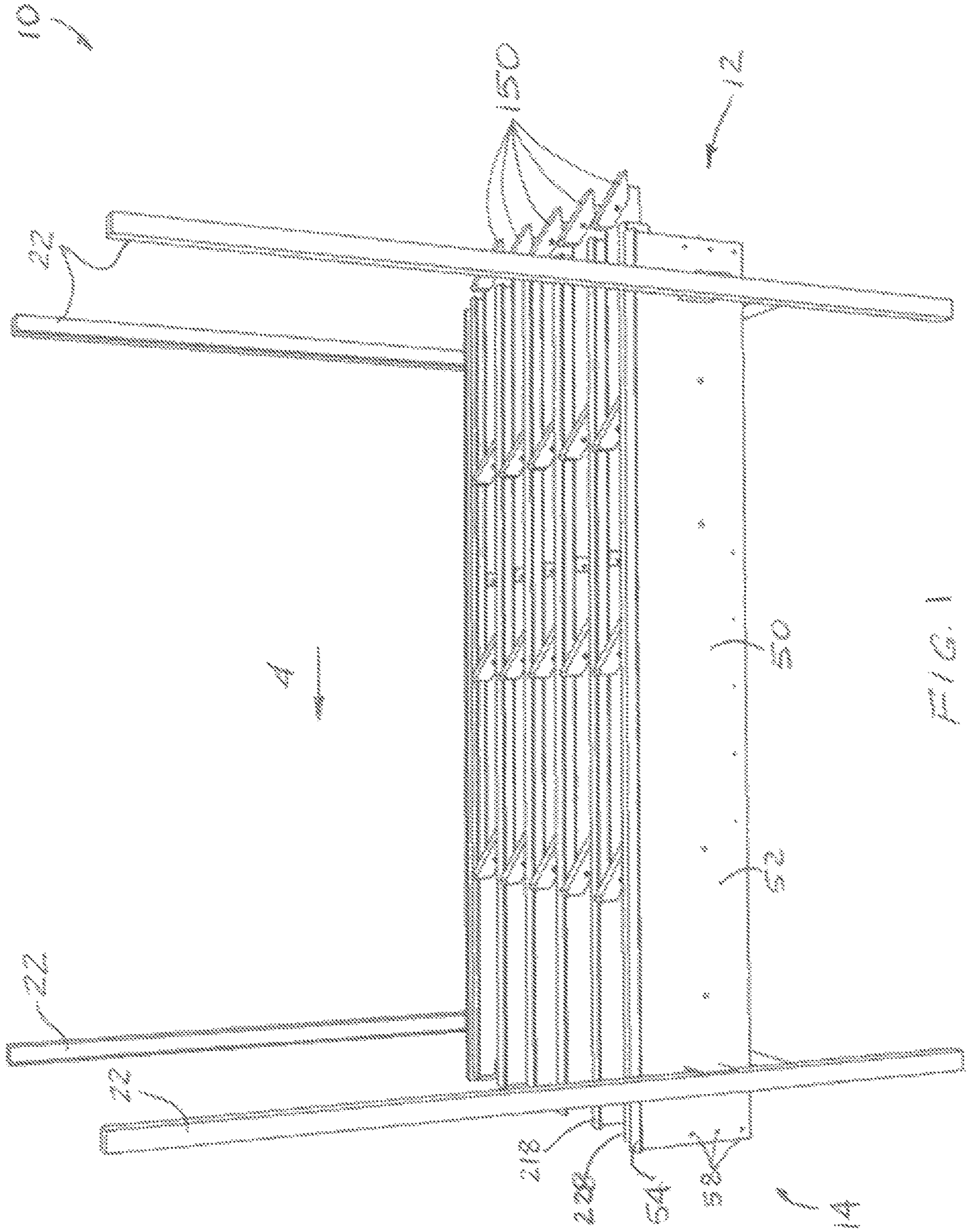
FIG. 1 illustrates a 3-D view of an exemplary conveyor configured to advance multiple rows of loads.

Prior to proceeding to the more detailed description of the present invention, it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As may be used herein, the words "example", "exemplary" or "illustrative" means "serving as an example, instance, or illustration." Any implementation described herein as "example", "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

For purposes of description herein, the directional and/or relationary terms such as "upper", "top", "lower", "bottom", "left", "right", "rear", "back", "front", "apex", "vertical", "horizontal", "lateral", "exterior", "interior" and derivatives thereof are relative to each other and are dependent on the specific orientation of an applicable element or article, and are used accordingly to aid in the description of the various embodiments and are not necessarily intended to be construed as limiting. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The term "or" when used in this specification and the appended claims is not meant to be exclusive; rather the term is inclusive, meaning either or both.

The term "couple" or "coupled", when used in this specification and appended claims, refers to an indirect or direct physical connection between the identified elements, components, or objects. Often the manner of the coupling will be related specifically to the manner in which the two coupled elements interact.

The term "directly coupled" or "coupled directly," when used in this specification and appended claims, refers to a physical connection between identified elements, components, or objects, in which no other element, component, or object resides between those identified as being directly coupled.

The terms "removable", "removably coupled", "removably disposed," "readily removable", "readily detachable", "detachably coupled", "separable," "separably coupled," and similar terms, when used in this specification and appended claims, refer to structures that can be uncoupled, detached, uninstalled, or removed from an adjoining structure with relative ease (i.e., non-destructively, and without a complicated or time-consuming process), and that can also be readily reinstalled, recoupled, or coupled to the previously adjoining structure.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items. As may be used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present disclosure are provided for illustration purpose only and not for the purpose of limiting the present disclosure as defined by the appended claims and their equivalents.

The term "conveyor" when used in this specification and appended claims, refers, without limitations, to an indexing conveyor, a ratchet conveyor, a bi-directional ratchet conveyor, a belt conveyor, or a roller conveyor.

It is to be understood that the singular forms "a," "an," and "the" include plural referents unless the context clearly dictates otherwise. Thus, for example, reference to "a component surface" includes reference to one or more of such surfaces.

The particular embodiments of the present disclosure generally provide conveyors, systems and methods directed to transporting or advancing material(s) or load(s) in a linear direction and/or processing such material(s) or load(s).

In particular embodiments, a conveyor is configured to advance a single row or series of loads.

In particular embodiments, a conveyor is configured to advance a multiple rows or series of loads.

In particular embodiments, a conveyor is disposed within a machine and is configured and/or operable to position load(s) in an alignment with processing components of the machine.

In particular embodiments, a conveyor is configured to transport or advance a plurality of rows of loads with a plurality of loads in each row in a linear transport or conveyance path.

In particular embodiments, a conveyor is configured to transport or advance, along the linear transport or conveyance path, a plurality of loads disposed in a plurality of rows and in a series with each other within each row.

Now referring to the drawings, FIGS. 1-9 illustrate an embodiment of a conveyor, generally designated as 10. The conveyor 10 may be also referred to in this document as an indexing conveyor, a ratchet conveyor, a bi-directional ratchet conveyor, a conveying apparatus, an apparatus or a conveyance apparatus. The conveyor 10 is configured to transport or advance a plurality of rows of loads 2 with a plurality of loads 2 in each row in a linear transport or conveyance path 4. The conveyor 10 is also configured to transport or advance, along the linear transport or conveyance path 4, a plurality of loads disposed in a plurality of rows and in a series with each other within each row. The conveyor 10 defines an inlet end 12 and an outlet end 14. The linear transport or conveyance path 4 is from the inlet end 12 to the outlet end 14. The linear transport or conveyance path 4 can be also referred to as a pathway.

Figure 4:
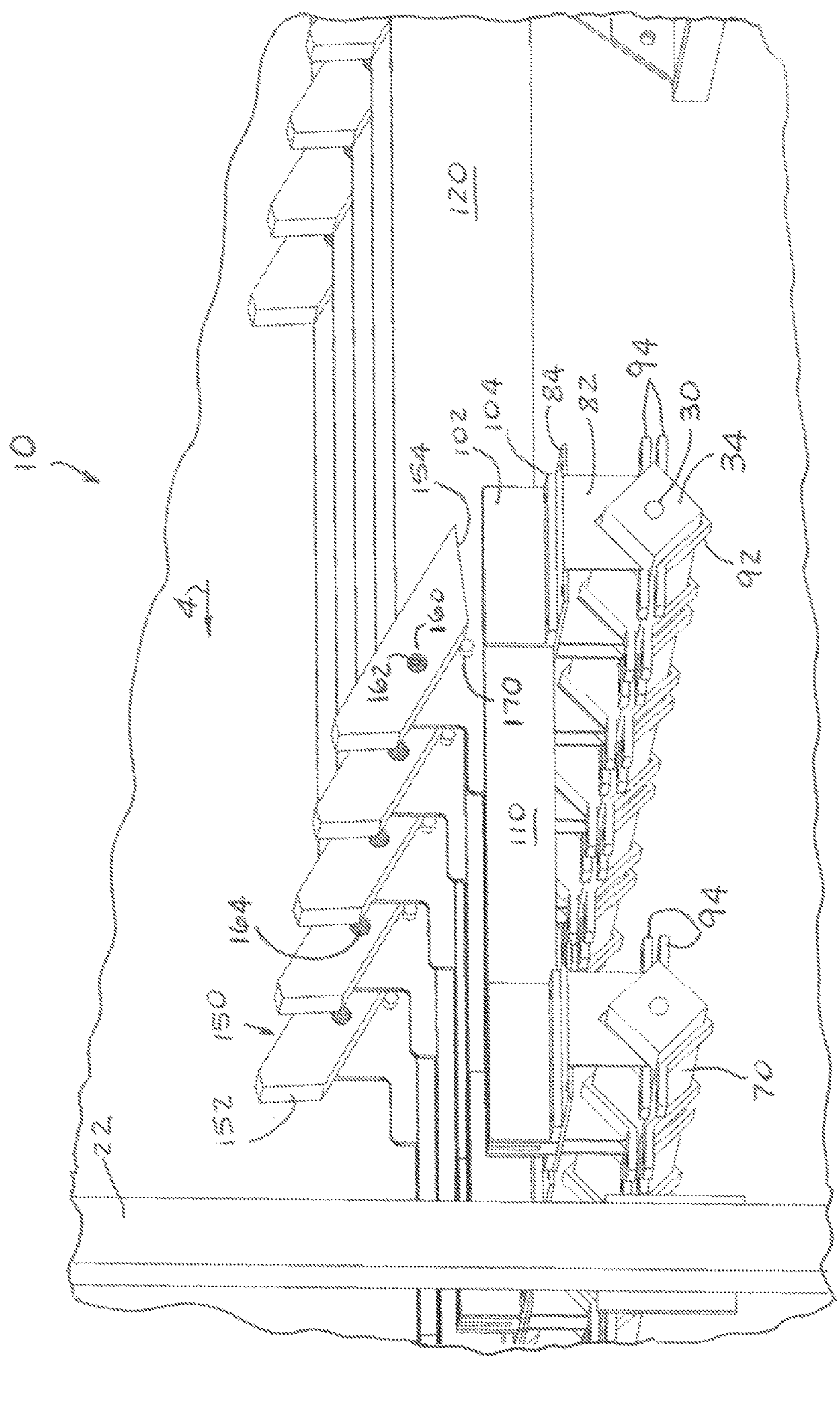
FIG. 4 illustrates a partial 3-D side view of the conveyor of FIG. 1.
Figure 5:
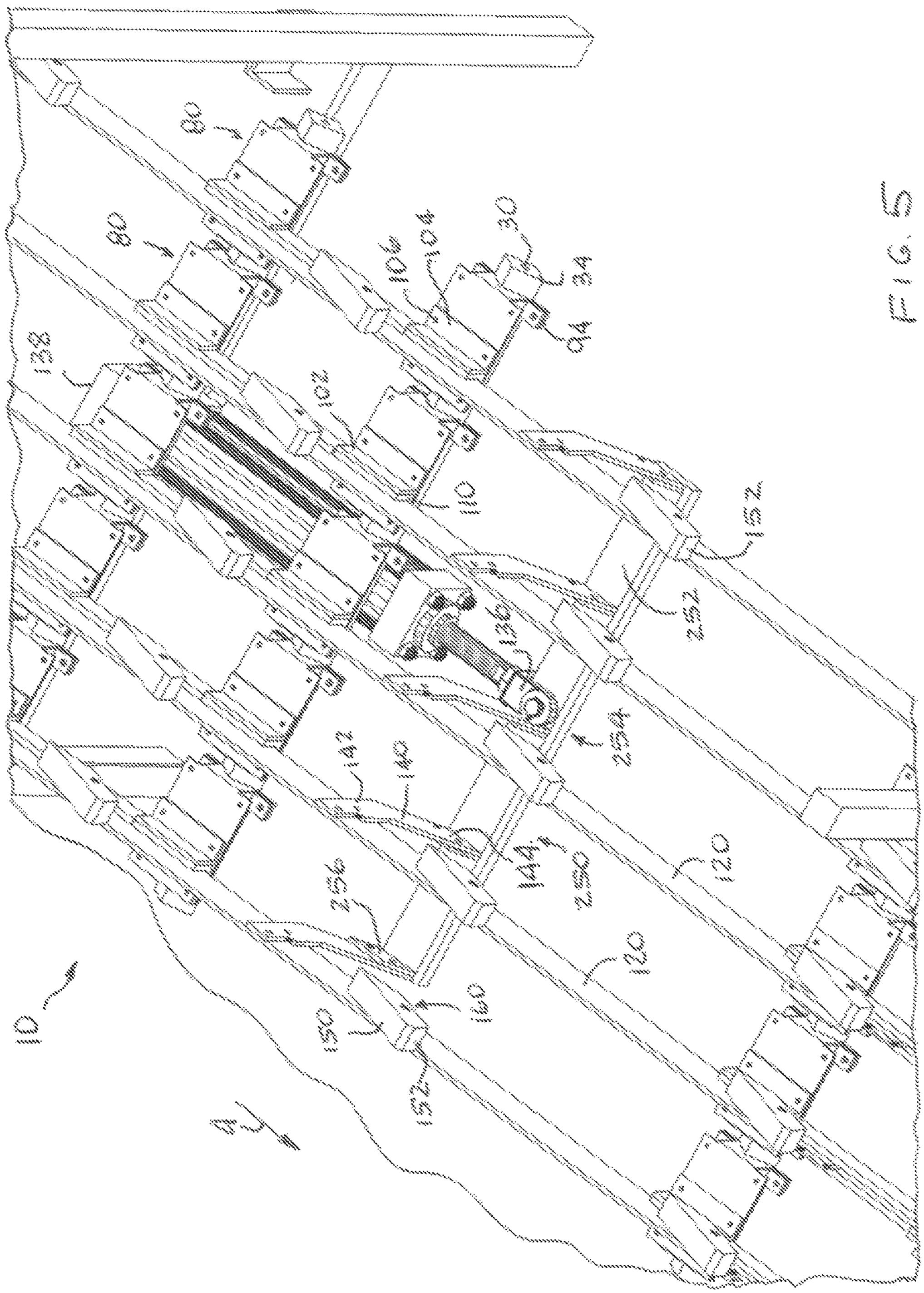
FIG. 5 illustrates one partial 3-D top view of the conveyor of FIG. 1.
Figure 6:
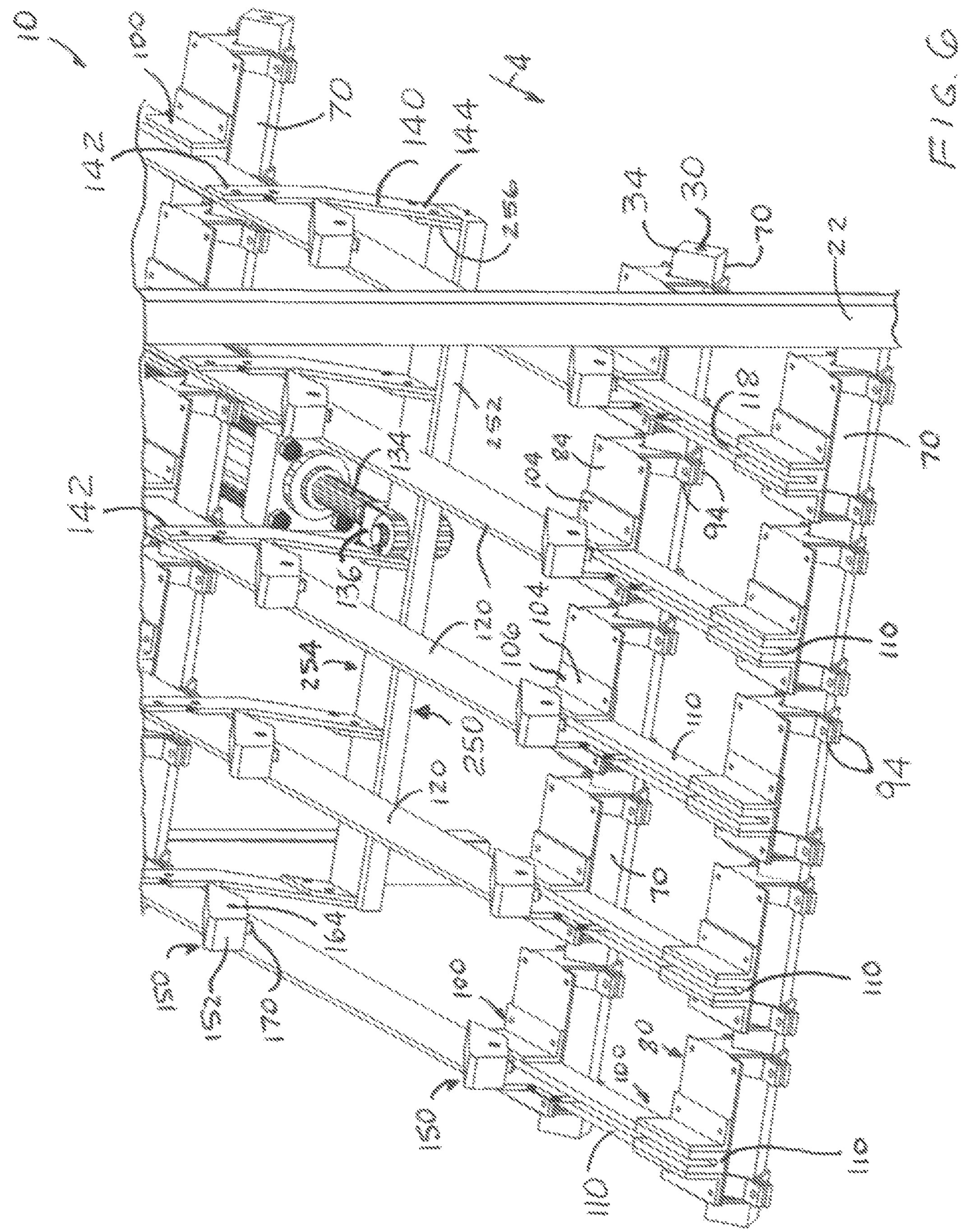
FIG. 6 illustrates one partial 3-D top view of the conveyor of FIG. 1.
Figure 7:
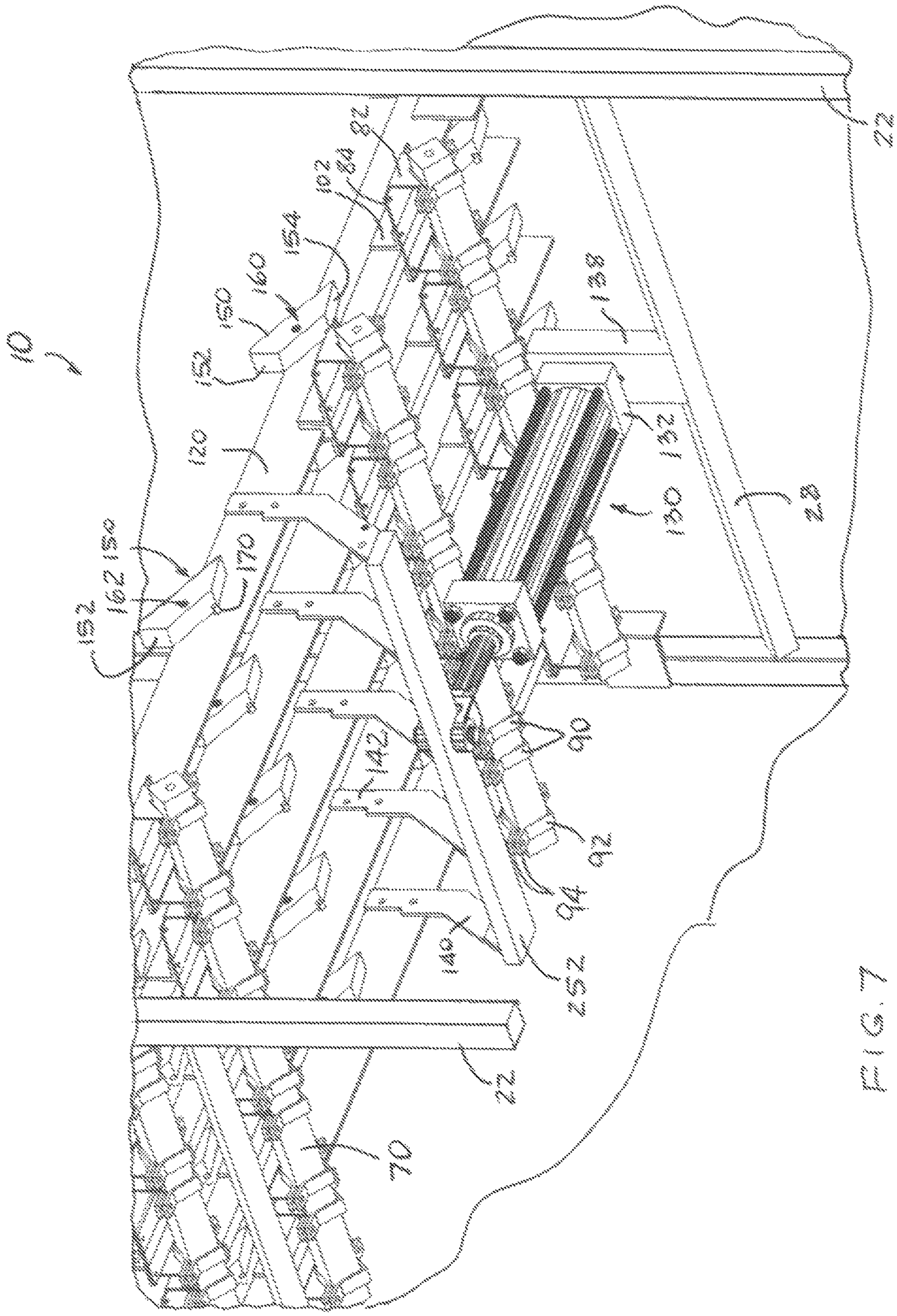
FIG. 7 illustrates a partial 3-D bottom view of the conveyor of FIG. 1.
Figure 8:
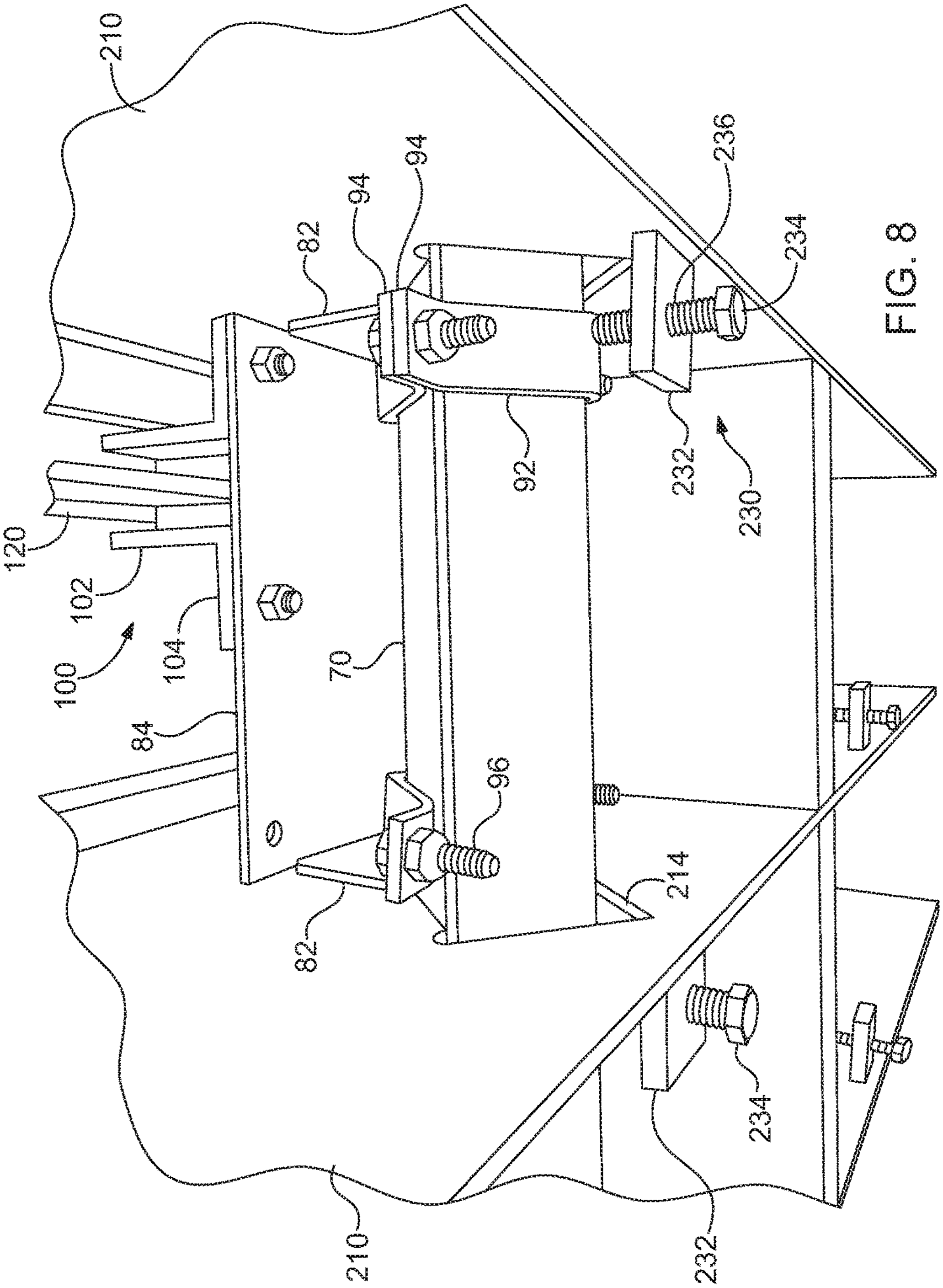
FIG. 8 illustrates a partial 3-D bottom view of the conveyor of FIG. 1.

The conveyor 10 comprises a frame 20 that extends between the inlet end 12 and the outlet end 14 of the conveyor 10. The exemplary frame 20 is illustrated as having a rectangular shape and comprises four end members 22 that are positioned vertically during use of the conveyor 10. A bottom end 24 of one or more of the end members 22 can be adapted with an adjustable member or a foot 26. Such adjustable member or foot 26 can be threadably coupled to the bottom end 24 with a threadable connection. The adjustable member or foot 26 can be provided as any one of pad, a wheel or a caster. Each pair of the end members 22 can be coupled therebetween with an end brace 28, positioned traverse to the linear direction 4, particularly when the conveyor 10 is configured as a free-standing conveyor, i.e., a conveyor that is not secured to a surface or an object. In an example, the brace 28 can be welded, at each end thereof, to an exterior surface of the respective end member 22 or can be detachably attached thereto, with fasteners. In an example, each end of the end brace 28 can be adapted with a threaded aperture 30 and the respective end member 22 can be adapted with an aperture 32 that is aligned with the threaded aperture 30 during assembly. The end brace 28 can be provided as a tubular member. When the end brace 28 can be provided as the tubular member, each end of the end brace 28 can be closed with a plate member 34 carrying such threaded aperture 30, as is best shown in FIGS. 4-5. In an example, the threaded aperture 30 can be replaced with a plain aperture and a nut fastener welded to or caged on a surface of the plate member 34. Furthermore, when the end brace 28 is provided as the tubular member with a square or rectangular periphery, it can be assembled in absence of horizontally disposed surfaces. This aspect is at least advantageous in sanitary applications to at least minimize collection of debris or waste product falling from carried load(s) 2 during transport or processing.

Figure 2:
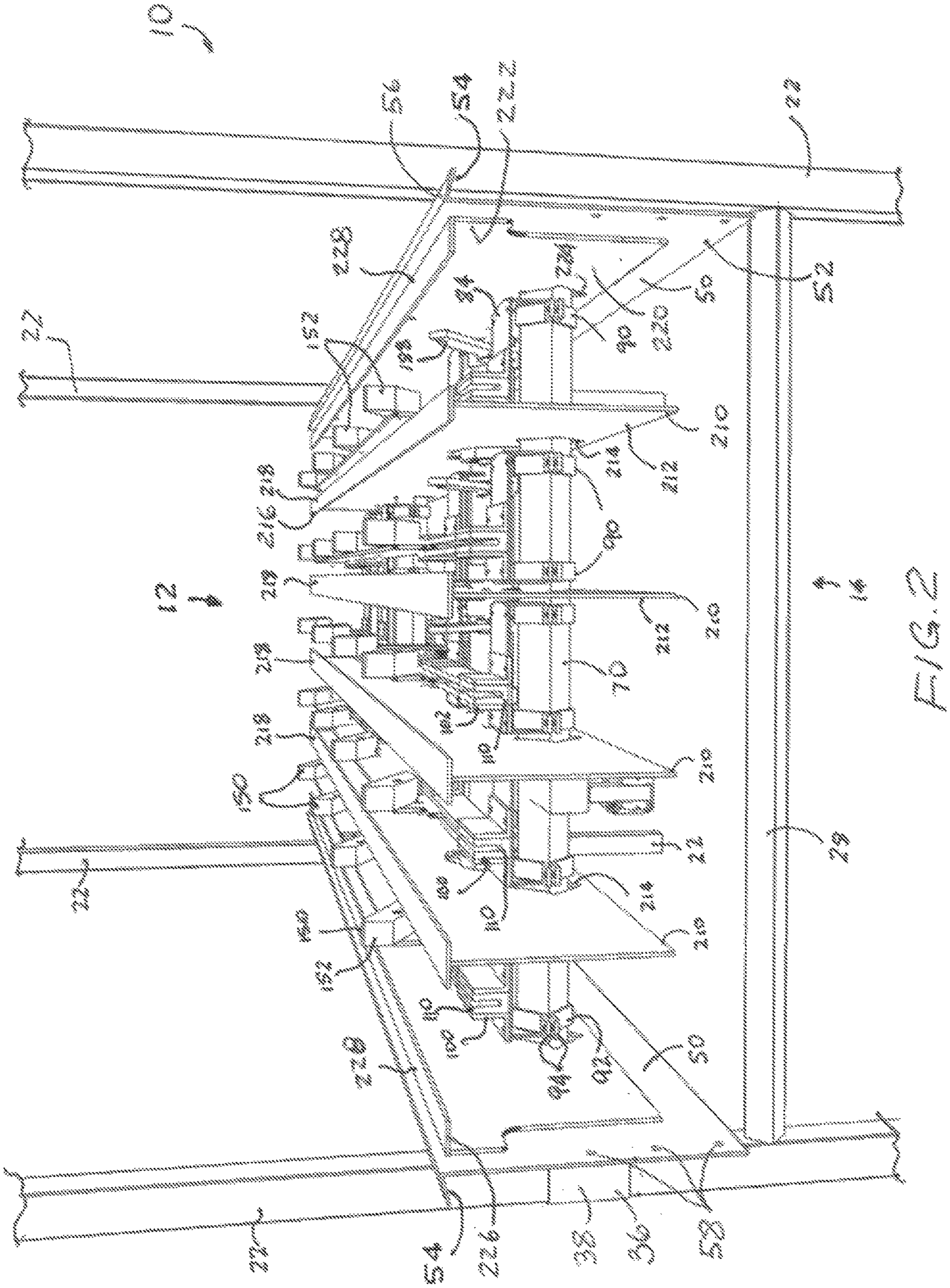
FIG. 2 illustrates a perspective end view of the conveyor of FIG. 1.
Figure 3:
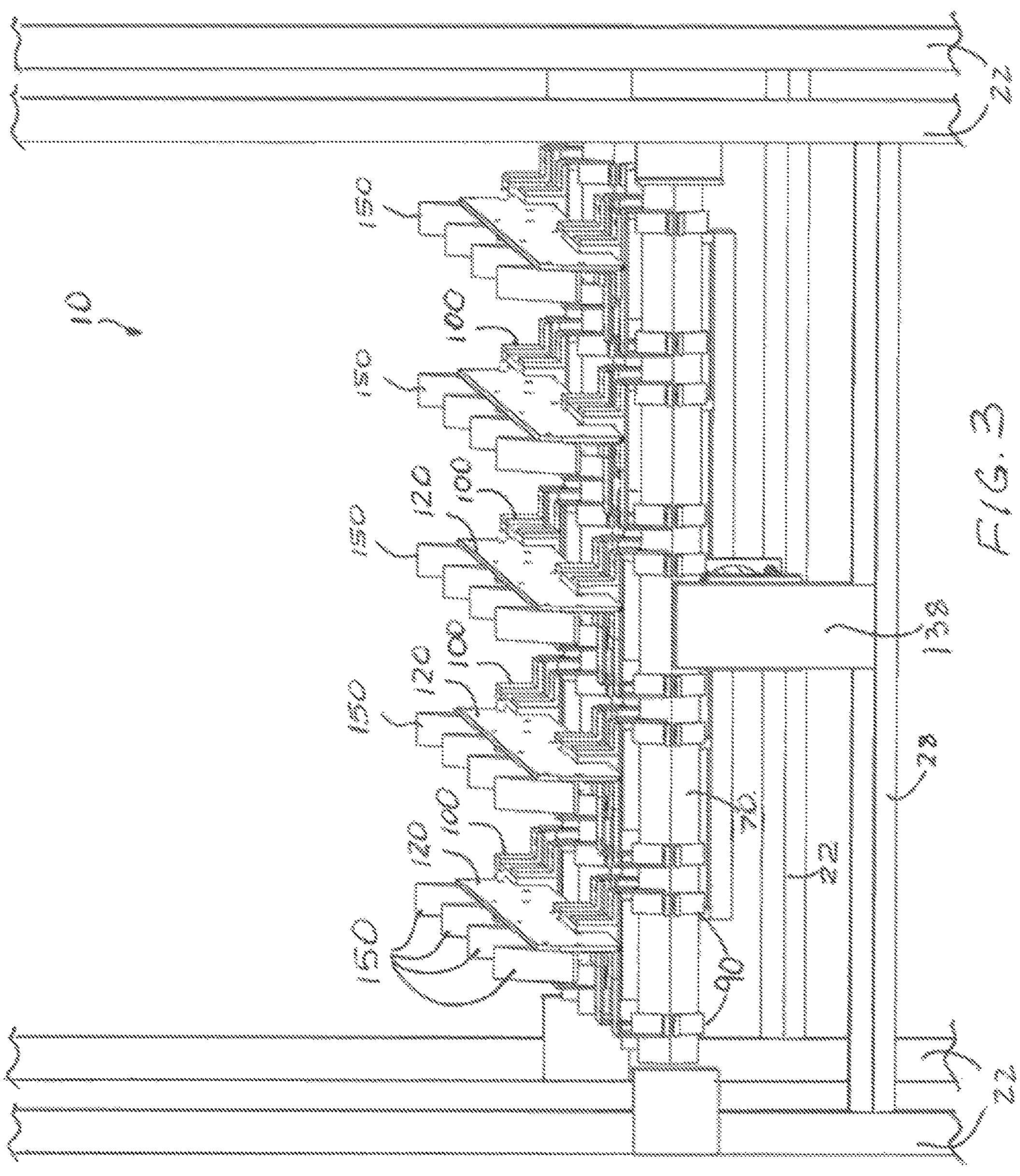
FIG. 3 illustrates a 3-D end view of the conveyor of FIG. 1.

The exemplary frame 20 can also comprise two longitudinal side members 50 that are best shown in FIGS. 1 and 2. Each side member 50 spans the distance between two end members 22 positioned on one side of the conveyor 10. In other words, one end member 22 is positioned on one side of the inlet end 12 and the other end member 22 is positioned on the same side of the outlet end 14. The side member 50 can be welded, at each end thereof to a respective end member 22. The side member 50 can be detachably attached at each end thereof to a respective end member 22. In an example, each end of the side members 50 can be fastened directly to the end member 22, in any of the conventional fastening arrangements. In an example, each end member 22 can be provided with an L-shaped bracket 36 having one leg 38 thereof being welded to the surface of the end member 22 and another leg 40 thereof being configured for detachable attachment to the end of the side member 50. In an example, the side member 50 can be provided as a tubular member. In an example, the side member 50 comprises a first wall 52 and a second wall 54 that is disposed normal to the first wall 52. The second wall 54 is illustrated as being faced outwardly but can also face inwardly during use of the conveyor 10. Such shape of the side member 50 can be achieved by bending side member 50 from a sheet of plate material or providing the resulting L-shape cross-section by an extrusion process. For the reasons to be explained later, each end of the first wall 52 can extend outwardly past the peripheral boundary of the frame 20 and comprises aperture(s) 58 disposed adjacent and spaced from such each end. It is not necessary for the end members 22 to extend, in a vertical direction, past the second wall 54.

It is also contemplated herewithin that the sides 50 can be coupled or directly coupled to other members or structures.

The conveyor 10 comprises braces 70 that are coupled stationary, at each end thereof, to the frame 20 and, more particularly to the first wall 52 of each load carrying member 40. Braces 70 are further disposed in series and in a spaced apart relationship with each other between the inlet end 12 and the outlet end 14 of the conveyor 10, with each brace 70 being disposed transverse to the pair of load supporting members 50. Braces 70 can be either welded, at each end thereof, to a respective first wall 52 or being detachably attached, at each end thereof, to the respective first wall 52. One or more of the braces 70 can be provided as a tubular member. When one or more of the braces 70 being provided as the tubular member, it can be detachably attached to the first walls 52 in a manner described above in detachably attaching tubular end braces 28. Furthermore, when the brace 70 is provided as the tubular member with a square or rectangular periphery, it can be assembled in absence of horizontally disposed surfaces. In other words, each surface of such tubular member is inclined to a horizontal or vertical plane. The braces 70 can be spaced at equal or unequal distances from each other.

The conveyor 10 comprises stationary support brackets 80, with each support bracket 80 being permanently or detachably coupled to a respective brace 70. The bracket 80 can be configured as a U-shaped bracket. Each U-shaped bracket 80 comprises a pair of flanges 82 coupled to the respective brace 70 and further comprises a main portion 84 disposed substantially horizontally during use of the conveyor 10. Each flange 82 can be permanently coupled to the respective brace 70, for example by a welding process. Each flange 82 can be detachably coupled to the respective brace 70, for example by using clamps 90, as is best shown in FIGS. 4-9. When clamps 90 are provided, they can be configured as a pair of hat-shaped clamp members having a main portion 92 and a pair of flanges 94, each with an aperture 96 formed through a thickness of the flange 94. One of the pair of hat-shaped clamp members 90 can be rigidly coupled, for example such as by welding, to each flange 82 of the support bracket 80. Thus, in an example, two (or a pair of) clamps 90 are provided for each support bracket 80 with the clamps 90 essentially caging the exterior surface of the brace 70 and being coupled to each other with fasteners 96.

The conveyor 10 comprises an indexing device. The indexing device comprises receptacles 100, carrying members 120, coupling member 140 and force exerting members 150. The indexing device can also comprise a powered member 130. Such powered member 130 can be provided as a component of the conveyor 10 and thus be an optional component of the indexing device. Each receptacle 100 is coupled stationary to a respective U-shaped support bracket 80. Thus, in an embodiment of the conveyor 10, the receptacles 100 are disposed in series with each other between the inlet end 12 and the outlet end 14 of the conveyor 10 and further in series with each other across the width of the conveyor 10. In an embodiment, each receptacle 100 defines a pair of vertically disposed walls 102 upstanding on the main portion 84 of a respective bracket 80. In an example, vertically disposed walls 102 can be welded to the main portion 84. In an example, vertically disposed walls 102 can be detachably coupled to the main portion 84 by way of the flanges 104 with apertures 106 formed through a thickness of the flange 104 that are aligned at assembly with apertures in the main portion 84. It would be understood that each wall 102 in a combination with the flange 104 can be provided as an L-shaped member, being either formed, molded, casted or extruded. The receptacle 100 can comprise a metal, a plastic or a combination thereof. The receptacle 100 can comprise a material with a low friction coefficient, for example such as a self-lubricating bronze alloy.

The indexing device can comprise optional liners 110. Each liner 110, when provided, comprises a material with a low friction coefficient. In example, such material can be an engineered plastic. The engineered plastic can be a thermoplastic polyethylene and, more specifically, an ultra-high-molecular-weight (UHMW) polyethylene. In an example, the engineered plastic can be an equivalent to the thermoplastic polyethylene. In an example, such material can comprise self-lubricating bronze alloy. When the receptacle 100 defines a pair of vertically disposed walls 102, the optional liners 110 can be coupled to the inner surfaces of the vertically disposed walls 102 or can be provide as a U-shaped member being caged between the vertically disposed walls 102 and resting on the main portion 84. The liner 110, when provided, can be fastened to a respective receptacle 100, can be secured thereto with adhesives or can be provided integral with the receptacle 100, for example during a molding process.

The optional liner 110 can be sized to span a length of the receptacle 100 or even be sized to span a distance between furthest ends of a pair of adjacent receptacles 100.

The receptacle 100 or the optional liner 110 defines an inner space 118.

Each carrying member 120 is positioned for a reciprocal linear movement within the inner space 118. Each carrying member 120 is illustrated as a thin bar or a rail with a pair of flat surfaces, but can be provided in other shapes, for example such as a tubular shape. The carrying member may comprise metal, plastic and a combination thereof. When the carrying member 120 comprises metal, the liner 110 is configured to wear during linear movement of the carrying member 120 within the receptacle 100. When the carrying member 120 comprises metal and receptacle 100 comprises plastic at least on the inner surface of the wall 102, the liner 110 may not be needed. Likewise, when the carrying member 120 comprises, either partially or completely, plastic and receptacle 100 comprises metal, the liner 100 may not be needed.

The powered member 130 is configured to provide a reciprocal linear movement of the carrying members 120. In an example, the powered member 130 can be a linear actuator. The linear actuator can be provided as an electrically, pneumatically or hydraulically operated device. The powered member 130 can be a cylinder, either pneumatic or hydraulic. The cylinder 130 has a stationary portion 132 rigidly coupled at on end thereof to the frame 20. In an example, the stationary portion can be rigidly coupled to a mounting member 138 that is rigidly coupled to one of the ends of the frame 20, shown as the inlet end 12 of the conveyor 10. The cylinder 130 also has a movable portion 134 that moves in a linear direction. The distal end of the movable portion 134 can be configured as a U-shaped member 136.

Each coupling member 140 comprises one end 142 thereof coupled, for example with fasteners or by welding, to a respective carrying member 120 and comprises a second end 144 coupled to the powered member 130 and, more particularly to the U-shaped member 136. The second end 144 of each coupling member 140 is attached or coupled, either permanently or detachably, to a link 252. When the coupling member 140 is permanently coupled, the second end 144 can be welded to the link 252. When the coupling member 140 is detachably coupled, it can be coupled, with fasteners, to a flange 256 on the link 252. The flanges 256 are disposed, in a spaced apart relationship with each other, on the link 252. The second end 144 can be also adapted with a flange for a detachable coupling to a surface of the link 252, for example with fasteners. The coupling members 140 and the link 252 can define or comprise a linkage 250. The link 252 is disposed transverse to the load supporting members 210 (described further in this document) and has a pivotal connection 254 with an opposite end 134 of the powered member 130.

It will be understood that the linkage 250 is configured to move multiple carrying members 120 with a single powered member 130. In other words, the linkage 250 is configured to advance multiple rows of loads 2 with a single powered member 130.

It is also contemplated that each carrying member 120 can be adapted with a dedicated powered member 130. In this embodiment, the link 252 is not needed and the second end 144 of the coupling member 140 is configured for a pivotal attachment to the powered member 130.

The force exerting members 150 in the embodiment of the conveyor 10 of FIGS. 1-9 are disposed in series with each other between the inlet end 12 and the outlet end 14 of the conveyor 10. The spacing between a pair of adjacent force exerting members 150 is dependent on the size of the load 2 so that a single force transmitting member 150 is provided for a single load 2. Each force exerting member 150 comprises a front end 152 and a rear end 154. The front end 152 is configured to abut the load 2. In an example, the rear end 154 is being configured heavier than the front end 152. In an example, the front end 152 can be lightened with apertures (not shown). In an example, the front end 152 can be configured smaller than the rear end 154. In an example, the rear end 154 can be adapted with additional weight.

There is a pivotal connection 160 between each force exerting member 150 and the carrying member 120. In an example, each of the carrying member 120 and the force exerting member 150 can be provided with through apertures 162 with the pivotal connection being achieved by way of a pin 164 passed through each aperture 162 and terminated at each end to prevent unintended disengagement from such aperture 162. In an example, the pin can be provided as an integral part of one of the carrying member 120 or the force exerting member 150, with the other one of the carrying member 120 or the force exerting member 150 comprising an aperture.

Each force exerting member 150 is pivotable between a load engaging position and a non-load engaging position on the carrying member 120 and movable with the carrying member 120 in the reciprocal linear movement, enabled by the powered member 130.

Thus, the force exerting member 150 can be also referred and/or configured as a gravity rocking advancement pusher or a gravity rocking dog.

There are stops 170. Each stop 170 is rigidly coupled to the carrying member 120 and is positioned to maintain the front end 152 of a respective force exerting member 150 in the load engaging position.

The conveyor 10 can comprise inner load supporting member(s) 210 and two outer load supporting members 220, extending between the inlet end 12 and the outlet end 14 of the conveyor 10. Each inner load supporting member 210 is positioned in a spaced apart relationship with the outer load supporting members 220 and with each other when more than one inner load supporting member 210 is provided. Each inner load supporting member 210 comprises a first wall 212 with apertures 214 formed through a thickness thereof and a second wall 216 with a load supporting surface 218 which is sized to receive portions of loads 2 in adjacent rows. The first wall 212 is being disposed generally vertically during operation of the conveyor 10. The load supporting surface 218 is being disposed generally horizontally during operation of the conveyor 10. The load supporting surface 218 can comprise a smooth surface. Each outer load supporting member 220 is positioned adjacent a respective side member 50, when provided or at each side of the conveyor 10. Each outer load supporting member 220 comprises a first wall 222, disposed generally vertically during operation of the conveyor 10 and a second wall 226 disposed generally horizontally during operation of the conveyor 10. The first wall 222 comprises apertures 224 formed through a thickness thereof, in a spaced-apart relationship with each other along a length of the first wall 222. The second wall 226 defines a load carrying surface 228. The load supporting surface 228 can comprise a smooth surface.

It is also contemplated herewithin that outer load supporting members 220 can be provided by or integrated with the side members 50 of the frame 20.

During assembly, each brace 70 is passed through respectively aligned apertures 214 and 224.

In an embodiment, each brace 70 can be rigidly coupled to each first wall 212 of the inner load supporting member 210 and first wall 222 of the outer carrying member 220. Such rigid coupling can be achieved by welding when the conveyor 10 is essentially fabricated from metallic material, for example such as steel or aluminum.

In an embodiment, each brace 70 can be detachably coupled to each first wall 212 of the inner load supporting member 210 and first wall 222 of the outer carrying member 220. In this embodiment, each brace 70 is configured to pass freely through the apertures 214 and 224. When the brace 70 is configured to pass freely through the apertures 214 and 224, the conveyor 10 further comprises biasing members 230, best shown in FIG. 8. Each biasing member 230 comprises a first portion 232 stationary attached to a surface of the first wall 212 of each inner load supporting member 210 and to a surface of the first wall 222 of each outer load supporting member 220, in an alignment with a respective clamp 90 and comprising a second portion 234 movable in a relationship to the first portion 232 and having one end thereof positioned in an abutting relationship with the respective clamp 90 so as to bias each brace 70 with an upper edge of each aperture 214, 224 during use of the conveyor 10. By way of one example only, the first portion 232 can be adapted with a threaded aperture 236 with the second portion 234 being configured as a threaded bolt or a threaded rod. It would be understood that the position of the biasing members 230 can be reversed to bias the brace 70 downwardly.

Figure 9:
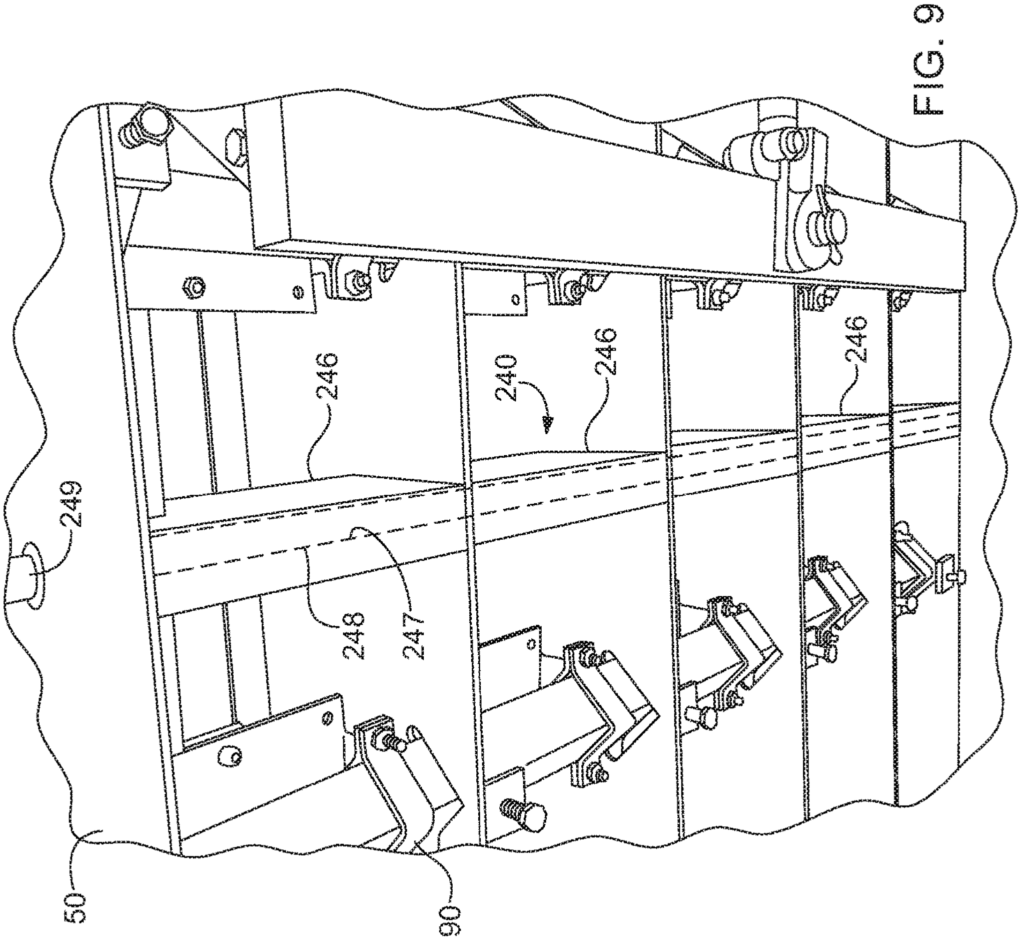
FIG. 9 illustrates another partial 3-D bottom view of the conveyor of FIG. 1.
Figure 10:
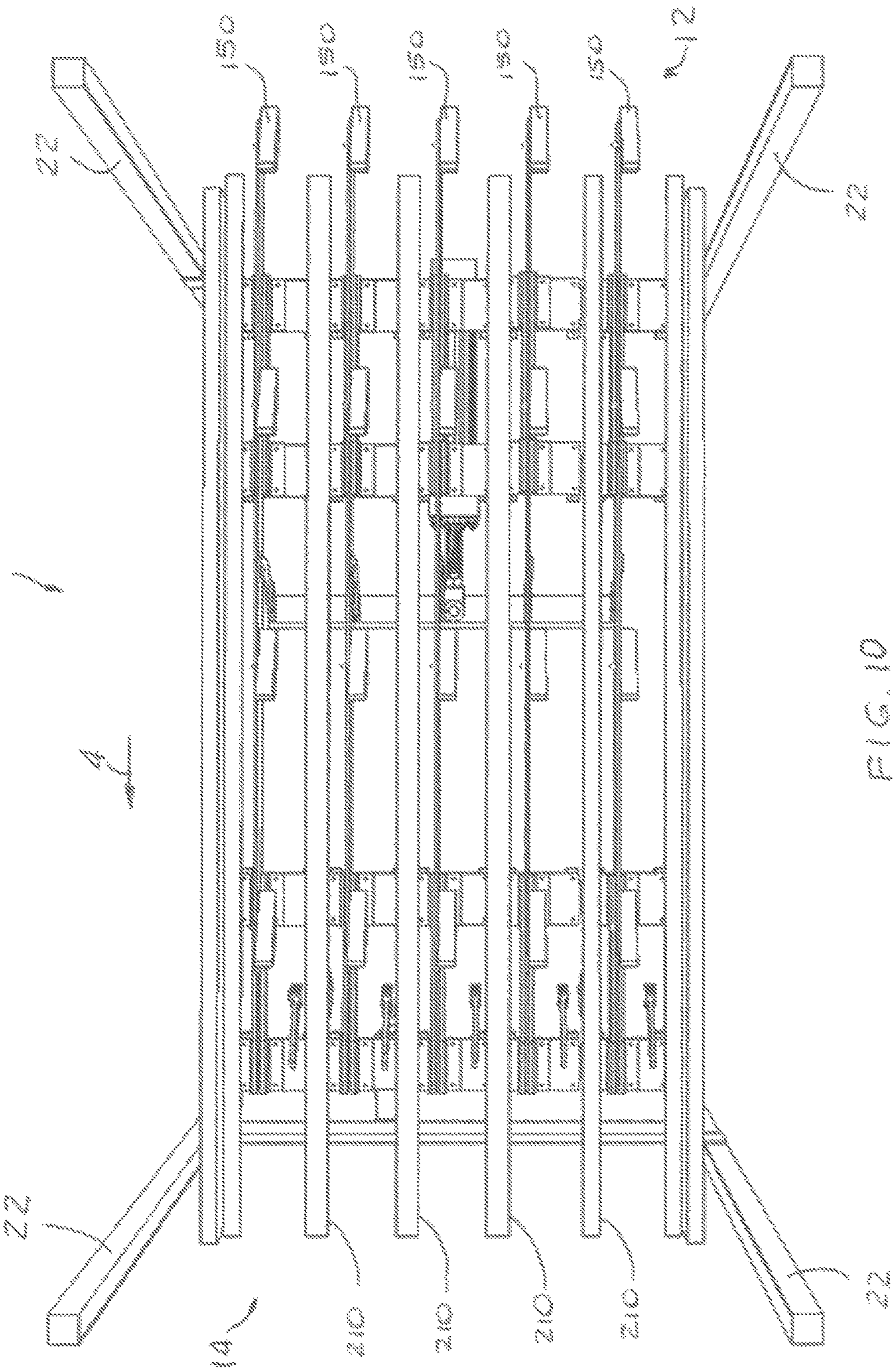
FIG. 10 illustrates a perspective top view of an exemplary conveyor configured to advance multiple rows of loads, particularly showing a kick-back device.
Figure 11:
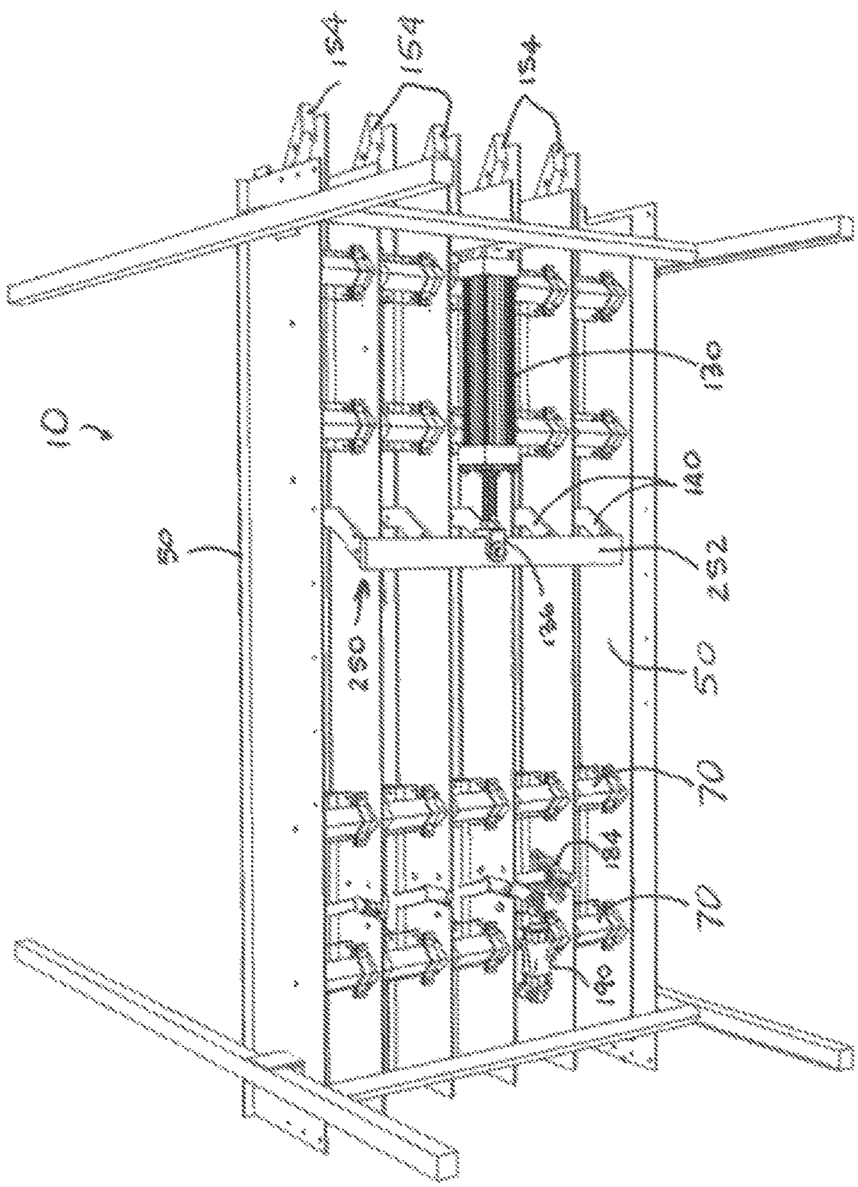
FIG. 11 illustrates a perspective bottom view of the conveyor of FIG. 10.
Figure 12:
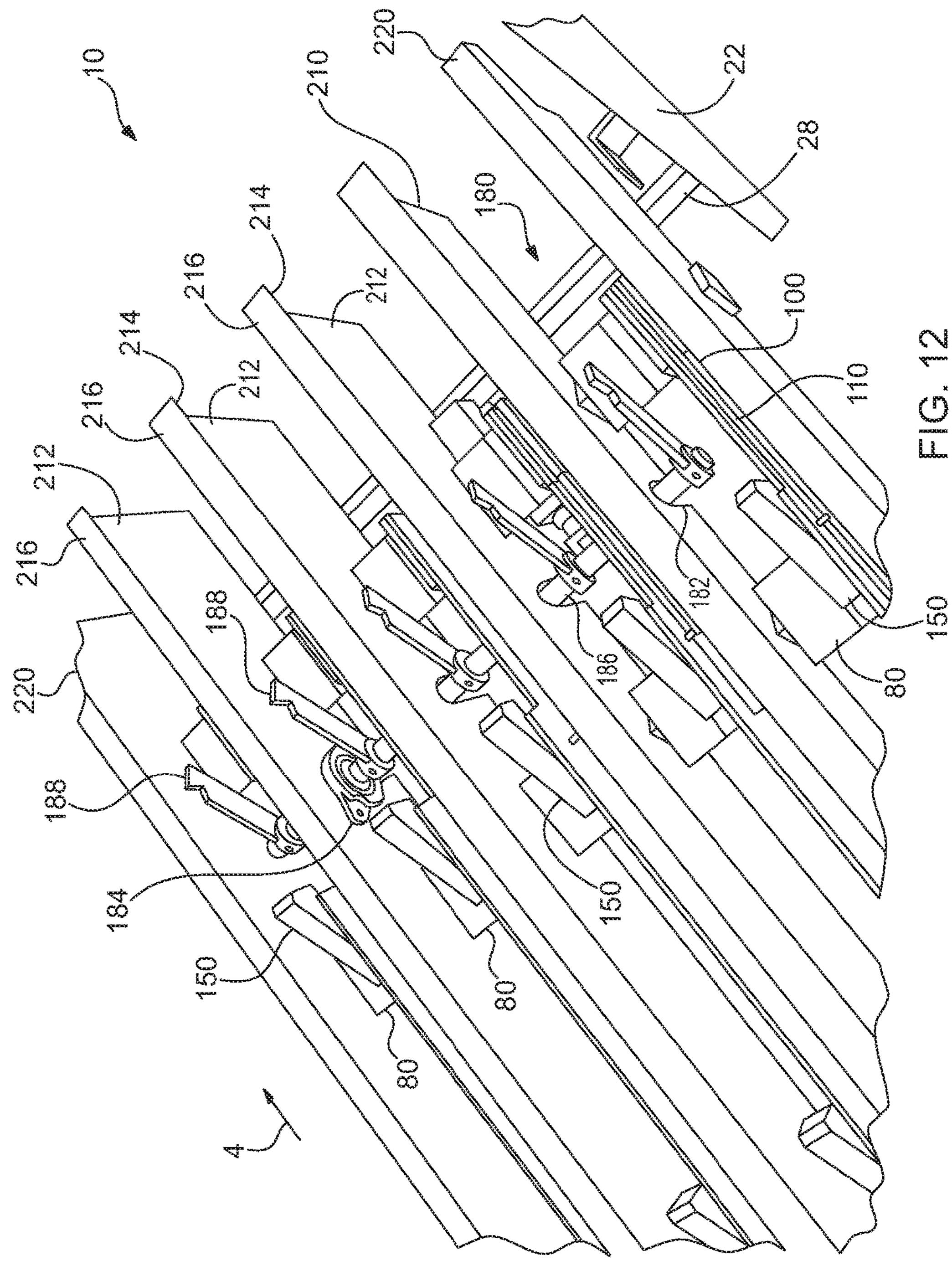
FIG. 12 illustrates a partial 3-D top view of the conveyor of FIG. 10.
Figure 13:
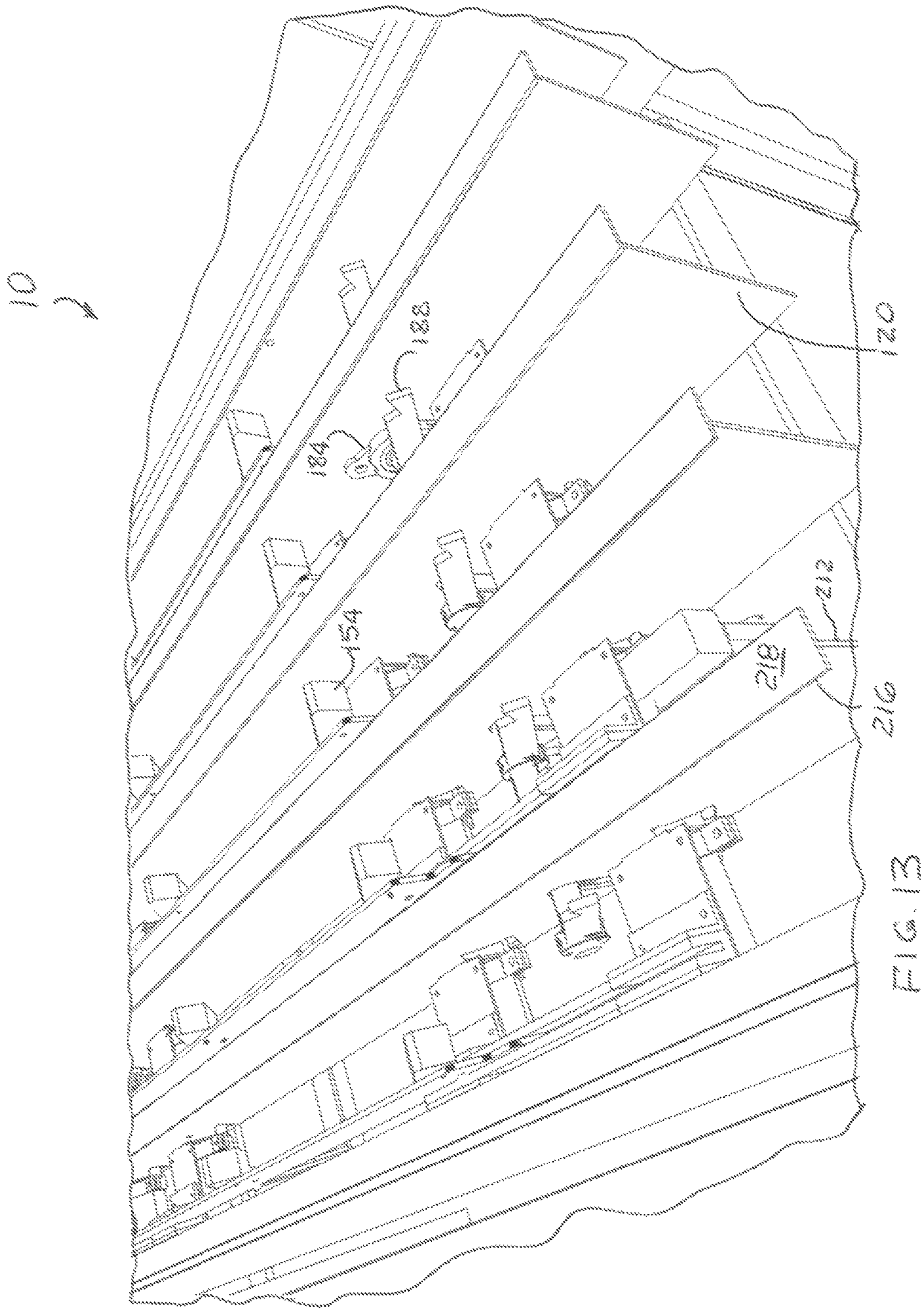
FIG. 13 illustrates a partial 3-D top view of the conveyor of FIG. 10.
Figure 14:
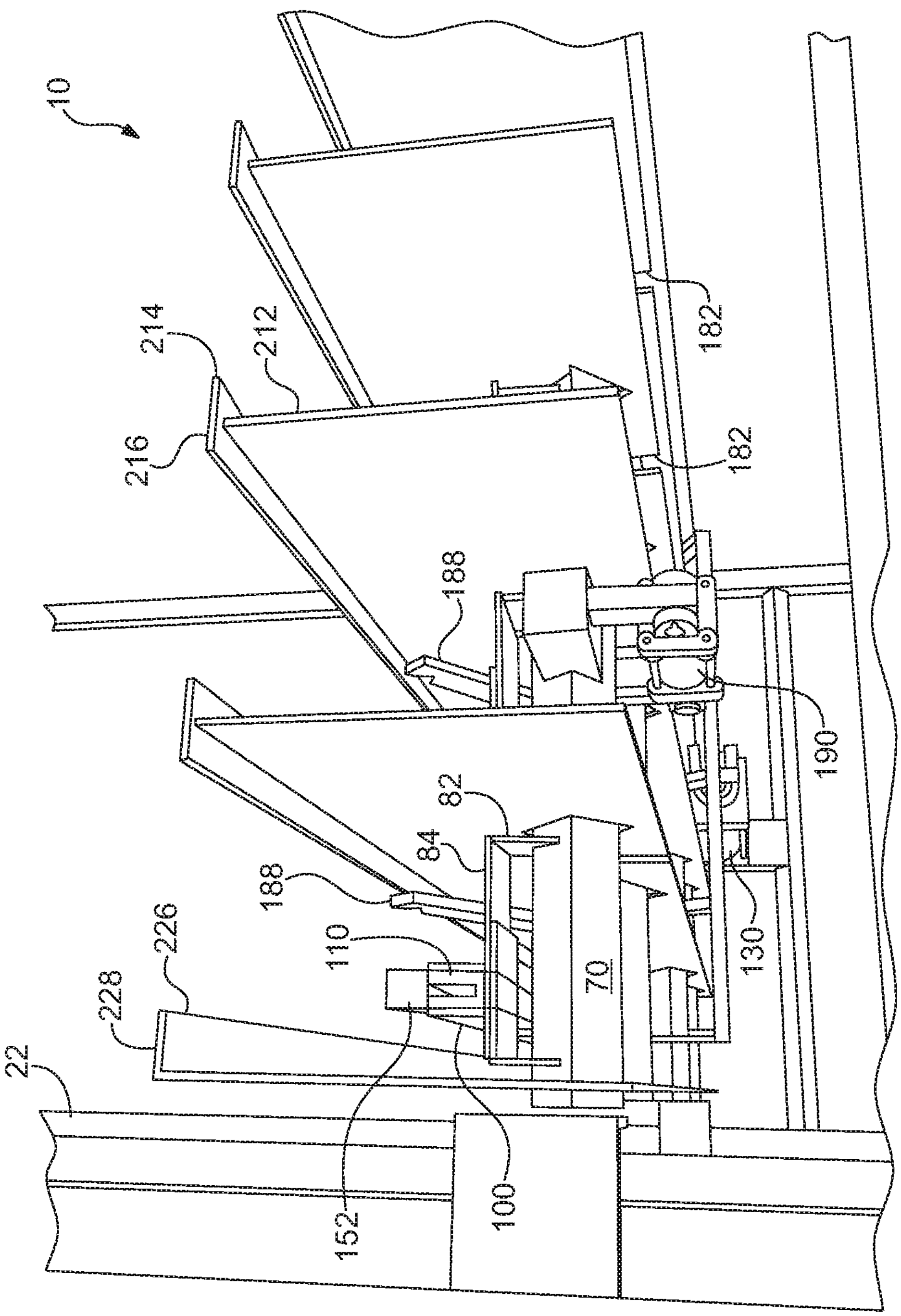
FIG. 14 illustrates a partial 3-D end view of the conveyor of FIG. 10.
Figure 15:
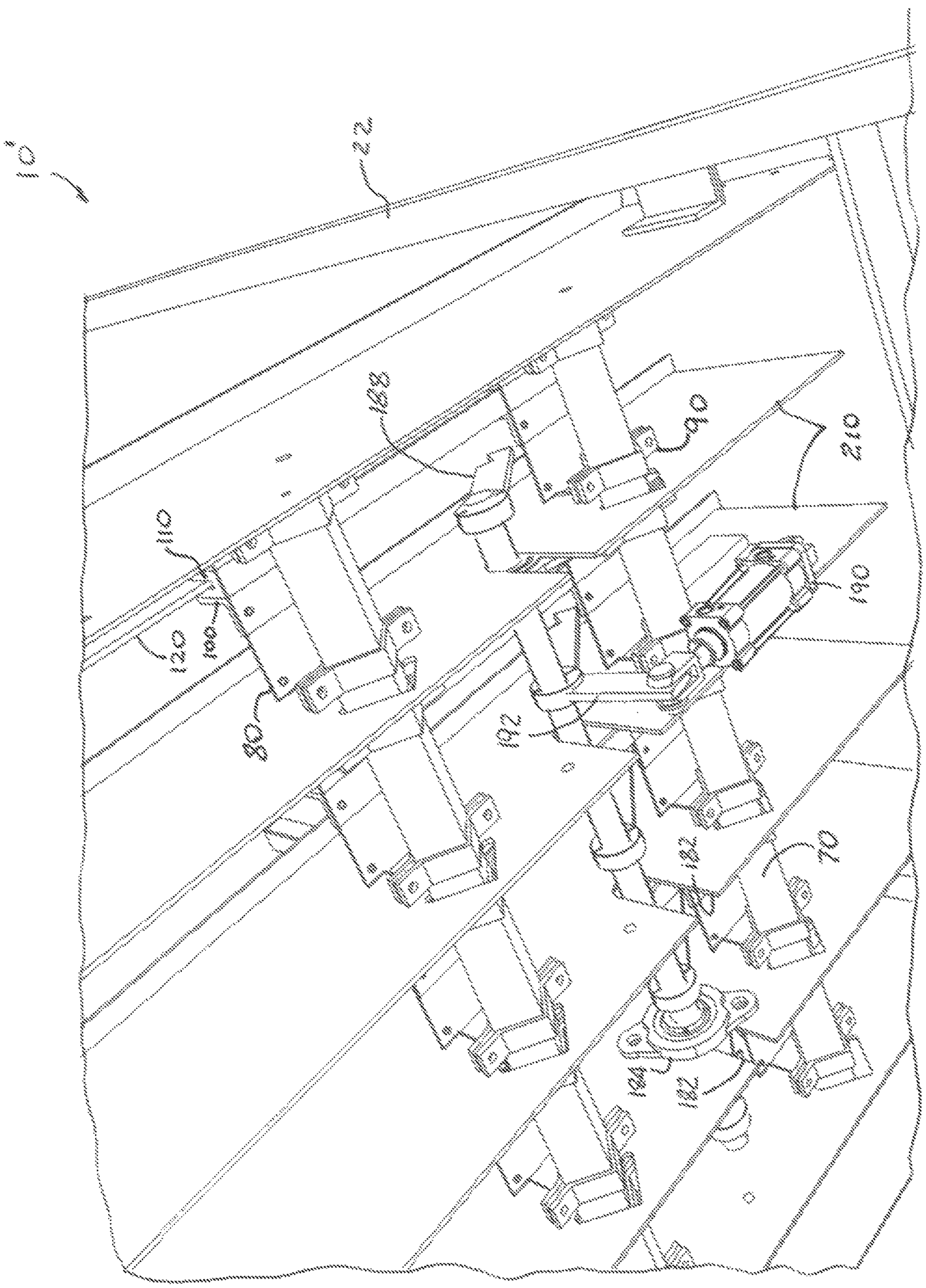
FIG. 15 illustrates one partial 3-D bottom view of the conveyor of FIG. 10.

Conveyor 10 can comprise one or more optional braces 240, best shown in FIG. 9 coupled, stationary and detachably, at each end thereof, to each side member 50 of the frame 20. Each optional brace 240 is stationary disposed mediate the inlet end 12 and the outlet end 14 in a direction transverse to a direction therebetween. Each optional brace 240 comprises brace apertures in the first wall 212 of each inner load supporting member 210, brace apertures in the first walls 22 of each outer load supporting member 220, brace apertures in the side members 50 of the frame 20, all respective apertures are being aligned with each other during assembly, spacers 246 disposed between surfaces of the first walls 212 of adjacent inner load supporting members 210 and outer load supporting members 220 and having each end in an abutting relationship therewith, brace apertures 247, through the spacers 246, being oriented in the direction transverse to the direction between the inlet and outlet ends and in an alignment with the brace apertures in first walls 212 and 222, and an elongated 248 member passed through the aligned brace apertures and having each end thereof secured to a respective side member 50 of the frame. In an example, each end of the rod 248 can be threaded to receive threaded nut fastener 249.

In operation, the front end 152 has at least a portion thereof extending outwardly or upwardly, in the load engaging position, from load supporting surfaces 218 and 228 and in an abutting relationship with a portion of the load 2 during operation of the conveyor 10. Such portion can be a rear surface of the load 2 or a void in a bottom surface thereof. The abutting relationship of each force transmitting member 150 causes an incremental advancement of the loads 2 between the inlet end 12 and the outlet end 14 during the linear movement of the carrying members 120 in a first or load moving direction. The incremental movement is defined by the stroke of the powered member 130 that is, in turned, is selected based on the travel distance of the load 2. The front end 152 and the rear end 154 are also being at least partially disposed, in the non-load engaging position, below the load supporting surfaces 218, 228 during the linear movement of the carrying member 120 in an opposite second or a non-load moving direction. The linear movement of the force exerting members 150 in the first direction advances the load 2 from the inlet end 12 to the outlet end 14. When the powered member 130 is controlled to move the carrying member 120 and the force exerting members 150 in a reversed direction toward the inlet end 12, the force exerting members 150 rotate into the non-load engaging position and move under the load 2 which is behind the load 2 that was previously advanced by the retracting force exerting members 150. While retracting, the force exerting members 150 are being maintained in the non-load engaging position by any continuous bottom surface of the load 2. Once, the retracting force exerting members 150 passed the load 2 or the bottom surface of the load 2 has a void, the force exerting members 150 pivot into the load engaging position due to gravity without aid of any powered member. When the force exerting members 150 return into the load engaging position due to gravity, these force exerting members 150 are in a position to advance the next load 2 when the powered member 130 is controlled to move the carrying members 120 toward the outlet end 14 of the conveyor 10.

The number of force exerting members 150 depends on a distance between inlet end 12 and the outlet end 14, the size of the load 2 in the transport direction and the number of loads 2 to be positioned in series between the inlet end 12 and the outlet end 14. Although four force exerting members 150 are illustrated in FIGS. 1-7 as being attached to a single carrying member 120, more or less can be used in a specific application. It is contemplated that a single force exerting member 150 can be used, for example on short conveyors 10, a long stroke powered device 130 or a combination thereof.

The number of the braces 70, support brackets 80 and receptacles 110 at least depends on a distance between the inlet end 12 and the outlet end 14 and the size of the load 2 in the transport direction. Although four braces 70 are provided in the exemplary embodiment of the conveyor 10 in FIGS. 1-7, more or less can be used in a specific application, including one of each of the brace 70, support bracket 80 and receptacle 100.

Each carrying member 120 in a combination with at least the force exerting members 150 is configured to function as a carriage.

All carrying members 120 in a combination with at least the force exerting members 150 are configured to function as a carriage.

In an embodiment, an exemplary method of advancing the load 2 from the inlet end 12 to the outlet end 14 comprises engaging each load 2 with a force exerting member 150, moving, with the powered member 130, each force exerting member 150 and its respective load 2 in a (first) direction toward the outlet end 14, moving, with the powered member 130, each force exerting member 150 without the load 2 in an opposite (second) direction toward the inlet end 12 so as to position each force exerting member 150 to engage the next load 2 to be moved toward the outlet end 14. The step of moving each force exerting member 150 and its respective load 2 in a direction toward the outlet end 14 comprises controlling or actuating the powered member 130 to move in the first direction. The step of moving each force exerting member 150 in a direction toward the inlet end 12 comprises controlling or actuating the powered member 130 to move in the second direction. The step of moving each force exerting member 150 comprises the step of pivotally attaching one or more force exerting members 150 to a carrying member 120 and mounting the carrying member 120 for a linear movement. The mounting can be achieved by providing receptacles 100 mounted stationary during operation of the conveyor 10, for example on braces 70 and brackets 80.

In an embodiment, an exemplary method of indexing or incrementally advancing the loads 2, positioned in a series (i.e., one after another) with each other, from the inlet end 12 to the outlet end 14 comprises engaging each load 2 with a single force exerting member 150, moving, with the powered member 130, the force exerting members 150 and the loads 2 in a (first) direction toward the outlet end 14, moving, with the powered member 130, the force exerting members 150 without the loads 2 in an opposite (second) direction toward the inlet end 12 so as to not move the loads 2 in such second direction, engaging with each force exerting members 150 the next load 2 and advancing the loads 2 again toward the outlet end 14. It would be understood that at the beginning of operation, only one row of loads load can be positioned at the inlet end 12. Thus, in the beginning of operation of the exemplary conveyor 10 only the force exerting members 150 will index or incrementally advance the loads 2. After the first indexing, there will now be two rows of loads 2 positioned in a series with each other. So, the next indexing step will move two rows of loads 2 and so on until the conveyor 10 is completely loaded and each force exerting member 150 advances a respective load 2 in the first direction. It would be understood that it would take 4 strokes of the powered member 130 to load the conveyor 10 illustrated in FIGS. 1-18 and 21-24.

Now in reference to FIGS. 10-15, the conveyor 10 is constructed in accordance with above described embodiment(s) of FIGS. 1-9 and further comprises an optional device 180 configured to move a selected load 2 in a reversed or retracted direction from the outlet end 14 to the inlet end 12 when the load(s) 2 is(are) disposed at the outlet end 14. In an embodiment, the device 180 can comprise edge slots 182 in the first wall 212 of each inner load supporting member 210, bearing block 184 coupled to two or more first walls 212 in an alignment with a respective slot 182, a shaft 186 passed through each bearing block 184, a pawl 188 secured on the shaft 186 for a rotation thereof and another powered drive 190 coupled with a link 192 to the pawl 188 and operable to pivot the shaft 186 and the pawl 188 in the direction from the outlet end 14 to the inlet end 12 so as to move the load 2, disposed at the outlet end 14, a small increment toward the inlet end 12. The device 180 is configured to function as a kickback device.

In an example, the device 180 can be employed in application(s) where the load 2 exiting the outlet end 14 is transferred onto another conveyor (not shown) to be moved in a direction generally normal to the transport or conveyance path 4. In this application, the purpose of the device 180 is to “break” a contact between the load 2 being positioned at the outlet end 14 and the load 2 that was pushed by the force exerting member 150 onto the another conveyor (not shown). The kickback motion allows a separation between the load 2 being positioned at the outlet end 14 and the load 2 that was pushed by the force exerting member 150 onto the another conveyor and subsequently allows an unobstructed movement of the discharged load 2 on the another conveyor (not shown). If the discharged load 2 on the another conveyor (not shown) has contact with the load 2 still on the index conveyor 10, the discharged loads 2, through friction of them touching, may turn or stall and not be transported by such another conveyor (not shown).

Thus, in an embodiment, an exemplary method of indexing or incrementally advancement of the loads 2, positioned in a series (i.e., one after another) with each other, in the first direction from the inlet end 12 to the outlet end 14 comprises incrementally moving the load 2 positioned at the outlet end 14 of the conveyor 10 in the opposite second direction with a device 180 which is powered independently from the powered member 130.

Different control arrangements can be employed for electrical control of the conveyor 10 of FIGS. 1-15. In an example of FIG. 16, a transmitter 272 and a receiver 274 can be mounted in an operative alignment across a width of the conveyor 10, at an inlet end 12 thereof, to sense a presence or an absence of the load 2. The transmitter 272 and receiver 274 can be of an optical type or a sound transmission type.

In an example, a transmitter 276 and a receiver 278 can be mounted at an outlet end 14 of the conveyor 10 to sense a presence or an absence of the load 2.

In an example, a first pair of a transmitter 272 and a receiver 274 can be mounted in an operative alignment across a width of the conveyor 10, at an inlet end 12 thereof, and a second pair of a transmitter 276 and a receiver 278 can be mounted at an outlet end 14 of the conveyor 12.

The single powered member 130 of a pneumatic or hydraulic cylinder type can be adapted with one or a pair of sensors 280, 282, for example of a proximity type. Sensor 280 can be positioned at a rod end 132 and operable to provide a cylinder extend signal and the sensor 282 can be mounted at the opposite piston end 138 and operable to provide a cylinder retract signal. In an example, the sensors 280, 282 can be mounted to sense an absence or a presence of an internal component, for example such as a piston (not shown).

The sensor 280 and/or 282 can be positioned and operable to sense a position of the load so as to reverse an operating direction of the powered member 130.

The sensor 280 and/or 282 can be positioned and operable to sense a presence or an absence of the load translating on said pair of the load supporting members 210 and 220.

The above described transmitters, receivers and sensors are electrically coupled to a control member 286. The control member 286 can be either of a microprocessor type, a programmable logic type or a relay type. The receivers 274, 278 and sensors 280, 282 are operable to input a signal into the control member 286. The control member 286 can be also configured to source power to transmitters 272, 276 when applicable.

Figure 16:
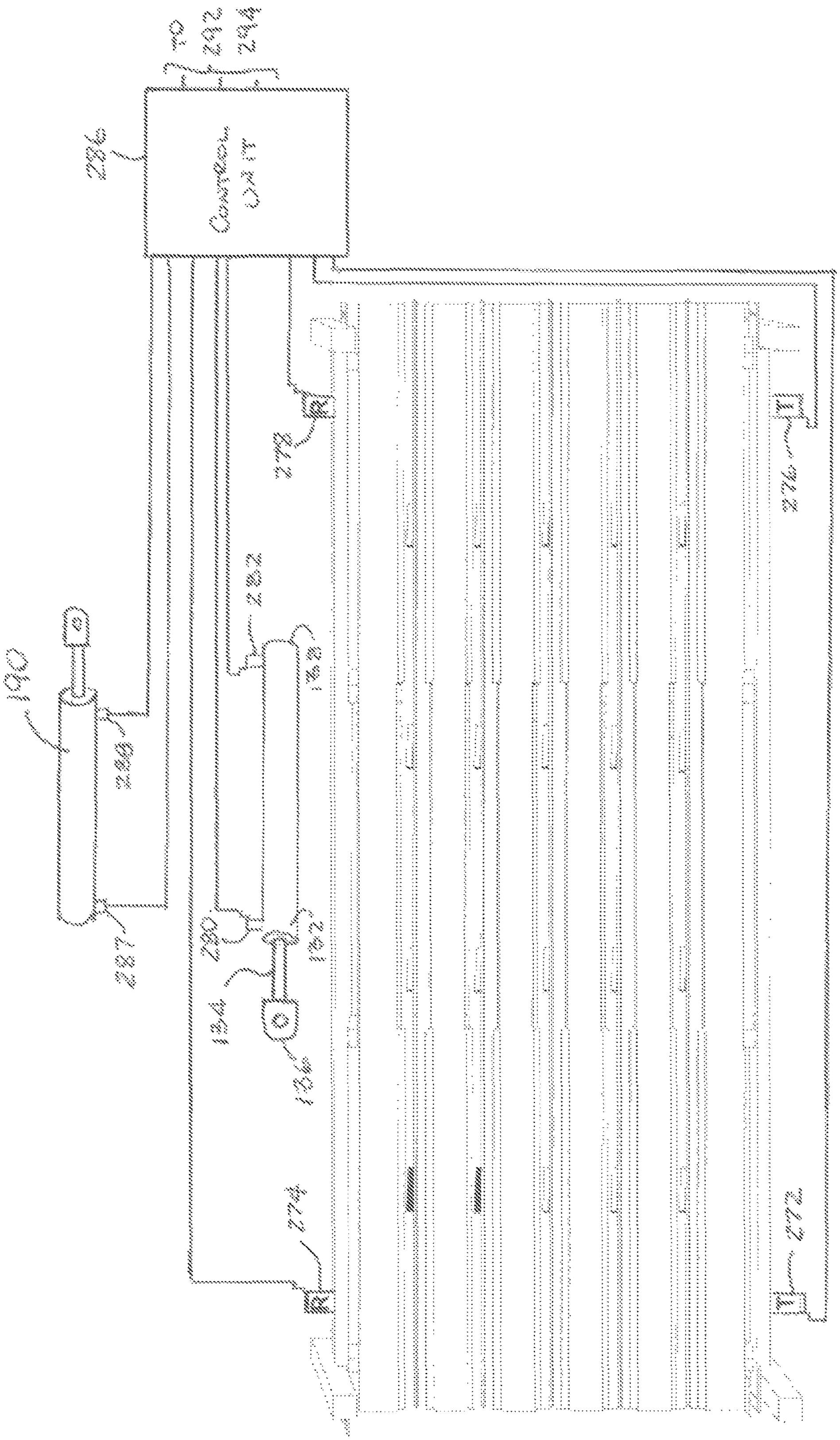
FIG. 16 illustrates an electrical block diagram of the conveyor of FIG. 1 or 8.

FIG. 16 illustrates control of the conveyor 10 with the single powered member 130 of a pneumatic or hydraulic cylinder type. It would be understood that when conveyor 10 is provided with the plurality of the powered member 130, either one or each powered member 130 can be adapted with the above described sensors 280, 282. When each powered member 130 is adapted with the above described sensors 280, 282, each sensor 280, 282 is electrically coupled to the control member 286.

It is contemplated herewithin that the powered member 130 can be adapted with one of the sensors 280, 282. In an example, only the sensor 280 can be provided to sense the powered member 130 being in a retracted position and transmit a respective signal to the control member 286. The control member 286 can be then configured (programmed) to calculate the time to extend and retract (i.e. complete the cycle) the powered member 130 based on the selected stroke, i.e. distance to index or incrementally move the load 2. In an example, only the sensor 280 can be provided to sense the powered member 130 being in the extended position and transmit a respective signal to the control member 286. The control member 286 can be then configured (programmed) to calculate the time to retract and extend (i.e. complete the cycle) the powered member 130 based on the selected stroke, i.e. distance to index or incrementally move the load 2.

It is further contemplated that function of the sensors 280, 282 can be replaced by a logic algorithm executed by the control member 286. Such logic algorithm can be based on a time required to cycle (extend and retract) the powered member 130 and to move the load 2 a preselected distance. The cycle can be initiated by the input signal from the receiver 274 and/or 278.

When the conveyor 10 is configured with the optional device 180, the operation of the powered member 190 can be controlled in the above described manner, for example by adapting the powered member 190 with the sensors 287, 288.

Figure 17:
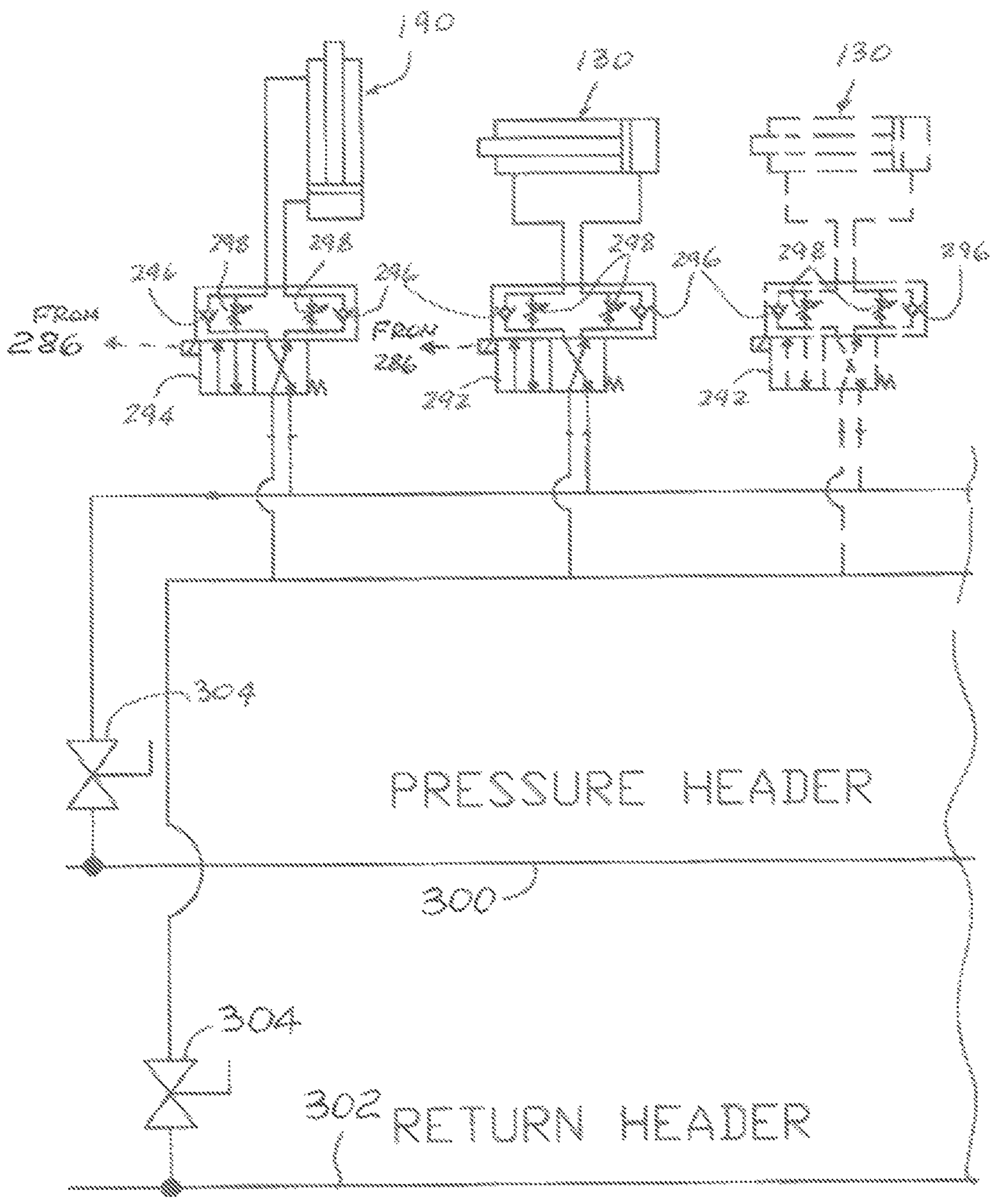
FIG. 17 illustrates a fluid control block diagram of the conveyor of FIG. 1 or 8.

FIG. 17 illustrates an exemplary fluid flow control of the conveyor 10 when the powered member 130 and an optional powered member 190 are provided as conventional pneumatic or hydraulic cylinders comprising piston and rod members. A solenoid operable valve 292 can be electrically connected to the control member 286 and pneumatically or hydraulically coupled (i.e. in a fluid communication) to the cylinder 130 so as to control extension and/or retraction thereof. Another solenoid operable valve 294 can be electrically connected to the controller 286 and pneumatically or hydraulically coupled (i.e. in a fluid communication) to the cylinder 190 so as to control extension and/or retraction thereof. Check valve(s) 296 and/or orifices(s) 298 can be also employed for fluid flow control. Check valve(s) 296 and/or orifices(s) 298 can be combined within a single unit or can be provided and installed individually. The cylinders 130, 190 of the hydraulic type are connected to pressure or supply header 300 and a return header 302 that can be controlled by valves 304. It would be understood that additional electrical and fluid control components can control more than one cylinder 130 or 190. The cylinders 130, 190 of a pneumatic type can be vented to atmosphere and thus can be only connected to the pressure or supply header 300, eliminating a need for check valve 296 and orifice 298 at the rod end and simplifying the solenoid operable valves 292, 294.

It would be also understood that each cylinder 130, 190 in a plurality of such cylinders can be adapted with its dedicated set of control components. In a further reference to FIG. 17, therein is illustrated at least a pair of powered member 130 with a single powered member 190. This embodiment may apply to a configuration of a plurality of conveyors 10 being positioned in a series with each other, where only one such conveyor 10 is configured with the device 180 and the remaining conveyors 10 are absent such device 180.

It is also contemplated that each cylinder 130, 190 can be provided/configured as a rodless cylinder type.

Figure 18:
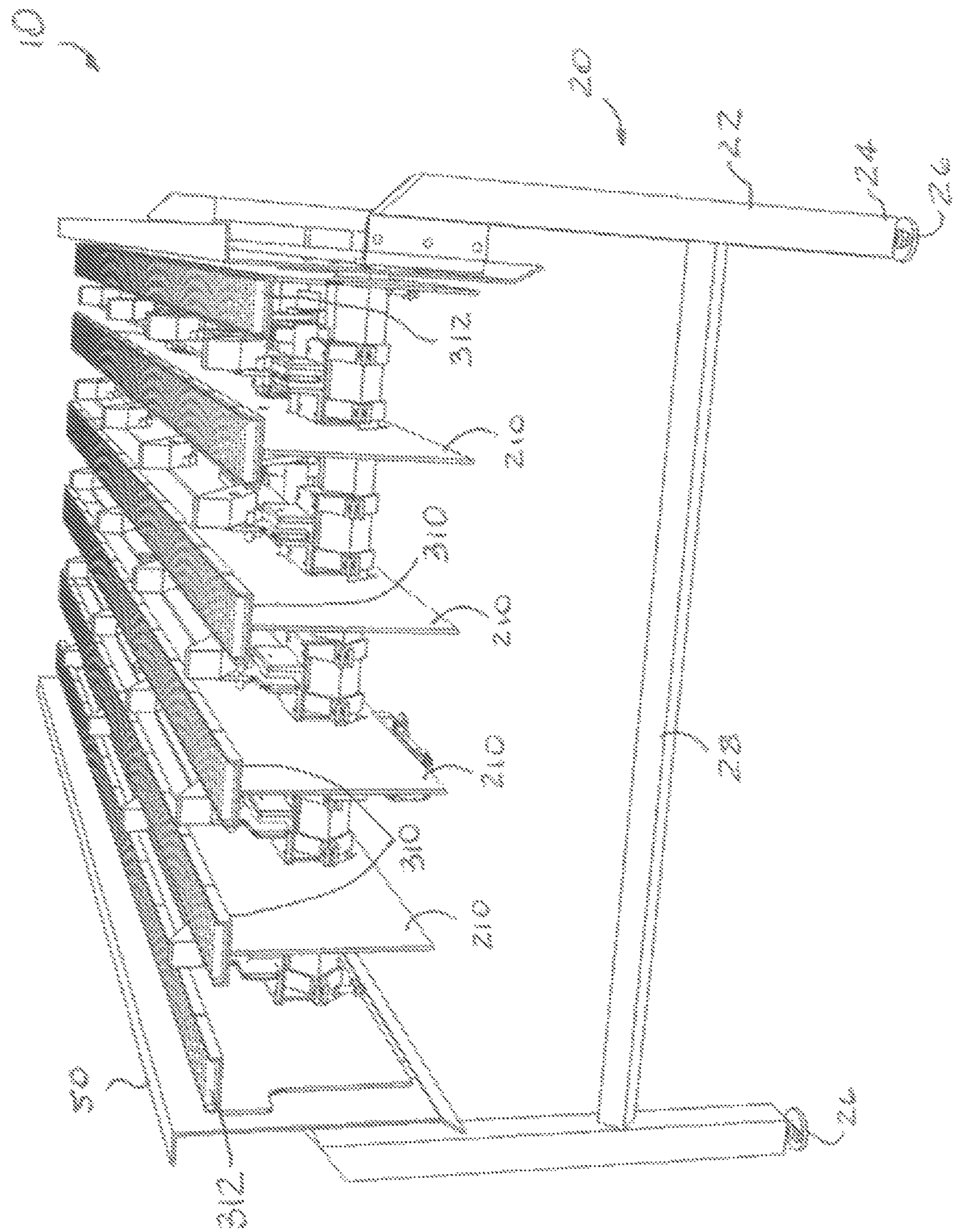
FIG. 18 illustrates a perspective view of an exemplary conveyor configured to advance multiple rows of loads.

FIG. 18 illustrates an embodiment of the load supporting members 210, 220 wherein the second wall 216 or 226 respectively has been replaced with a U-shaped receptacle 310 containing plurality of rollers 310 mounted for a rotation. The rollers 312 can than define the previously described load supporting surfaces 218, 228. The advantage of the rollers 312 is in at least minimizing if not eliminating friction between the load 2 and the previously described load supporting surfaces 218, 228. The rollers 312 that are illustrated as being rotated about a horizontally disposed axis during use of the conveyor 10 can be replaced with any roller type suitable for material handling applications.

Figure 19:
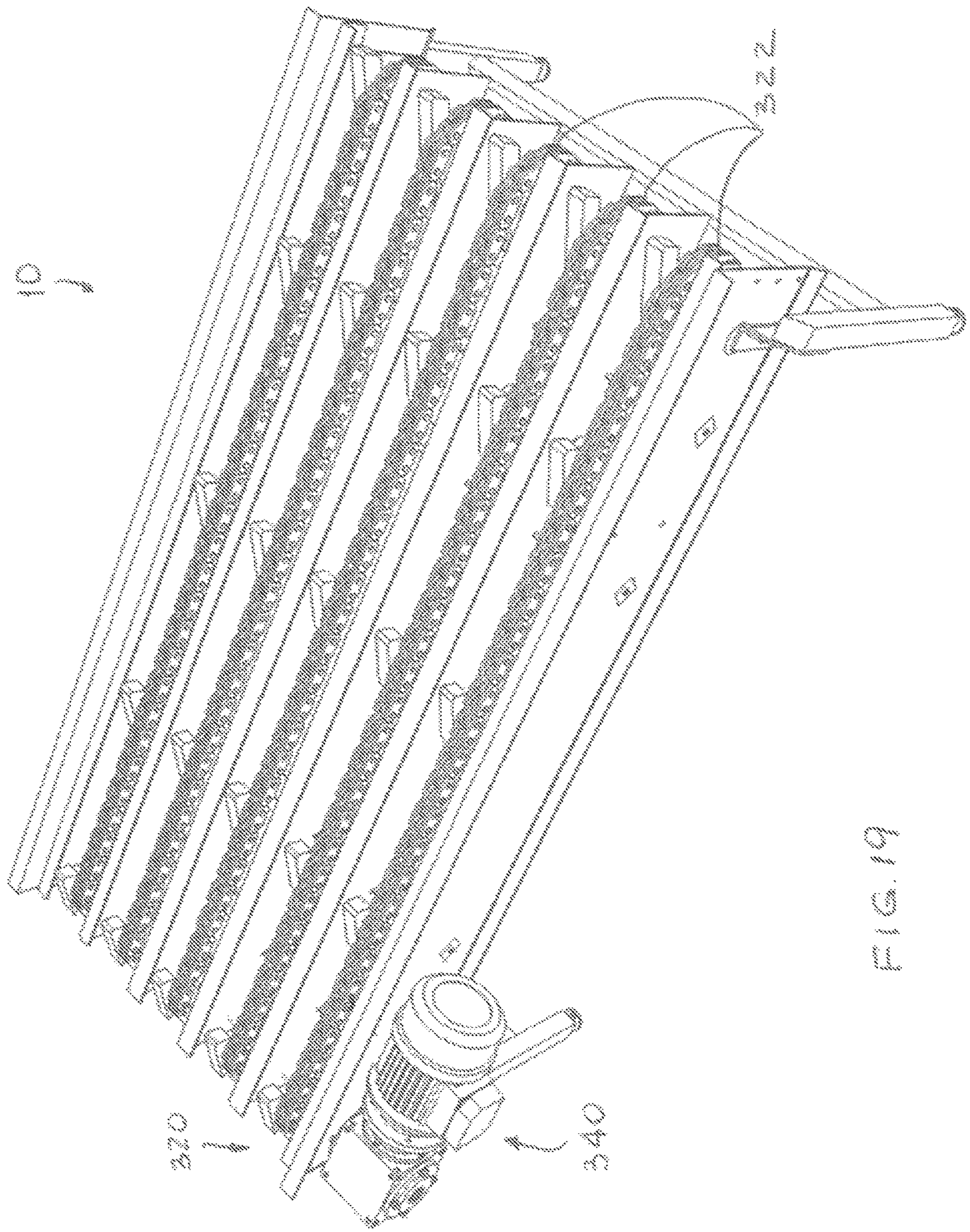
FIG. 19 illustrates a 3-D view of an exemplary conveyor configured to advance multiple rows of loads.
Figure 20:
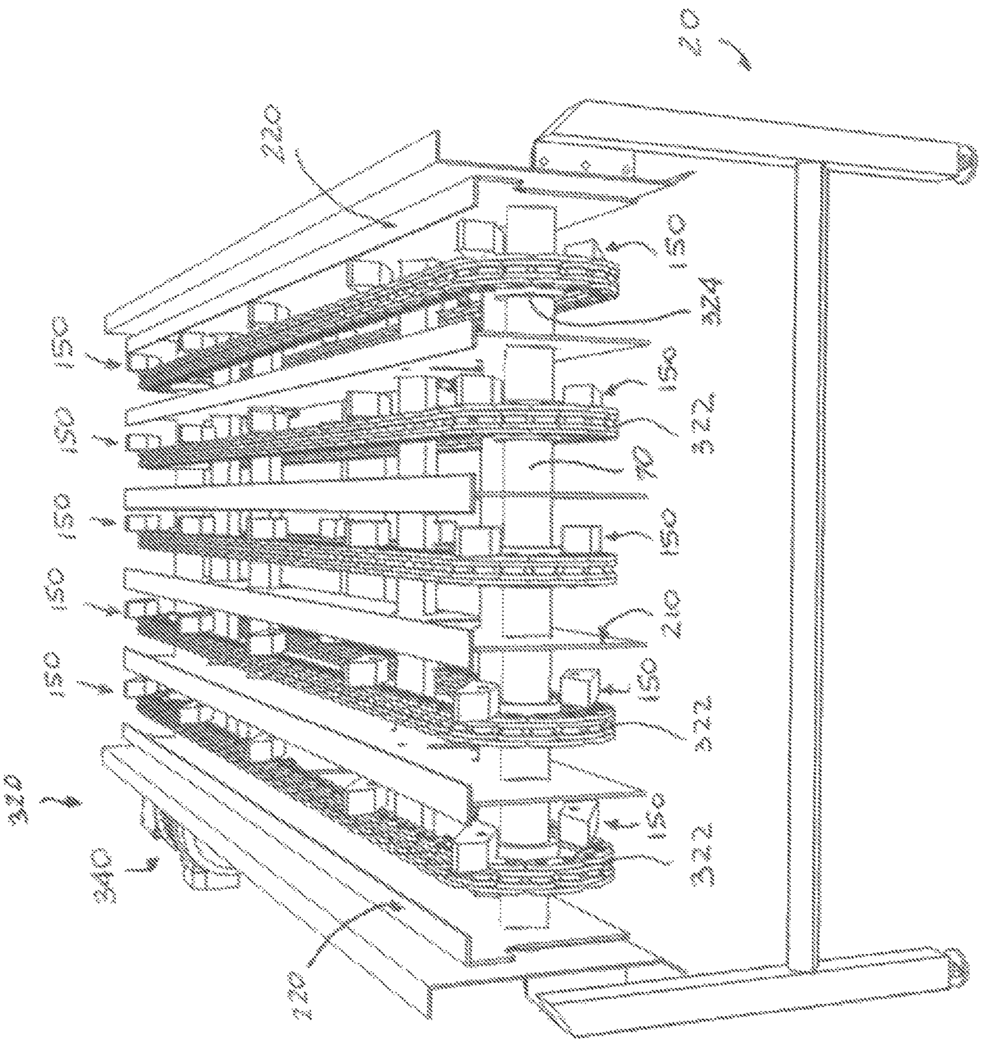
FIG. 20 illustrates a 3-D end view of the conveyor of FIG. 19.

FIGS. 19-20 illustrate an embodiment of the conveyor 10 wherein the previously described indexing device comprising the receptacles 100, carrying members 210, and a linearly configured powered member 130 has been replaced with a chain drive 320 comprising a plurality of chains 322 driven by a powered member 340 through a pair of chain sprockets 324, for example being of a motor and gearbox type, and carrying a plurality of the force transmitting members 150. It would be understood that the force transmitting members 150 in the embodiment of FIGS. 19-20 move in a single direction. Indexing or incremental advancement of the force transmitting members 150 can be controlled through the control member 286, for example based on a length of the load 2 to be incrementally advanced from the inlet end 12 to the outlet end 14 or based on a timing to advance such load 2.

Figure 21:
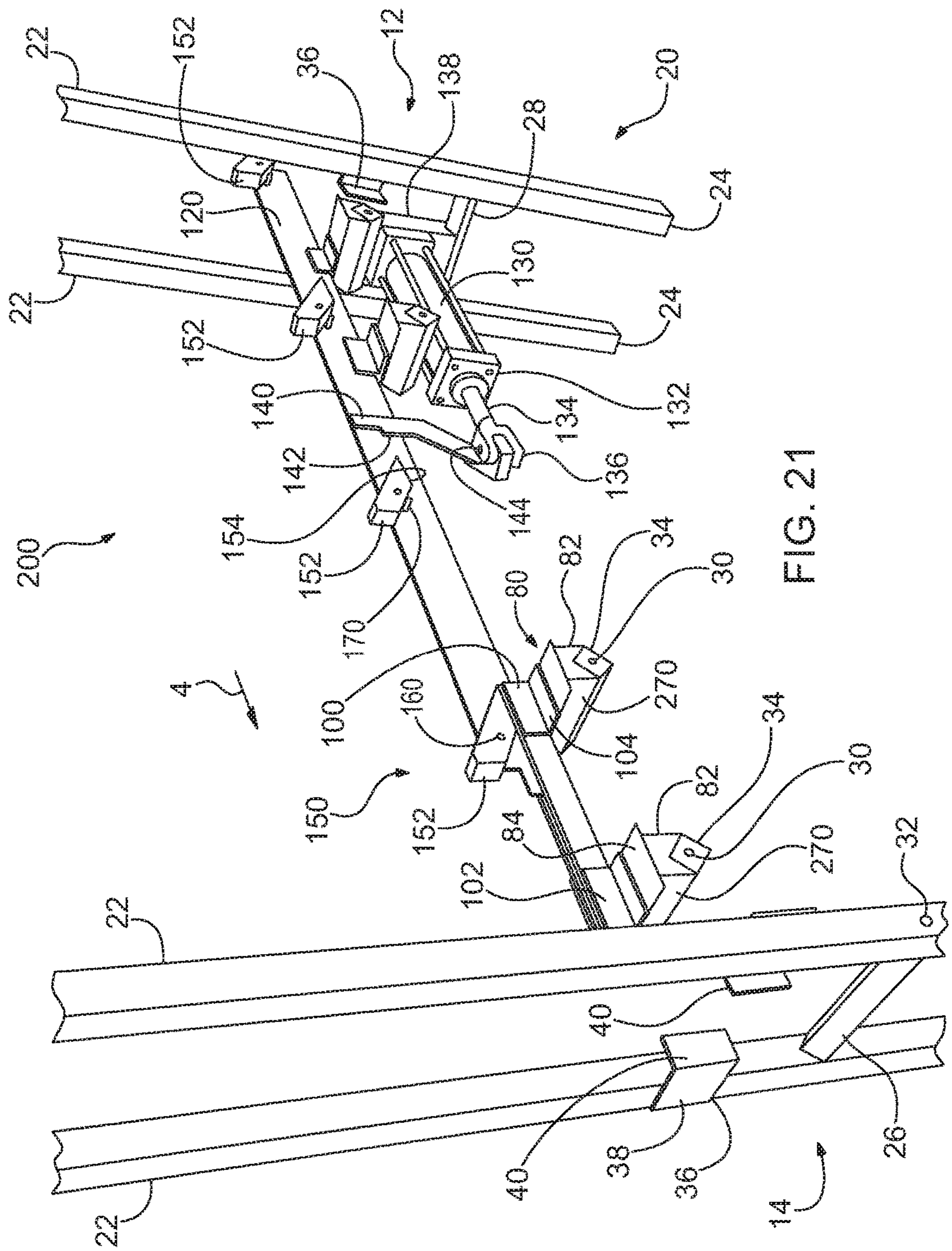
FIG. 21 illustrates a 3-D view of an exemplary conveyor configured to advance a single row of loads.

FIG. 21 illustrates an exemplary embodiment of a conveyor 200 configured to advance a single load 2 in each row. The conveyor 200 also comprises a frame that can be constructed identical to the above described frame 20, except for a smaller lateral distance between end members 22 to accommodate such single load 2. The frame defines an inlet end and an outlet end of the conveyor 200. The frame comprises end members 22, end braces 28, sized for a smaller lateral distance and the pair of side members 50, each side member 50 is coupled to the pair of end members 22 in a direction between the inlet end and the outlet end of the conveyor 200. The side members 50 are omitted in FIG. 21 for the sake of clarity and the detail description of such end members 50 is omitted herein for the sake of brevity.

Conveyor 200 comprises braces 270 coupled stationary, at each end thereof, to each side member 50 of the frame, in series and in a spaced apart relationship with each other between the inlet and outlet ends of the conveyor 200. Each brace 270 can be essentially the above described brace 70, except for length to accommodate the smaller lateral distance of the conveyor 200. Each brace 270 is disposed substantially transverse to the above described load supporting members 220 and passing through aligned apertures 224 in each first wall 222 of each load supporting member 210. The load supporting members 220 are omitted in FIG. 21 for the sake of clarity. In an embodiment, the outer load supporting member 220 can be replaced with the side members 50 configured to carry the loads 2 and the inner load carrying members 210 are not needed in the embodiment of FIG. 21.

The conveyor 200 is also adapted with the above described U-shaped brackets 80 and clamps 90 positioned in spaces between the load supporting members 210.

The conveyor 200 also comprises the above described receptacles 100 and can comprise optional liners 110. As is in the embodiment of the conveyor 10, a single carrying member 120 with force exerting members 150 is also provided.

The conveyor 200 comprises a single powered member 130 coupled to the single carrying member 120 with the link 140.

The operation of the conveyor 200 of FIG. 21 is essentially identical to the operation of the conveyor 10, except for the single load 2 in each row being advanced from the inlet end 12 to the outlet end 14.

It will be also understood that plurality of conveyors 200 can be coupled with each other in a side-by-side relationship to essentially define a conveyor being similar to the conveyor 10 and configured to move a single carrying member 120 with a dedicated power mover 190.

Figure 22:
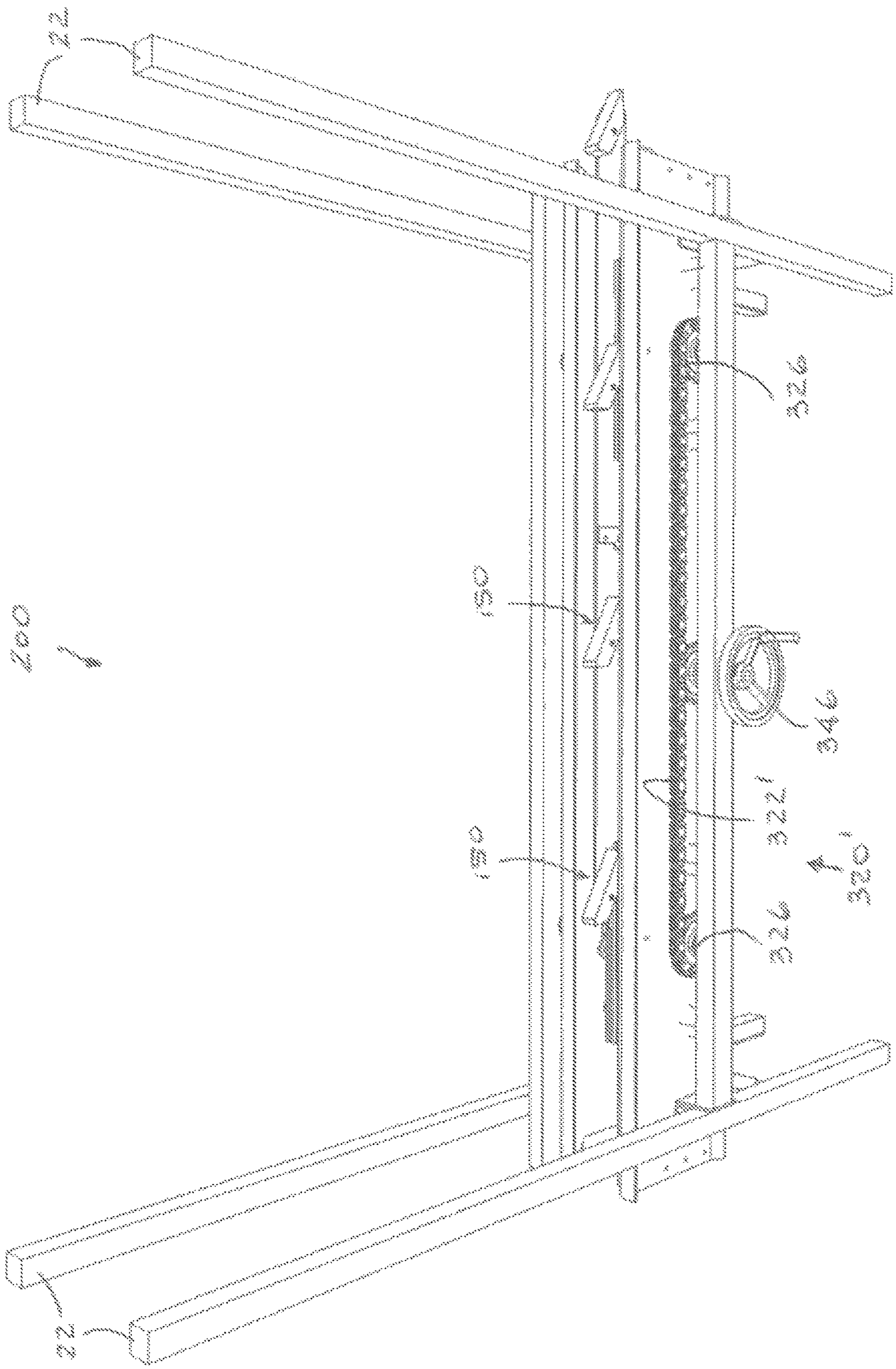
FIG. 22 illustrates a perspective view of an exemplary conveyor configured to advance a single row of loads.
Figure 23:
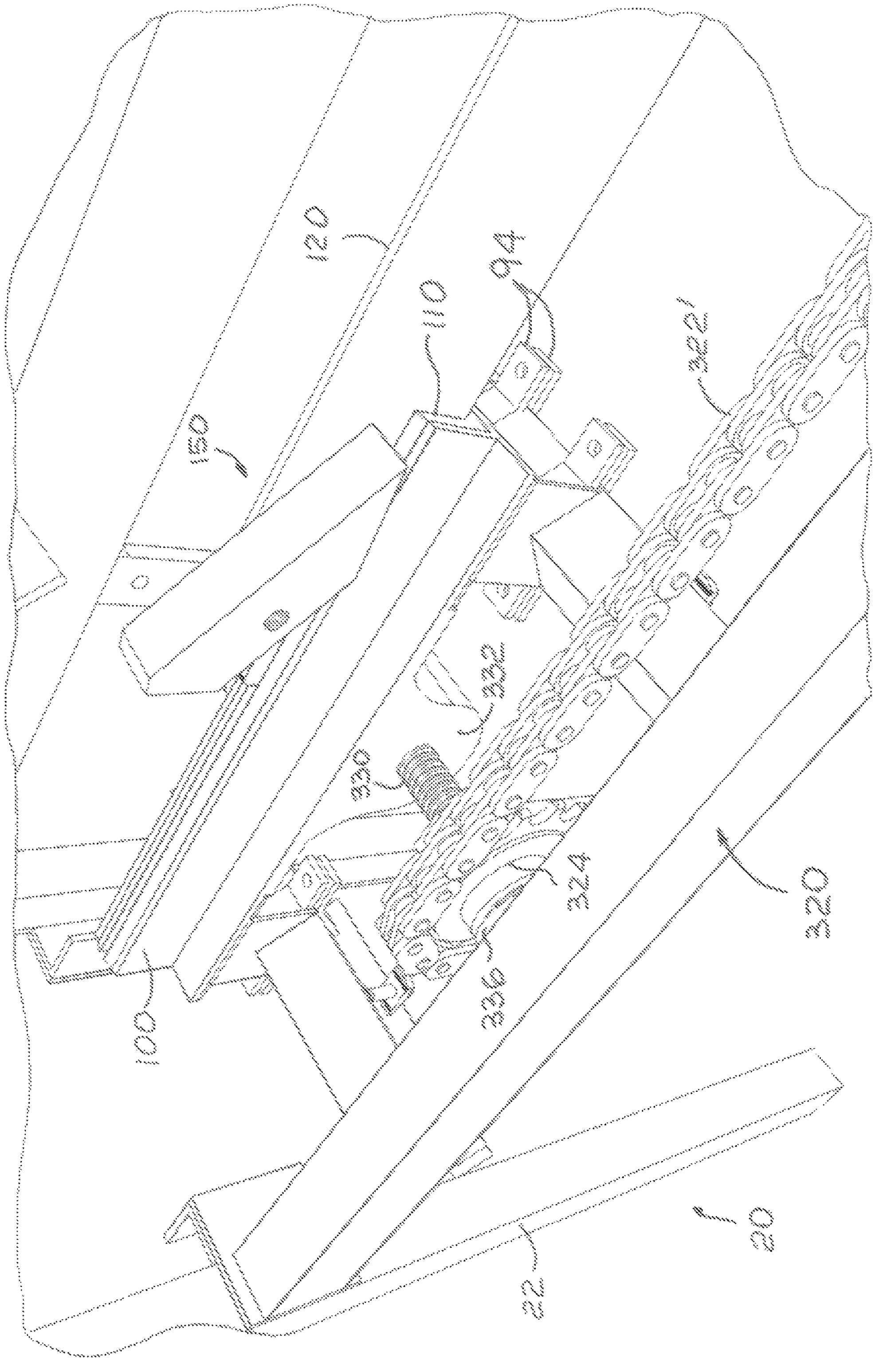
FIG. 23 illustrates a partial 3-D top view of the conveyor of FIG. 22.
Figure 24:
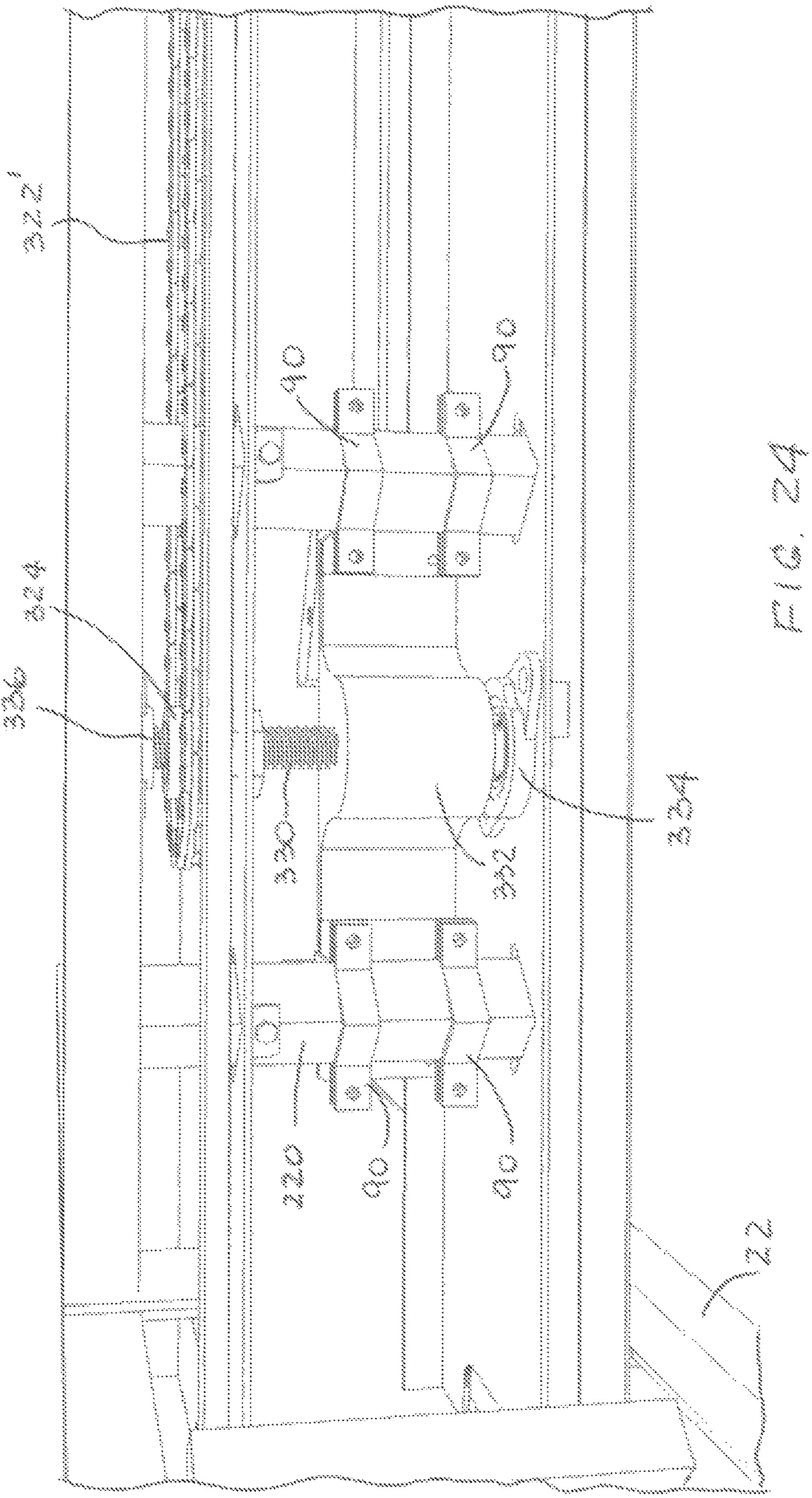
FIG. 24 illustrates a partial 3-D bottom view of the conveyor of FIG. 22.

FIGS. 22-24 illustrate an embodiment of the conveyor 200 wherein the powered member 130 has been replaced with the chain drive 320' comprising a chain 322' and sprockets 324. The sprockets 324 are coupled by way of the shaft 330 rotating in a pair of bearings 334, 336. The conveyor 200 of FIGS. 22-24 is also configured as an adjustable width conveyor by way of a threadable engagement of the shaft 330 and a housing 332. The width of the conveyor 200 can be adjusted manually by way of a hand wheel 346 or by a powered member, for example such as the above described powered member 340. Thus, the exemplary conveyor 200 of FIGS. 22-24 comprises a device configured to adjust width of the conveyor 200 so as to accommodate loads 2 of various widths.

Figure 25:
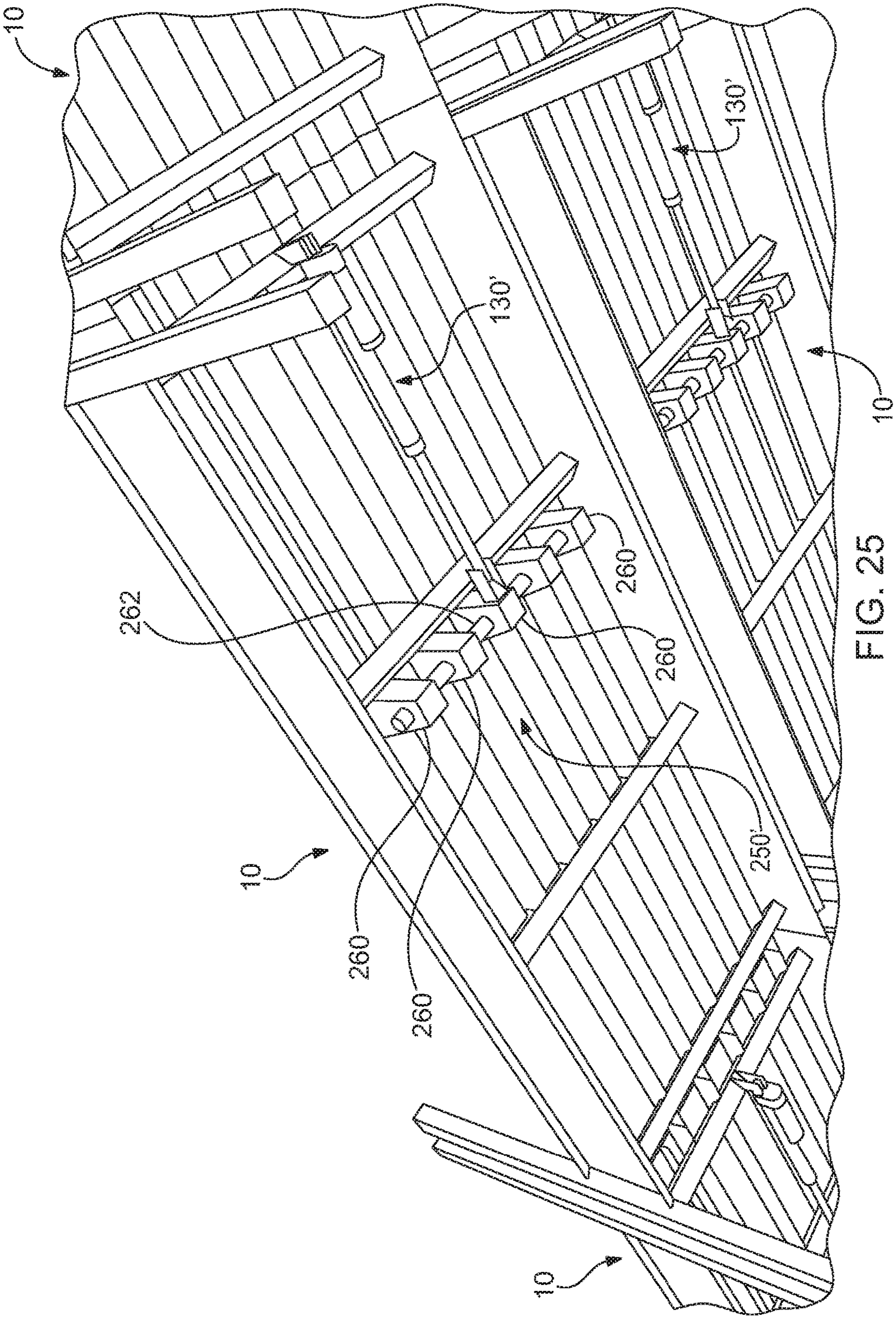
FIG. 25 illustrates a partial 3-D view of multiple conveyors disposed in a series with each other

FIG. 25 illustrates an embodiment, wherein multiple conveyors 10 are disposed in a series with each other along the conveyance path 4. The conveyors 10 can be mechanically connected therebetween for example with fasteners (not shown) passed through aligned apertures 58 in each conveyor 10. FIG. 25 also illustrates that conveyors 10 can be disposed in series with each other in a direction normal to the conveyance path 4. Accordingly, it would be understood that multiple conveyors 10 can be coupled to each other along the conveyance path and in a direction normal to the conveyance path. Furthermore, FIG. 25 illustrates an example of the powered member configured as a screw drive 130' and the link assembly 250' comprising blocks 260 joined by a single elongated member 262, although a plurality of members 262 is also contemplated herewithin.

Figure 26:
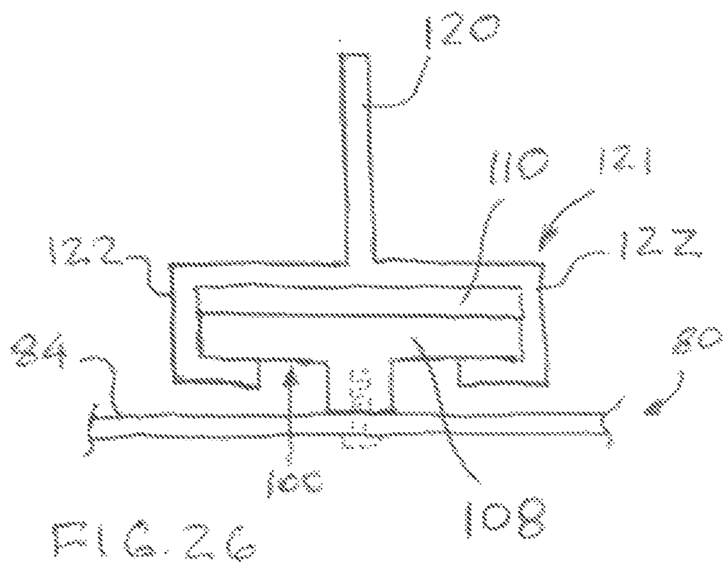
FIG. 26 illustrates a partial end view of an exemplary carrier and receptacle configuration that can be employed in the conveyors of FIGS. 1-15, 18 and 21-24.

FIG. 26 illustrates an embodiment of the receptacle 100 and the carrying member 120, wherein the carrying member 120 is adapted with a base 121 comprising a pair of portions 122 each having a J-shaped configuration in a plane transverse to a length of the carrying member 120. The receptacle 100, in this embodiment, is provided as a member 108 having a T-shaped configuration in the plane transverse to a length of the carrying member 120. The member 108 is shaped to fit within the base 121. The optional liner 110 may be simply provided as a flat member or a strip or may be adapted with a complimentary J-shaped configuration.

Figure 27:
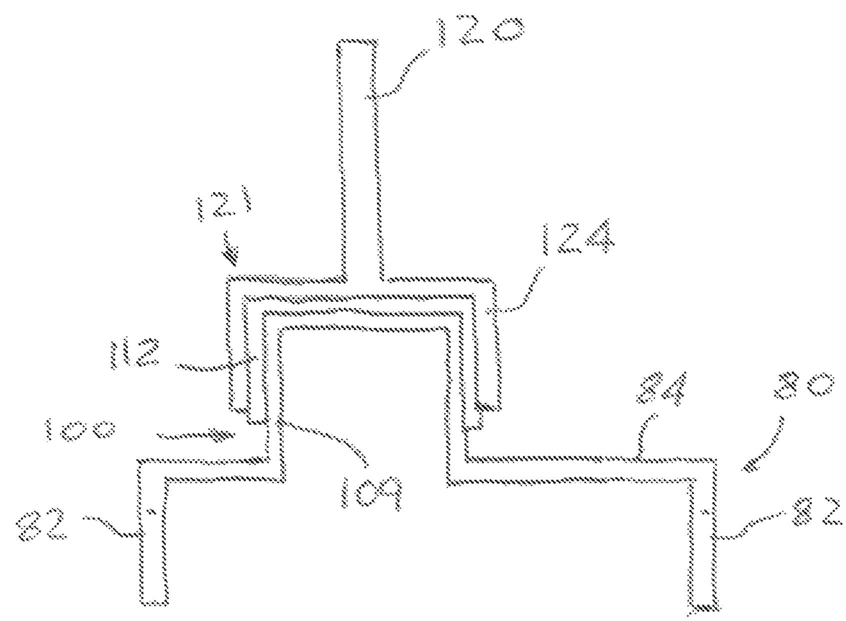
FIG. 27 illustrates a partial end view of an exemplary carrier and receptacle configuration that can be employed in the conveyors of FIGS. 1-15, 18 and 21-24

FIG. 27 illustrates an embodiment of the receptacle 100 and the carrying member 120, wherein the carrying member 120 is adapted with a base 121 comprising a pair of flanges 124, each having an L-shaped configuration in a plane transverse to a length of the carrying member 120. In other words, the base 121 can have a U-shaped configuration. The receptacle 100, in this embodiment, is provided as a U-shaped portion 109 integral to the support bracket 80. The optional liner 110 may be provided as a member 112 with a U-shaped configuration being complimentary to the U-shaped configuration of the base 121.

Thus, the above described receptacle(s) 100 and the carrying member(s) 120 provide means for mounting and/or carrying force transmitting member(s) 150 for a reciprocal linear movement between inlet end 12 and the outlet end 14. Furthermore, in reference to FIGS. 26-27, the means for mounting and/or carrying force transmitting member(s) 150 for a reciprocal linear movement exclude rollers, cam followers or wheels. However, in an embodiment, the carrying member 120 can be moved by tracks and cam followers as disclosed in U.S. Pat. No. 5,195,630 issued to Donovan et al. on Mar. 23, 1993 and whose teaching are incorporated in entirety by reference thereto.

Figure 28:
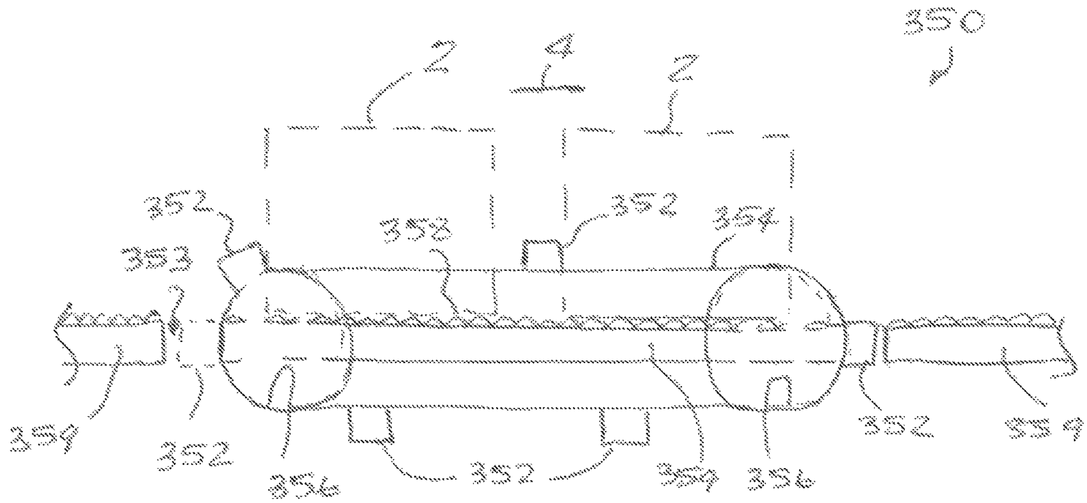
FIG. 28 illustrates a side view of an exemplary conveyor configured to advance multiple rows of loads.
Figure 29:
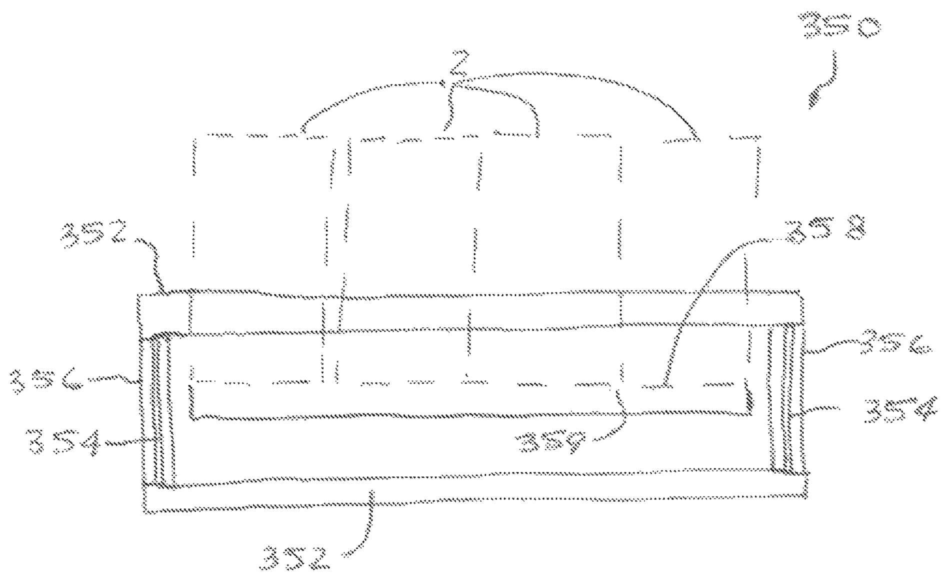
FIG. 29 is an end view of the conveyor of FIG. 28.

FIGS. 28-29 illustrate an embodiment of a conveyance apparatus 350, wherein loads 2 are advanced by way of elongated members 352 attached to a pair of endless members 354, each being any one of such as a belt, chain or cable. Sprockets 356, or any other suitable members, are provided to move the elongated members 352 with one or more sprockets being attached to a powered member (not shown), for example such as the above described powered member 340. The surface(s) 358 of the load carrying members 359 that the loads 2 are being supported on during advancement could be the above described surfaces 218, 228, 312. The load carrying member(s) 359 may be even provided as a conventional powered or unpowered roller conveyor or a conventional belt conveyor. In other words, the conveyance apparatus 350 can comprise a roller or belt conveyor. The incremental advancement or indexing of the loads 2 can be controlled by way of the control member 286. Incremental travel distance of the load 2 can be used as a control parameter for the control member 286. Or, the above described position sensors 272, 274, 276 and 278 can be used to start and stop operation of the powered member. When two or more load carrying members 359 are positioned in series with each other along the pathway 4, a suitable gap 353 between ends of a pair of adjacent load carrying members 359 is provided to accommodate passage of the elongated member 352.

The present disclosure is also directed to an indexing or ratchet device for a conveyor configured to advance a load positioned on a pair of spaced apart load supporting members, between an inlet end and an outlet end of the conveyor.

In an embodiment, the indexing device comprises, in combination, receptacles 100 mounted in a stationary position, in series with each other, between the inlet and outlet ends and between the pair of spaced apart load supporting members, each receptacle defining a pair of vertically disposed walls and an interior; a carrying member 120 positioned for a reciprocal linear movement between the vertically disposed walls within the interior; force exerting members 150 disposed in series with each other between the inlet and outlet ends of the conveyor and between the pair of spaced apart load supporting members, each force exerting member comprising a front end and a rear end; a pivotal connection 160 between each force exerting member and the carrying member; each force exerting member pivotable between a load engaging position and a non-load engaging position on the carrying member and movable with the carrying member in the reciprocal linear movement; the front end has at least a portion thereof extending outwardly, in the load engaging position, from load supporting surfaces of the spaced apart member and in a abutting relationship with a portion of the load during operation of the indexing device, the abutting relationship causing an incremental advancement of the load between the inlet and outlet ends during a linear movement of the carrying member in a first direction; the front end and the rear end being at least partially disposed, in the non-load engaging position, below the load supporting surfaces during the linear movement of the carrying member in an opposite second direction; and the reciprocal linear movement of the force exerting members in the first direction advances the load from the inlet end to the outlet end.

In an embodiment, the indexing device for a conveyor configured to advance a load positioned on a pair of spaced apart load supporting members, between an inlet end and an outlet end of the conveyor, the indexing device comprises receptacles 100 mounted in a stationary position, in series with each other, between the inlet and outlet ends of the conveyor and between the pair of spaced apart load supporting members, each receptacle defining a pair of vertically disposed walls and an interior; liners 110, each liner comprising a material with a low friction coefficient and being disposed within the interior of the receptacle; a carrying member 120 positioned for a reciprocal linear movement between liners in each liner; force exerting members 150 disposed in series with each other between the inlet and outlet ends of the conveyor and between the pair of spaced apart members, each force exerting member comprising a front end and a rear end; a pivotal connection 160 between each force exerting member and the carrying member; each force exerting member pivotable between a load engaging position and a non-load engaging position on the carrying member and movable with the carrying member in the reciprocal linear movement; the front end has at least a portion thereof extending outwardly, in the load engaging position, from load supporting surfaces of the spaced apart member and in a abutting relationship with a portion of the load during operation of the indexing device, the abutting relationship causing an incremental advancement of the load between the inlet and outlet ends during a linear movement of the carrying member in a first direction; the front end and the rear end being at least partially disposed, in the non-load engaging position, below the load supporting surfaces during the linear movement of the carrying member in an opposite second direction; and the reciprocal linear movement of the force exerting members in the first direction advances the load from the inlet end to the outlet end.

In an embodiment, an indexing device for a conveyor configured to advance a load, positioned on a pair of spaced apart load supporting members between the inlet and outlet ends of the conveyor, the indexing device comprising receptacles 100 mounted in a stationary position, in series with each other, between the inlet and outlet ends and between the pair of spaced apart load supporting members, each receptacle defining a pair of vertically disposed walls; liners 110, each liner comprising a low friction material and being coupled to an interior of each vertically disposed wall; a carrying member 120 positioned for a reciprocal linear movement between liners in each receptacle; a powered member 130 configured to provide the reciprocal linear movement; a coupling member 140 comprising one end thereof coupled to the carrying member and comprising a second end coupled to the powered member; force exerting members 150 disposed in series with each other between the inlet and outlet ends of the conveyor and between the pair of spaced apart load supporting members, each force exerting member comprising a front end and a rear end, the rear end being heavier than the front end; a pivotal connection 160 between each force exerting member and the carrying member; each force exerting member pivotable between a load engaging position and a non-load engaging position on the carrying member and movable with the carrying member in the reciprocal linear movement; stops 170, each stop rigidly coupled to the carrying member and positioned to maintain the front end of a respective force exerting member in the load engaging position; the front end has at least a portion thereof extending outwardly, in the load engaging position, from load supporting surfaces of the spaced apart member and in a abutting relationship with a portion of the load during operation of the indexing device, the abutting relationship causing an incremental advancement of the load between the inlet and outlet ends during a linear movement of the carrying member in a first direction; the front end and the rear end being at least partially disposed, in the non-load engaging position, below the load supporting surfaces during the linear movement of the carrying member in an opposite second direction; and the reciprocal linear movement of the force exerting members in the first direction advances the load from the inlet end to the outlet end.

In an embodiment, an indexing device for a conveyor configured to advance a load between the inlet end and an outlet end of the conveyor, the conveyor comprising a pair of spaced apart load supporting members, a carrying member, gravity rocking advancement pushers pivotally mounted on the carrying member in a spaced apart relationship with each other between the inlet end and the outlet end, a powered member coupled to the carrying member and operable to move the carrying member with the gravity rocking advancement pushers in the linear direction, the indexing device comprising braces coupled stationary to each load supporting member, in series and in a spaced apart relationship with each other between the inlet end and the outlet end of the conveyor, each brace being disposed transverse to the pair of load supporting members; U-shaped brackets, each U-shaped bracket comprising a pair of flanges coupled stationary to a respective brace and further comprising a surface disposed substantially horizontally during use of the indexing device; receptacles, each receptacle mounted in a stationary position on the surface, each receptacle comprising a pair of walls disposed vertically in a direction between the inlet end and the outlet end during operation of the indexing device, the pair of walls defining an interior of the each receptacle; and liners, each liner comprising a material with a low friction coefficient and being disposed within the interior of a respective receptacle.

The indexing device of any of the above described embodiments can be retrofitted on other type conveyors. In an example, the indexing device(s) can be retrofitted on a conveyor as disclosed in U.S. Pat. No. 5,195,630 issued to Donovan et al. on Mar. 23, 1993, the entire contents of which are incorporated herein by reference. In this example, the above described indexing device(s) can be employed to at least replace the cam follower arrangement in U.S. Pat. No. 5,195,630.

In an example, the indexing device(s) can be retrofitted on a conveyor as disclosed in U.S. Pat. No. 5,320,212 issued to McIntosh et al. on Jun. 14, 1994, the entire contents of which are incorporated herein by reference. In this example, the above described indexing device(s) can be employed to at least replace a dual cylinder and linkage arrangement to pivot force transmitting members or dogs.

The conveyor 10 or 200 can be used in various applications. In an embodiment, the conveyor 10 or 200 can replace belt conveyor 10*a*/10*b* as disclosed in U.S. Pat. No. 7,269,935 B2 issued to Jafari on Sep. 18, 2007, the entire contents of which are incorporated herein by reference. Thus, the conveyor 10 or 200 can be configured for use in applications for wrapping pavers, bricks, In other words, a machine for wrapping pavers, cement blocks or lumber with flexible film and banner film can comprise the above described conveyor 10 or 200 or any modifications thereof. For example, the conveyor 10 can be adapted to move only a single row of loads during a single stroke of the powered member 130.

In an embodiment, the conveyor 10 or 200 can replace belt conveyor 12 as disclosed in U.S. Pat. No. 9,103,595 B2 issued to Clurket on Aug. 11, 2015, the entire contents of which are incorporated herein by reference. Thus, the conveyor 10 or 200 can be configured for use in a shrink wrap tunnel machine or application. In other words, a shrink wrap tunnel machine can comprise the above described conveyor 10 or 200 or any modifications thereof. For example, the conveyor 10 can be adapted to move only a single row of loads during a single stroke of the powered member 130.

In an embodiment, the conveyor 10 or 200 can be integrated within a case packer for example such as Item PC-2500 "Continuous Motion Wraparound Case Packer" or item 65TW-28 "Tray Wrapper Shrink Packaging System", both manufactured by ARPAC, LLC of Schaumburg, Ill. Thus, the conveyor 10 or 200 can be configured for use in a machine or application for wrapping trayed metal cans, paper cans, glass jars, glass bottles, plastic jars and plastic bottles and boxes. In other words, a machine for wrapping trayed metal cans, paper cans, glass jars, glass bottles, plastic jars and plastic bottles and boxes can comprise the above described conveyor 10 or 200 or any modifications thereof. For example, the conveyor 10 can be adapted to move only a single row of loads during a single stroke of the powered member 130.

The present disclosure is also directed to a kit for production of a free-standing conveyor from a plurality of interfitting parts.

In an embodiment, the kit comprises a frame comprising four tubular end members configured for vertical positioning during use of the conveyor, two tubular cross braces and two longitudinal side members, each longitudinal side member comprising apertures disposed adjacent and spaced from each end thereof, the longitudinal side members, when connected to the four tubular end members, define an inlet end and an outlet end of the conveyor; load supporting members, each load carrying comprising a first wall and a second wall with a load supporting surface, the first wall being disposed generally vertically during operation of the conveyor and comprising apertures spaced apart along a length of the each load supporting member and biasing member, each biasing member disposed between a peripheral edge of a respective aperture and a free edge of the first wall and comprising a first portion stationary attached to a surface of the first wall of each member in an alignment with a respective clamp and comprising an second portion movable in a relationship to the first portion, the load supporting surface being disposed generally horizontally during operation of the conveyor; braces; clamps, each clamp comprising a pair of portions fastened to each other during operation of the conveyor; U-shaped brackets, each U-shaped bracket comprising a pair of flanges, each of the pair of flanges being coupled rigidly to one of the pair of portions of each clamp, each U-shaped bracket further comprising a surface disposed substantially horizontally during use of the conveyor; L-shaped members, each L-shaped member having one leg thereof configured for fastening to the surface of the each U-shaped bracket during assembly of the conveyor; liners, each liner comprising a low friction material and being coupled to an interior surface of another leg of a respective L-shaped member; elongated carrying members; a powered member comprising a stationary portion and a movable portion thereof being configured for a reciprocal linear movement; a linkage comprising a link having a means for a pivotal connection with a distal end of the movable member and flanges disposed in a spaced apart relationship on and from one exterior surface of the link; plurality of coupling members, each coupling member comprising one end thereof configured for coupling, with fasteners, to a respective carrying member and comprising a second end thereof configured for coupling, with fasteners, to the link; force exerting members, each force exerting member comprising a front end and a rear end, the rear end being heavier than the front end; a pivotal connection between each force exerting member and a respective carrying member; and stops, each stop being rigidly coupled to each carrying member in a proximity to a respective pivotal connection.

The kit can be also configured in accordance with any other embodiment described herewithin and thus, the detail description of such kit(s) is omitted herein for the sake of brevity.

In an embodiment, a conveyor for advancing a plurality of rows of loads with a plurality of loads in each row, comprises a frame defining an inlet end and an outlet end of the conveyor, the frame comprising end members and a pair of side members, each side member coupled to a pair of end members in a direction between the inlet end and the outlet end; a pair of outer load supporting members extending between the inlet and outlet ends of the conveyor, each outer load supporting members comprising a first wall coupled to a respective side member and a second wall with a load supporting surface, the load supporting surface being disposed generally horizontally during operation of the conveyor; inner load supporting members extending between the inlet and outlet ends of the conveyor, the inner load supporting members positioned in a spaced apart relationship with each other between the pair of outer load supporting members, each inner load supporting member comprising, a first wall and a second wall with a load supporting surface, the first wall of the each inner load supporting member being disposed generally vertically during operation of the conveyor and comprising an aperture, the load supporting surface of the each inner load supporting member being disposed generally horizontally during operation of the conveyor; first braces coupled stationary, at each end thereof, to each side member of the frame, in series and in a spaced apart relationship with each other between the inlet and outlet ends of the conveyor, each first brace disposed substantially transverse to the inner and outer load supporting members and passing through aligned apertures in each load supporting member; clamps caging each first brace and disposed in pairs between first walls of a pair of adjacent members, each clamp comprising a pair of portions fastened to each other during operation of the conveyor; biasing members, each biasing member comprising a first portion stationary attached to a surface of the first wall of each inner or outer load supporting member in an alignment with a respective clamp and comprising a second portion movable in a relationship to the first portion and having one end thereof positioned in an abutting relationship with the respective clamp so as to bias each brace with an upper edge of each aperture during use of the conveyor; U-shaped brackets, each U-shaped bracket comprising a pair of flanges, each of the pair of flanges being coupled rigidly to one of the pair of portions of each clamp, each U-shaped bracket further comprising a surface disposed substantially horizontally during use of the conveyor; an indexing device mounted on the U-shaped brackets; a powered member configured to provide a reciprocal linear movement, the powered member having one end thereof coupled to the frame; and a linkage connecting an opposite end of the powered member with the indexing device.

In an embodiment, a conveyor is configured to advance a load and comprises a frame defining an inlet end and an outlet end of the conveyor; a device mounted on the frame and configured to incrementally advance the load in a direction from the inlet to the outlet end; and a device mounted on the frame and configured to move the load, disposed at the outlet end only, in a direction from the outlet end to the inlet end prior to discharge of the load from the outlet end.

In an embodiment, a method of advancing a load in a linear direction from an inlet end of a conveyor past an outlet end thereof comprises advancing the load, with a first device comprising a first portion thereof stationary mounted on the conveyor and a second portion thereof reciprocally movable in the linear direction and comprising gravity rocking advancement pushers abutting a portion of the load during movement from the inlet end to the outlet end; moving, with a second device, the load, disposed at the outlet end only, in a direction from the outlet end to the inlet end prior to discharge of the load from the outlet end; and moving the load, with the gravity rocking advancement pushers past the outlet end to discharge the load from the conveyor.

In an embodiment, the conveyor is configured to minimize horizontally disposed surfaces that span a distance between the inlet and outlet ends and that are positioned below the load supporting surfaces. This aspect is at least advantageous in sanitary applications to at least minimize collection of debris or waste product falling from loads carried on load supporting surfaces.

In an embodiment, the conveyor is configured to use independent force exerting members to move the load positioned at the outlet end only in a direction toward the inlet end, with such independent force exerting members being operable by an independent powered member.

In an embodiment, the conveyor is configured to use only a single powered member to incrementally move or advance a plurality of loads, positioned in a plurality of rows across a width of the conveyor, during a single stroke of the single powered member.

In an embodiment, the conveyor is configured to use only a single powered member to move a plurality of loads, positioned in a single row across a width of the conveyor.

In an embodiment, the conveyor is configured to engage the loads with force exerting members and advance the loads positioned and supported only on load supporting surfaces.

In an embodiment, the conveyor is configured to move the loads with force exerting members in a first direction from inlet end to the outlet end and move the force exerting members in an opposite second direction without moving the loads in such second direction In an embodiment, the conveyor is configured to maintain position of the load carrying members in a vertical direction only with members that are disposed transverse to such load supporting members.

In an embodiment, the conveyor is configured to maintain the load supporting members in tension with side members of the conveyor frame with one or more braces disposed transverse to such load supporting members.

In an embodiment, the conveyor is configured to move loads in absence of load supporting surface(s) being chain type conveyor surface(s).

In an embodiment, the conveyor is configured for use as a free standing conveyor.

In an embodiment, two or more conveyors can be coupled together, in a series with each other along the travel path, at the side members thereof.

In an embodiment, two or more conveyors can be coupled together laterally, transverse to the travel path, to increase number of rows of the load.

In an embodiment, two or more conveyors can be coupled together, in a series with each other along the travel path, at the side members thereof and can be further coupled together laterally, transverse to the travel path, as is best shown in FIG. 25.

In any of the embodiments, the conveyor, indexing device or method can comprise a controller or a control circuit to control operation of the powered device(s) and sensors. The controller or the control circuit can comprise any one of electric components, pneumatic components, hydraulic components and any combination thereof. The selection of control components at least partially depends on the selection of the drive member 130, 190. As been described above, the control circuit for pneumatic or hydraulic drive member 130, 190 comprises at least solenoid valves. It would be understood that in applications with the drive member 130, 190 of electrical type, the control circuit will not comprise valves and will generally comprise relays, motor drivers and other suitable control components.

In any of the embodiments, the force transmitting member 150, being illustrated as a one-piece unitary device pivotally mounted on one side of the movable carrying member can be provided as a pair of members 150, each pivotally mounted on each side of the carrying member 120.

In an embodiment, a conveyor for incrementally advancing or indexing a plurality of rows of loads with a plurality of loads in each row comprises a frame; a powered member coupled to the frame; and a conveyance means for incrementally advancing or indexing the plurality of rows of loads with the plurality of loads in each row. In an example, the conveyance means comprises the braces 70, the brackets 80, the receptacles 100, the carrying members 120, the load supporting members 210 and 220, and the gravity dropout force transmitting members 150 pivotally mounted on the carrying members 120. In an example, the conveyance means comprises the braces 270, the brackets 80, the receptacles 100, a single carrying member 120, a pair of load supporting members 220, and gravity dropout force transmitting members 150 pivotally mounted on the carrying member 120. In an example, the conveyance means comprises chains 322 and gravity dropout force transmitting members 150 pivotally mounted on the chains 322.

In an embodiment, the conveyance system can be configured to fully, or partially, capture with precise placement the load being any one of box, case, container, board, cart, crate, pallet, circuit board, book/bound item (including newspaper), bundle, mold, device, component, wheel, tray, bag/sack, or other ridged or semi-ridged item that can be indexed for a process, timed hold, or general conveyance.

In an embodiment, the conveyance system can be manually operated or automated.

In an embodiment, the conveyance system can use an energy operated source (air, hydraulic, electric, etc.) or can be moved by a person, or other.

In an embodiment, the conveyance can be made out of virtually any materials; wood, aluminum, steel, stainless, steel or other.

In an embodiment, the conveyor is configured to enable a conveyance that can be easily cleaned, easily maintained, with minimal standardized parts, easily disassembled and reassembled for shipment, with sufficient clearances (more than a half an inch near any moving part) to minimize/mitigate safety concerns, while having the ability to accurately place/stage the product in a precise location on every cycle. There are many reasons a product may be in a precise location such as filling a specific ingredient, multiple ingredients and single or multiple stations, time delay (time lapse) to allow for a process to meet thresholds before a next step (heating, cooling, freezing, liquefying, vaporizing, boiling, cooking, culturing, basting, fermenting, etc.), mixing, assembling, welding, soldering, mounting, forming (including box forming or tray forming), threading, attaching/affixing, extraction or removing, cutting, filing, deburring, drilling, milling, applicators, wrapping, banding, strapping, shrink wrapping, bundling, stacking, compacting, gluing, printing, labelling, inflating, deflating, prepping for shipment (packing foam or other) scanning, painting, coloring, cleaning, sanitizing, curing, seasoning, chemical reaction or a variety of other applications.

In an embodiment, the conveyance system can be configured with adjustable legs or feet, with a minimal frame, in this case a tee bar. The adjustable legs or feet allow for floors sloped with drainage, or to set an elevation that is best suited for the end user.

In an embodiment, a frame of the conveyor is simple in design to minimize redundancy in parts, and limits/mitigates interferences which could hinder the serviceability.

In an embodiment, the load supporting member in a shape of a tee bar allows for a suitable surface area for the product or load 2 to travel on without the necessity for a solid top, or near solid top, and allows for clean ability.

In an embodiment, the conveyance system can be adapted with uniform bracketry that allows for multiple options to/for connection to other conveyors, devices or equipment; so the indexing table can be stand alone or interface with other equipment or a table, robot, gripper, or fall/slide/other into a bin/pallet/crate/box or other means of infeed handling or discharge handling. Covers can also be implemented for cylinders or chains, or other devises that need a cover in case of a leak, or ruptured hose or seal, etc.

In an embodiment, a drive system (powered device) can be any one of many device types, such as a hydraulic cylinder, pneumatic cylinder, mechanized chain or mechanized bar (or other stock), servo or any other devise to advance or retract the indexers.

In an embodiment, indexers, or indexing bars, or carrying members attached with a multilane linkage move multiple products linearly or at an incline, vertical, upside down (utilizing a retractable or gravity pusher bar(s), hook(s), magnet(s), vacuum/suction cup(s), or other) with a forward and return or cyclical stroke with a repeatable motion or a variable motion. The indexers can be placed along-side each other to have an overlapping design for the transfer of product, or inline design to push the product over the return position of the next indexing bar in the sequence.

In an embodiment, the indexers can have a single contactor per indexer or multiple contactors per indexer (a contactor would be any means of contacting or conveying the product; retractable or gravity pusher bar, a vacuum/suction cup, a magnet, a hook, or other).

In an embodiment, the conveyance system can be configured with an optional hood to cover the conveyor from dust, overhead dripping, or other airborne items that could cause contamination of the product, or make the product unsuitable. The hood can be configured to span the width and length of the conveyor with a removable piece that bridges from one lanes hood to the adjoining lanes hood, with a built in slope based on a bracket that affixes to the legs of the conveyor. The removable piece can be set into a formed receptacle on the perimeter of the hood, which lifts out for cleaning, and the removable piece also has a formed edge that retains it in the trough. Under hood, lighting/spectrum packages can be also available.

In particular embodiments, the present disclosure provides an apparatus or a machine for processing material or loads 2 that is conveyed by any of the above described embodiments.

In particular embodiments, such machine is a case packer.

In particular embodiments, such machine is a shrink wrap machine.

In particular embodiments, such machine is an oven that is configured to cook or bake, with electrical resistance, dough transported on the conveyors in special bread containers with electrically conductive pans.

The particular embodiments of the present disclosure generally provide apparatus and method for cooking or baking dough with electrical resistance.

In particular embodiments, the apparatus for cooking or baking dough with electrical resistance comprises device(s) configured and operable to connect voltage to container(s) containing dough between a pair of metal pans.

Figure 30:
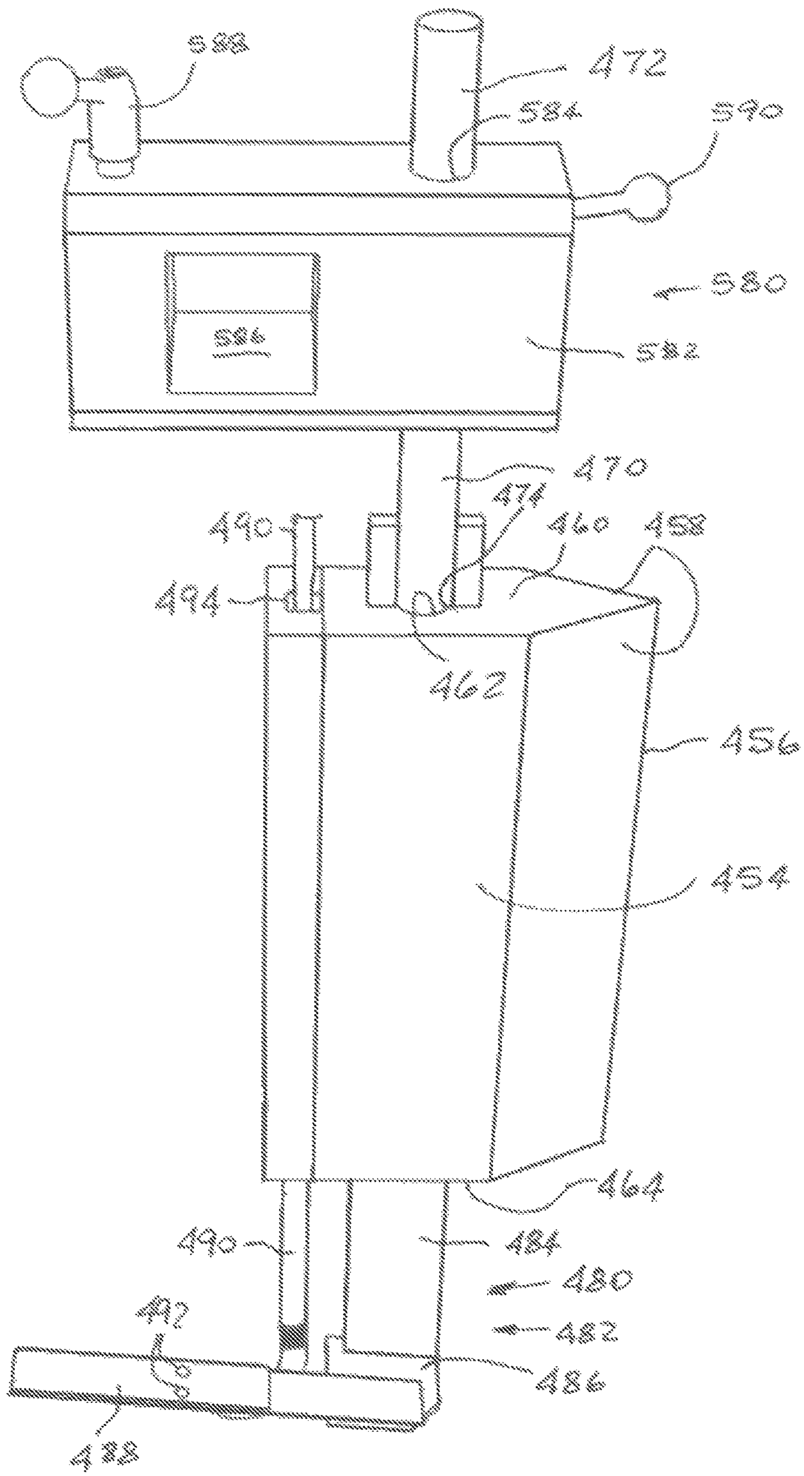
FIG. 30 illustrates a 3-D view of an exemplary device configured and operable to connect voltage to an object.

Now referring to the drawings, FIG. 30 illustrates an exemplary device 450 configured and operable to connect voltage to container(s) containing dough between a pair of metal pans. The exemplary device 450 comprises a body 454. The body 454 can be manufactured from an electrically non-conductive material, for example such as UHMW polyethylene or equivalent. Phenolic material may be also employed herewithin. One edge of the body 454, referenced with numeral 456, may optionally comprise a pair of beveled surface portions 458 converging toward one another to define a generally pointed edge 456 that can be sharp or rounded. The edge 456 can also comprise one or more radii instead of the beveled surface portions 458 or any other surface feature reducing the width of the edge 456 relative to a width of the body 454. A mounting portion 470 extends from a surface 460 of the body 454. The surface 460 may define one end of the body 456 and may be disposed in a plane normal to the plane of the edge 456, although other angular relationships are also contemplated herewithin. The mounting portion 470 can comprise or define an elongated member 472. The elongated member 472 may be partially inserted into a bore 462 in the body 454, the bore 462 being in an open communication with the surface 460. Or, one end 474 of the elongated member 472 can be configured for fastening to the surface 460. The device 450 further comprises an electrically conductive member or an electrode 480 extending from a surface 464 of the body 454. The surface 464 is illustrated as being disposed longitudinally opposite the surface 460 and defines a longitudinally or an axially opposite end of the body 454. The electrode 480 may comprise an L-shaped member 482 having one leg 484 thereof secured to the surface 464 of the body 454 and an electrically conductive portion 488 having one end thereof secured to another leg 486 of the L-shaped member 482. The conductive portion 488 has been illustrated as having a pair of flat surfaces but can be provided in any other shapes.

Wires 490 are connected to the electrode 480, for example at one or more studs 492 and couple or connect the electrically conductive member 488 to a voltage source. The wires 490 may be passed or routed through a through bore 494 in the body 454. The wires may be routed on the exterior surface of the body 454, or even in a separate conduit (not shown).

In an example, the device 450 can be mounted stationary with the object being moved in to the operative position, for example by way of a conveyor, for example such as any of the above described conveyors.

In an example, the device 450 can be mounted for a movement in a respect to a stationary object.

In an example, the device 450 can be mounted for a movement in a respect to a movable object.

In particular embodiments, the apparatus for cooking or baking dough with electrical resistance comprises an oven integrated into a conveyor line.

In particular embodiments, the apparatus for cooking or baking dough with electrical resistance comprises an oven integrated into a production line.

In particular embodiments, the apparatus for cooking or baking dough with electrical resistance comprises an oven that is configured to cook or bake multiple batches of dough.

The oven can be also referred to as a machine for cooking or baking dough with electrical resistance.

Now referring to the drawings, FIGS. 31-34 illustrate and exemplary embodiment of the apparatus 500 configured and operable to cook or bake dough with electrical resistance. The apparatus 500 can be also referred to as an oven. The apparatus 500 can be also referred to as an electrical resistance oven.

The exemplary oven 500 of FIGS. 31-34 comprises a frame 508 and the above described devices 450 configured and operable to connect voltage to an object or load. In an example, as will be explained further in this document, such object can be a container. More specifically, such container can be a container assembly 600 or a bread box with a pair of metal pans and containing dough between the pair of metal pans to be cooked by way of electrical resistance. The container assembly 600 is described further in this document.

Figure 33:
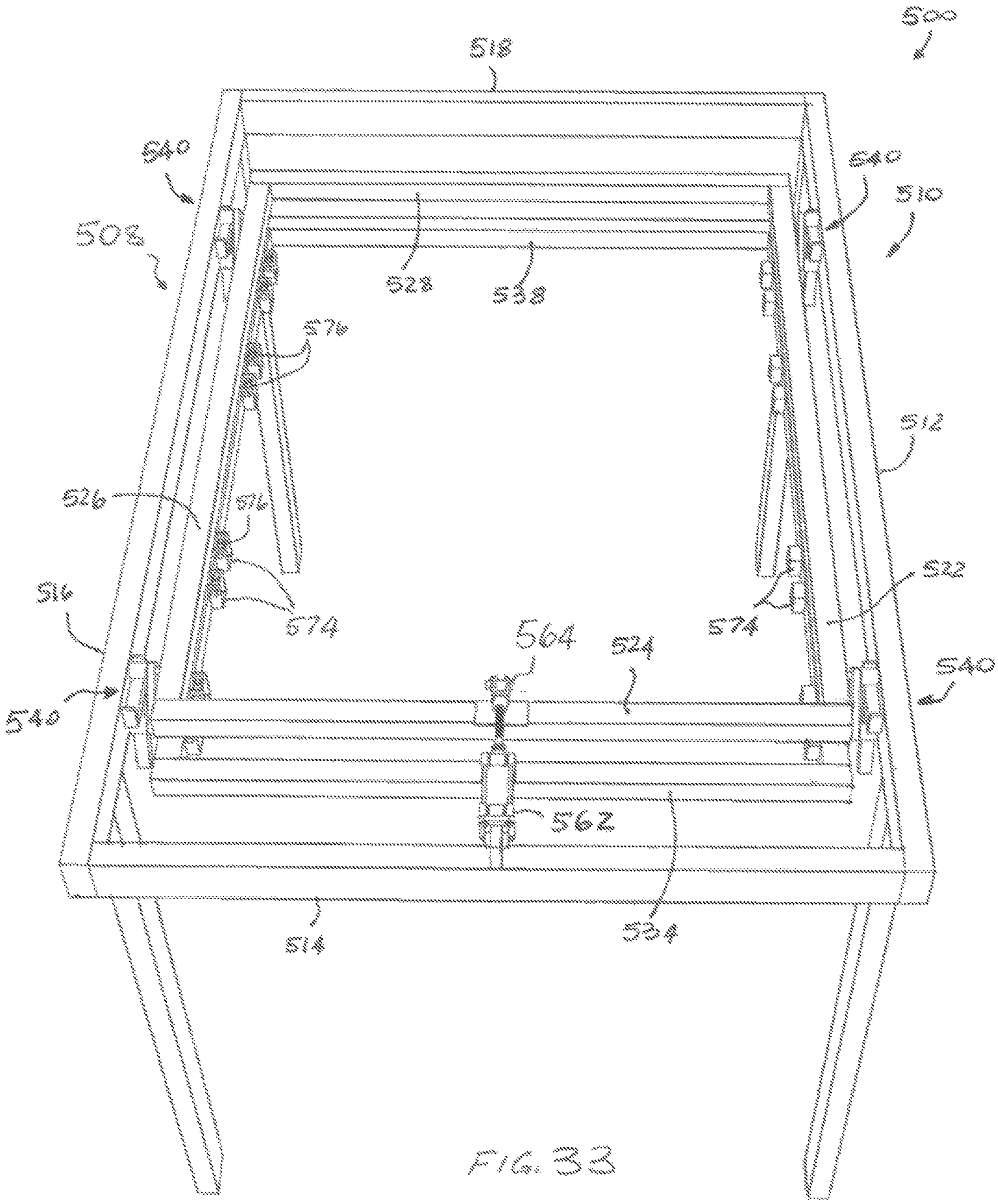
FIG. 33 illustrates a 3-D view of an exemplary frame and lifting device employed within the apparatus of FIGS. 31-32.
Figure 34:
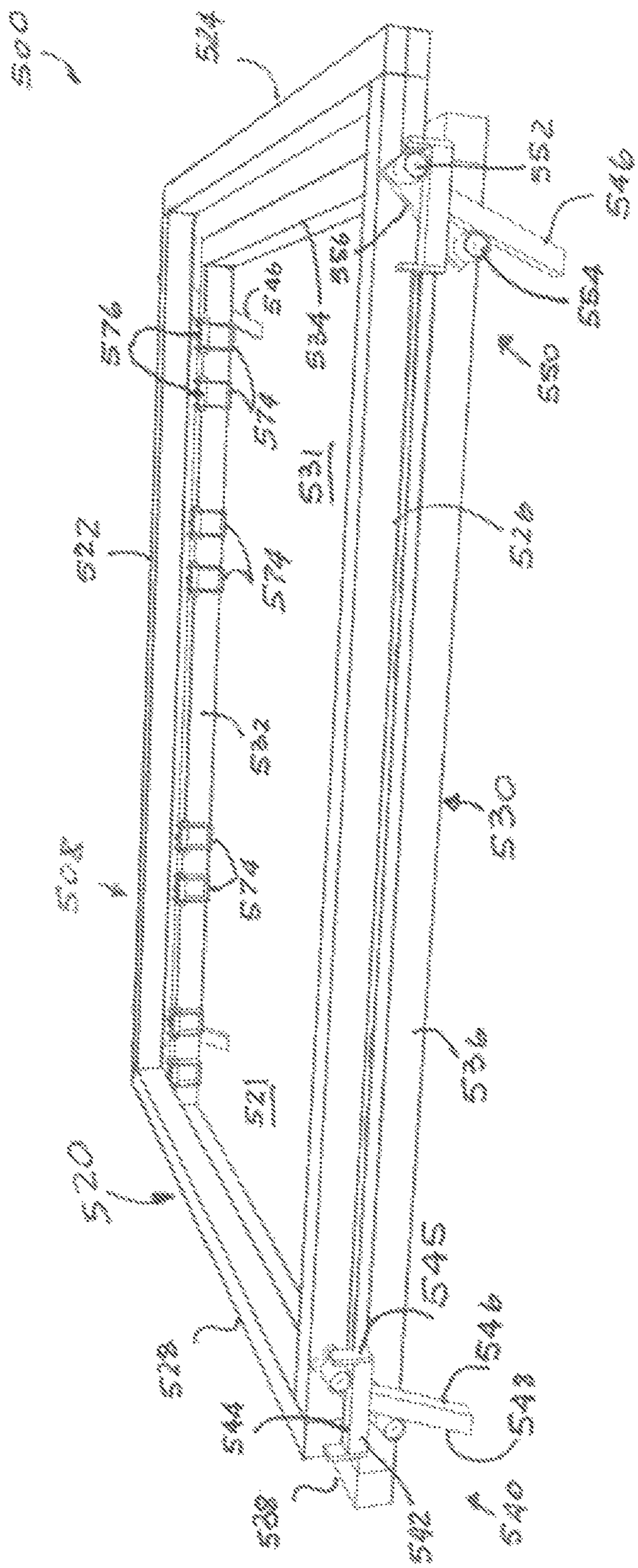
FIG. 34 illustrates a 3-D view of the frame of FIG. 33.

The exemplary frame 508 is best shown in FIGS. 33-34. The exemplary frame 508 is configured and operable to mount and move the above described device(s) 450. The exemplary frame 508 comprises a first frame 510. The first frame 510 is configured as a stationary frame during use or after assembly of the apparatus 500. The first frame 510 has a hollow interior 511 defined by peripheral members 512, 514, 516 and 518, all rigidly affixed therebetween by welding, adhesives or fastening. Such peripheral members 512, 514, 516 and 518 may be provided as hollow tubular members to reduce weight of the first frame 510. Such peripheral members 512, 514, 516 and 518 may be disposed coplanar (i.e. in the same plane) with each other. The first frame 510 may further comprise two or more optional legs 519 that are generally positioned vertically to support the peripheral members 512, 514, 516 and 518 in the generally horizontal plane during use of the apparatus 500.

The exemplary frame 508 also comprises a second frame 520. The second frame 520 also has a hollow interior 521 defined by peripheral members 522, 524, 526 and 528, all rigidly affixed therebetween by welding, adhesives or fastening. The second frame 520 can be sized and shaped to fit within the hollow interior 511 of the first frame 510 during use of the apparatus 500. Such peripheral members 522, 524, 526 and 528 may be provided as hollow tubular members to reduce weight of the second frame 520. Such peripheral members 522, 524, 526 and 528 may be disposed coplanar (i.e. in the same plane) with each other. As it will be explained later, the second frame 520 is mounted for a movement in a generally horizontal plane during use of the apparatus 500.

The exemplary frame 508 also comprises a third frame 530. During use of the apparatus 500, the third frame 530 is positioned below the second frame 520. The third frame 530 also has a hollow interior 531 defined by peripheral members 532, 534, 536 and 538 rigidly affixed therebetween by welding, adhesives or fastening. The third frame 530 can be sized and shaped to fit within the hollow interior 511 of the first frame 510. The third frame 530 may be sized generally equally to the second frame 520. Such peripheral members 532, 534, 536 and 538 may be provided as hollow tubular members to reduce weight of the third frame 530. Such peripheral members 532, 534, 536 and 538 may be disposed coplanar (i.e. in the same plane) with each other. As it will be explained later, the third frame 530 is mounted for a movement in both generally horizontal and generally vertical planes during use of the apparatus 500.

Figure 32:
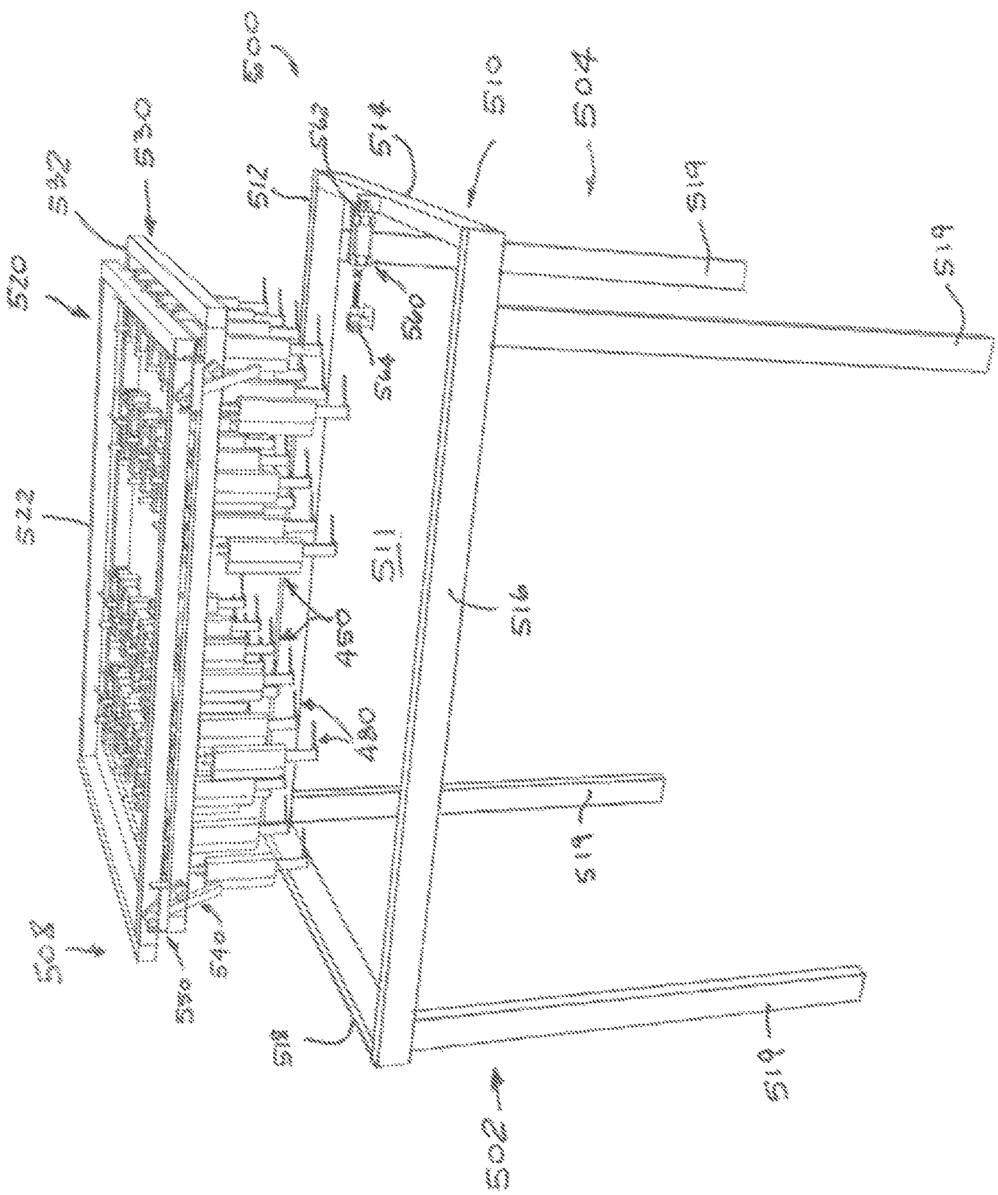
FIG. 32 illustrates an exploded 3-D view of the exemplary apparatus of FIG. 31.

The first, second and third frames, 510, 520 and 530, respectively, are interconnected therebetween during use or after assembly of the apparatus 500 in the following manner. Slide or track assemblies 540, best shown in FIGS. 32 and 34, are provided. Four slide or track assemblies 540 have been illustrated, which each slide assembly 540 positioned adjacent a respective corner of the first frame 510. Each slide or track assembly 540 comprises a first member 542 with a working surface 544. First member 542 is stationary mounted on the interior of the first frame 510 and, more particularly on an interior surface of the opposite peripheral members, referenced with numerals 512 and 516. Such working surface 544 is positioned generally horizontally during use of the apparatus 500. The first member 542 is adapted with a pair of end stops 545 extending above the working surface 544. Each slide or track assembly 540 also includes a second member 546 with the working surface 548 that is disposed at an angle or inclined relative to the working surface 544. The second member 546 is rigidly and stationary coupled to the first member 544 and/or the first frame 510, for example by a welding method or being manufactured with the first member 542 as a one-piece member, for example by a casting or molding process. Carriages 550 are also provided. Each carriage 550 comprises a first roller 552 that is rotatably affixed on the exterior of the second frame 520 and is adapted to roll on the working surface 544 during use of the apparatus 500. A second roller 554 is rotatably affixed on the exterior of the third frame 530 and is adapted to roll on the working surface 548 during use of the apparatus 500. Each carriage 550 also comprises a link 556 that is coupled to the first and second rollers, 552 and 554 respectively, so that both first and second rollers, 552 and 554 respectively, rotate on the link 556 and have to move together during operation of the apparatus 500.

In a further reference to FIGS. 31-34, the exemplary apparatus 500 further comprises a powered mover 560. Such powered mover 560 is configured to generate a linear motion. Such powered mover 560 can be for example a hydraulic or pneumatic cylinder, that has a piston end 562 affixed to the first frame 510 and has a rod end 564 thereof affixed to the second frame 520. One or both of the piston end 562 and rod end 564 can be affixed in a pivotal connection. The powered mover 560 is illustrated as being attached at the outlet end of the apparatus 500. FIG. 32 illustrates position of the second frame 520 and the third frame 530 prior to actuation of the powered mover 560. FIG. 34 illustrates position of the second frame 520 and the third frame 530 after actuation of the powered mover 560. During operation of the apparatus 500, the powered mover 560 is actuated to move the second frame 520 in a horizontal direction. In a particular reference to FIG. 34, such movement of the second frame 520 causes the first roller 552 to move horizontally on the working surface 544 from left to right and further causes the second roller 554 to move upwardly on the inclined working surface 548. The movement of the second roller 554 causes the movement of the third frame 530 in both horizontal and vertical directions. The third frame 530 is configured to move upwardly toward the second frame 520. When the powered mover 560 is deactuated, the first roller 552 moves from right to left in FIG. 34 into the position shown in FIG. 32 causing the third frame 530 to move downwardly away from the second frame 520.

In other embodiments, the powered mover 560 can be also an electrically powered drive. In an example, such electrically powered drive can be a solenoid. In an example, such electrically powered drive can comprise a screw and nut components, with the nut being connected to the second frame 520 and translating on the screw. In an example, such electrically powered drive could be of a magnetic rack and pinion type with the pinion rotatably mounted on the first frame 510 and the rack mounted stationary on the second frame 520.

Figure 31:
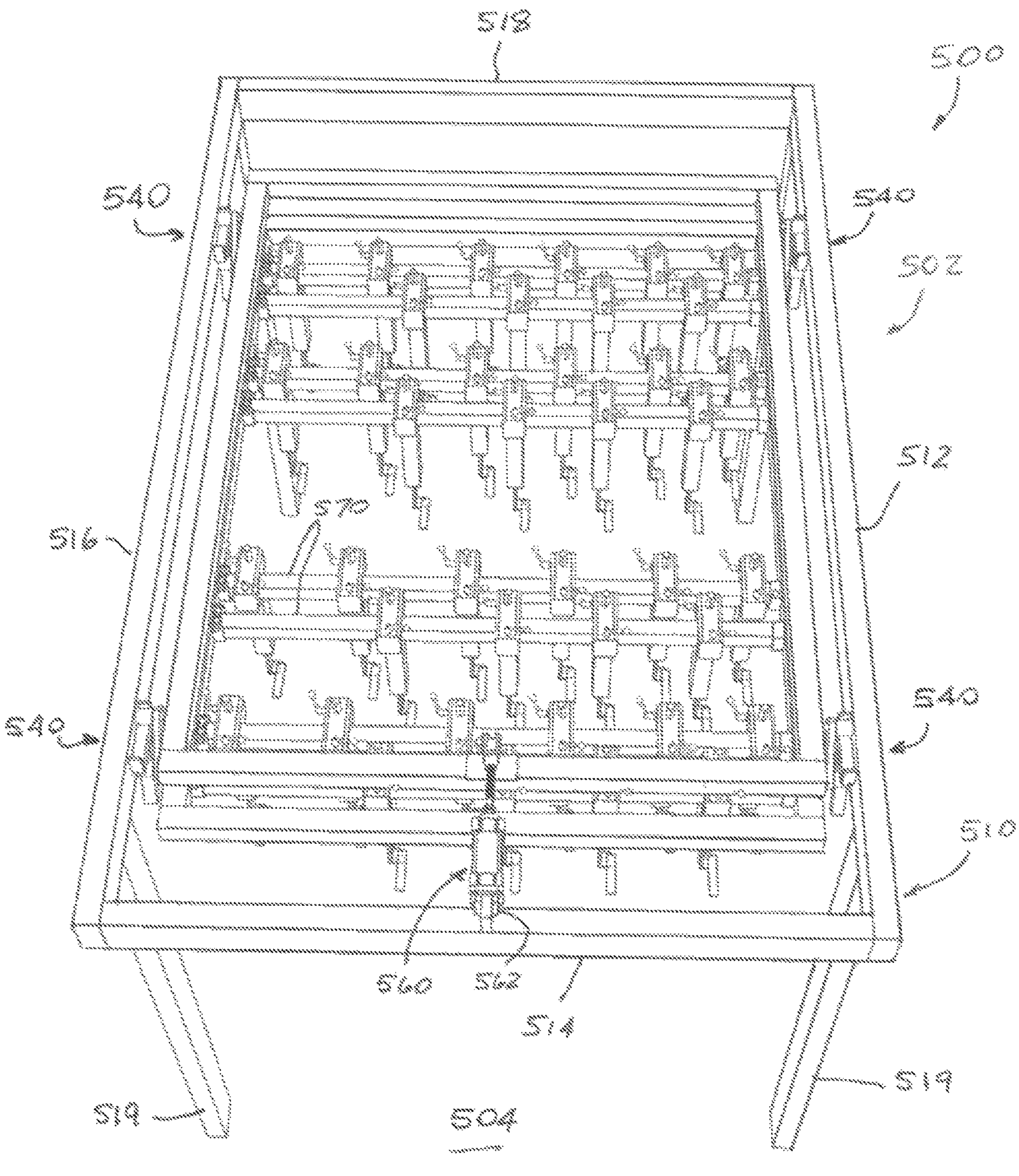
FIG. 31 illustrates a 3-D view of an exemplary apparatus configured and operable for cooking or baking dough.

In a further reference to FIGS. 30-32, the exemplary apparatus 500 comprises the above described device(s) 450 that are connected to the third frame 530 and that move in both the horizontal and vertical directions or planes during movement of the second frame 520 and the third frame 530. The devices 450 are provided in pairs, with one device 450 configured to connect a positive voltage and the second device 450 configured to connect a negative voltage. The number of pairs of devices 450 depends on the number of individual container/dough batches to be baked or cooked at one time.

To attach or couple the devices 450, the apparatus 500 is adapted with rails 570 and brackets 574. As is best shown in FIGS. 33-34, each bracket 574 is configured as a U-shaped bracket and is affixed rigidly to a peripheral member of the third frame 530. A pair of brackets 574 is affixed to opposite peripheral members of the third frame 530, referenced with numerals 532 and 536 and are aligned therebetween to receive ends 572 of one rail 570. The brackets 574 are illustrated as being attached to interior opposite surfaces of the peripheral members 532 and 536 of the third frame 530, planar with the third frame 530, but can be also mounted lower or higher. An optional locking member 576 can be provided to engage each bracket 574 so as to cage the end 572 and prevent unintentional disengagement of the end 572 from a respective bracket 574 during use of the apparatus 500. The locking member 576, when provided, is configured to be easily removed from the bracket 574 for insertion or removal of the rail 570.

Further, apparatus 500 comprises clamping members or means that are configured to affix, in a stationary manner, each device 450 to the rail 570. In an embodiment, such clamping member can be the exemplary clamping member 580 that comprises a body 582, a first bore 584 sized and shaped to receive the mounting portion 470 therethrough, a second bore 586 oriented in a direction generally normal to a direction of the first bore 584, a first clamp 588 configured to secure the mounting portion 470 received within the first bore 584 and a second clamp 590 configured to secure the clamping member 580 to the rail 570 passed through or received within the second bore 586. The first clamp 588, when actuated, prevents movement of the device 450 in a vertical direction. The second clamp 590, when actuated, prevents movement of the device 450 along a length of the rail 570. During assembly of the apparatus 500, the clamping member 580 can be clamped onto the device 450 first and the rail 570 second or vise-versa. In an embodiment, the clamping member can be permanently attached to the mounting portion 470, eliminating a need for at least the first clamp 588. In an example, the body 582 and the mounting portion 470 can be provided as a unitary member by a casting or molding process. In an embodiment, the clamping member 580 can be provided integral with the rail 570 eliminating at least a need for the second clamp 590. In an example, the body 582 can be provided as abutment(s) on the rail 570 and machined and assembled to incorporate the first bore 584 and first clamp 588.

Now in reference to FIGS. 35-36, therein is illustrated the exemplary apparatus 500 being configured to cook or bake dough in containers transmitted on a conveyor 10 that is positioned below the second and third frames, 520 and 530 respectively. The conveyor 10 can be adapted for attachment to the first frame 510 or the previously described frame 20 can be adapted to also function as the first frame 510. The conveyor 10 in this embodiment can be provided with the kickback device 180 when the outlet or discharge end 504 is positioned adjacent another conveyor configured to move container assemblies 600 with cooked or baked dough in a direction normal to the pathway 506. The conveyor 10 in this embodiment can be provided without the kickback device 180 when the outlet or discharge end 504 is positioned adjacent another conveyor 10 configured to move container assemblies 600 with cooked or baked dough in a direction along to the pathway 506, for example to allow the cooked or baked dough to cool or settle prior to changing travel direction.

Figure 35:
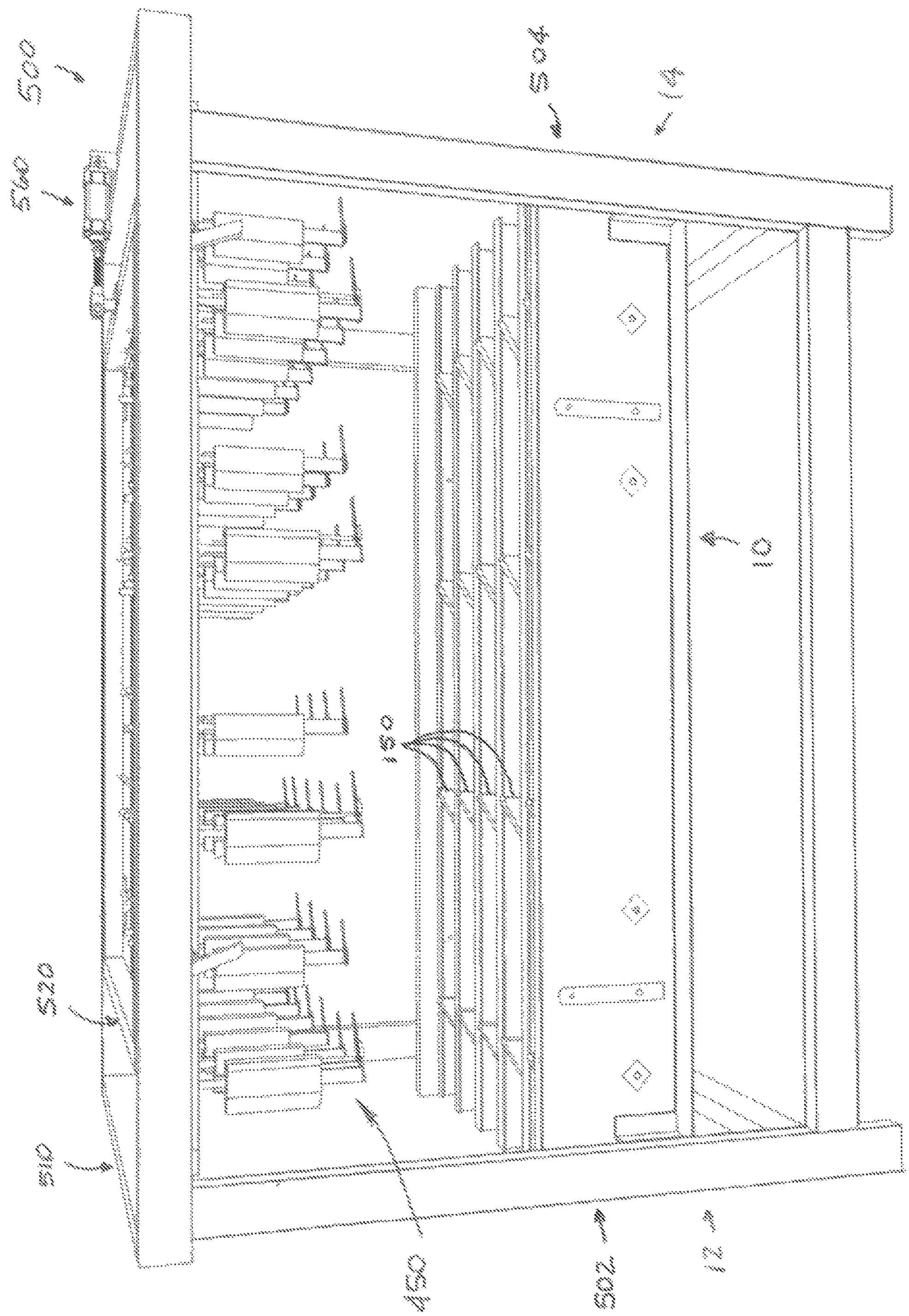
FIG. 35 illustrates a side perspective view of the apparatus of FIGS. 31-34 in a combination with the devices of FIG. 30 and conveyor of FIGS. 1-15 configured to transport or convey container assemblies for cooking or baking dough.
Figure 36:
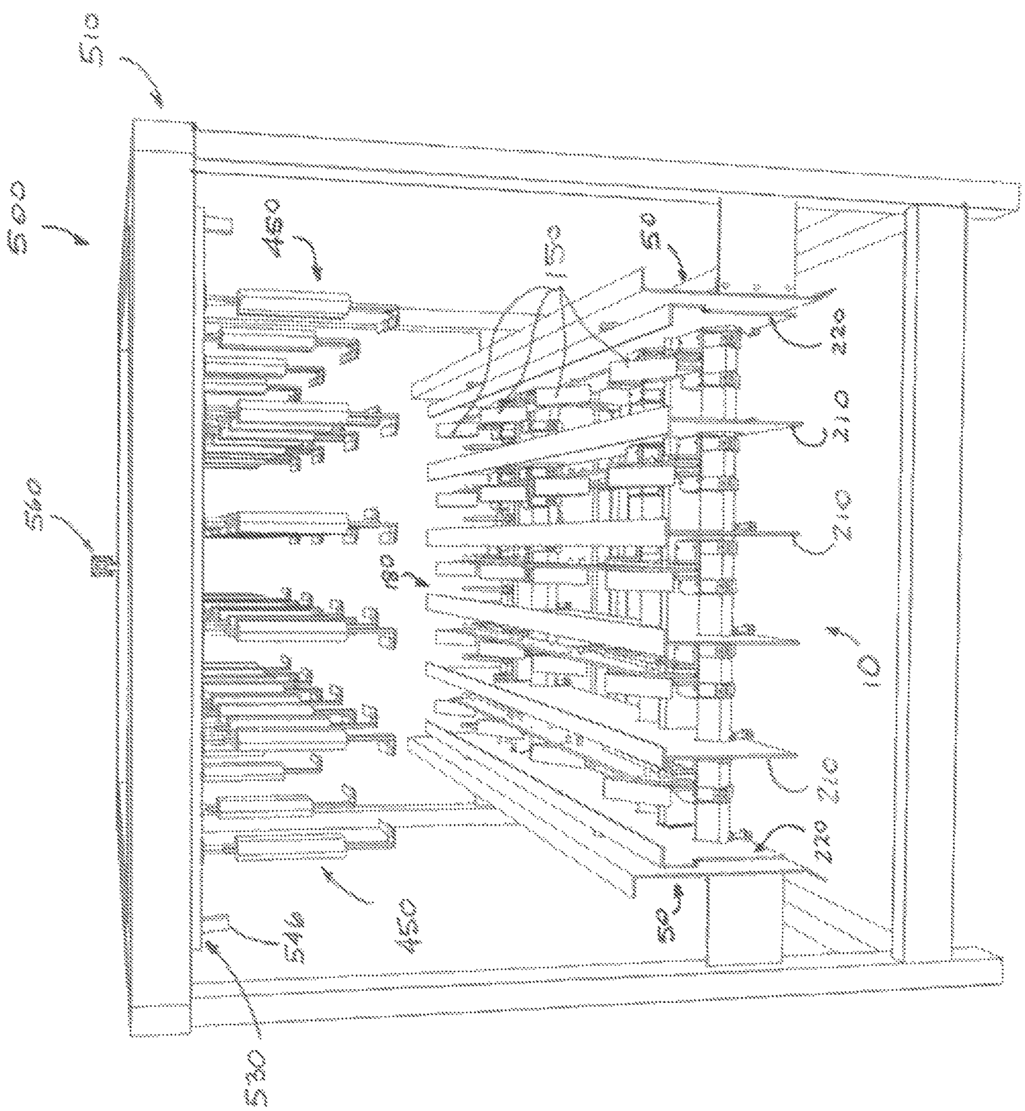
FIG. 36 illustrates an end perspective view of the apparatus of FIG. 35.
Figure 38:
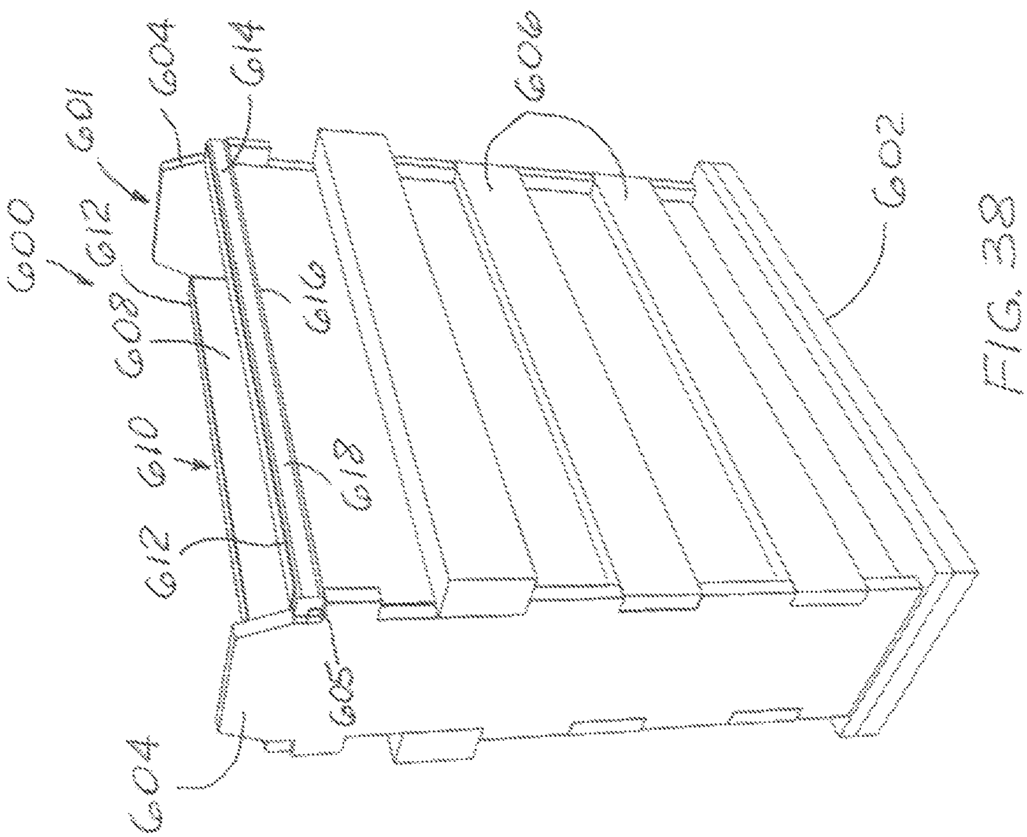
FIG. 38 illustrates a side 3-D view of the container assembly for cooking or baking dough of FIG. 37.
Figure 37:
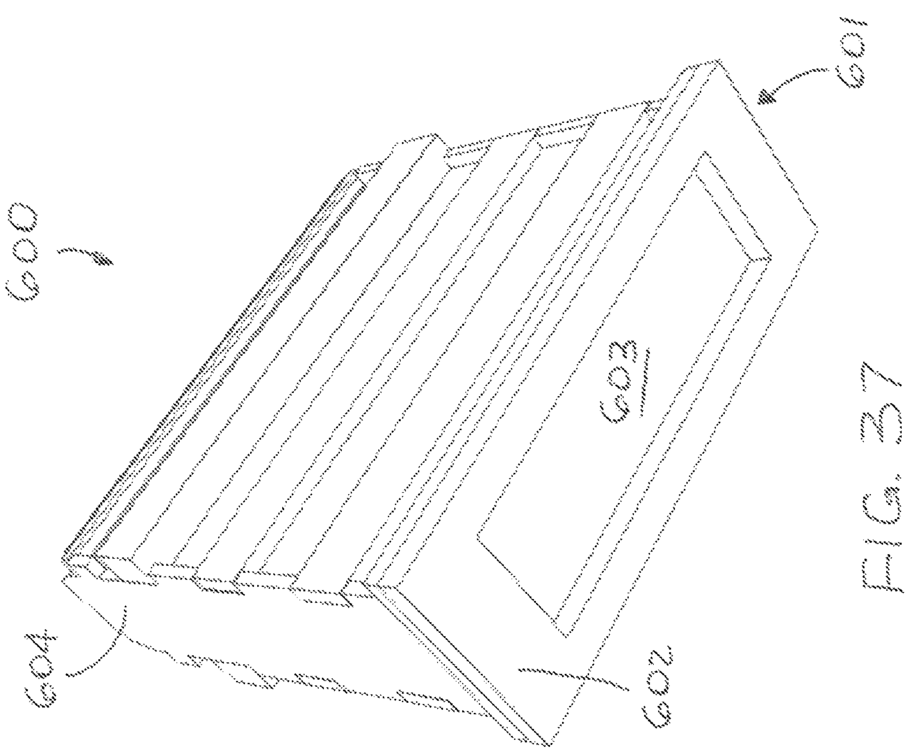
FIG. 37 illustrates a bottom 3-D view of a container assembly for cooking or baking dough.
Figure 40:
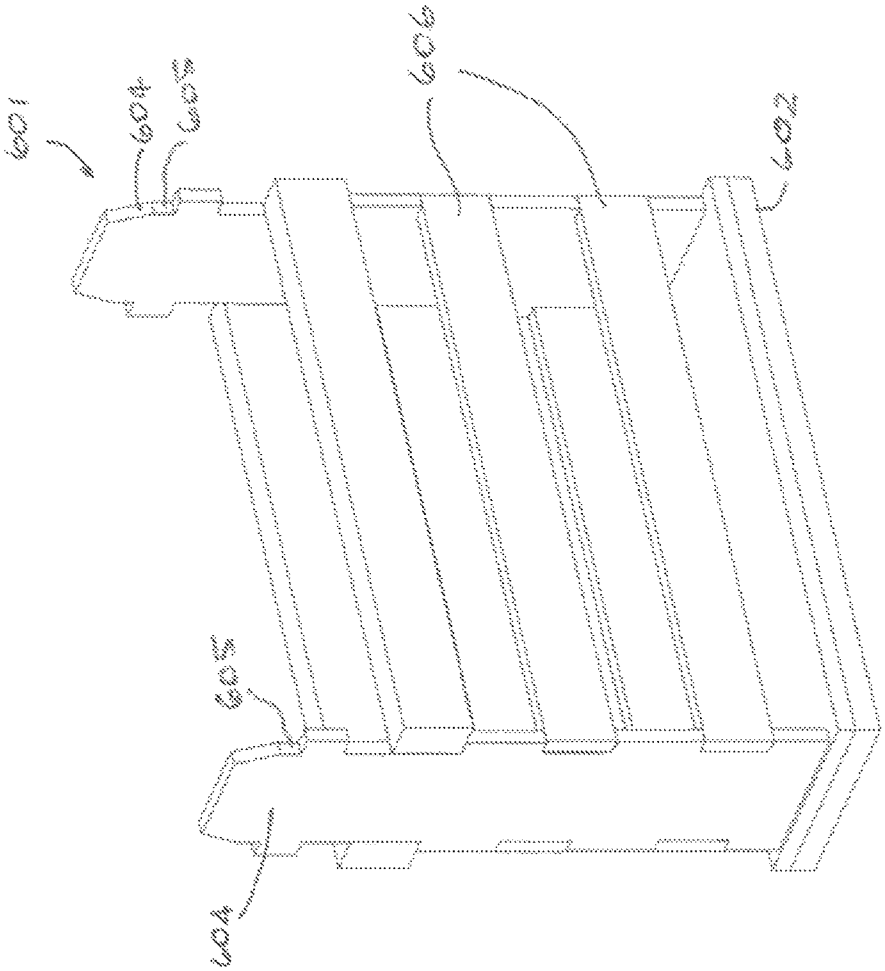
FIG. 40 illustrates a side 3-D view of a container employed in the container assembly for cooking or baking dough of FIGS. 37-39.
Figure 39:
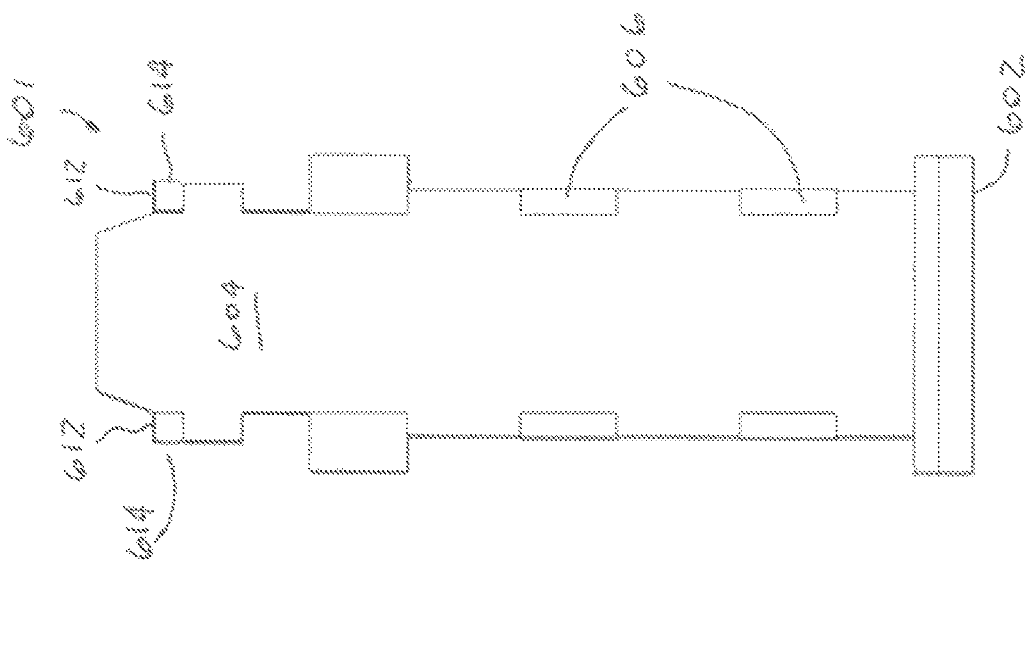
FIG. 39 illustrates an end view of the container assembly for cooking or baking dough of FIG. 37.
Figure 42:
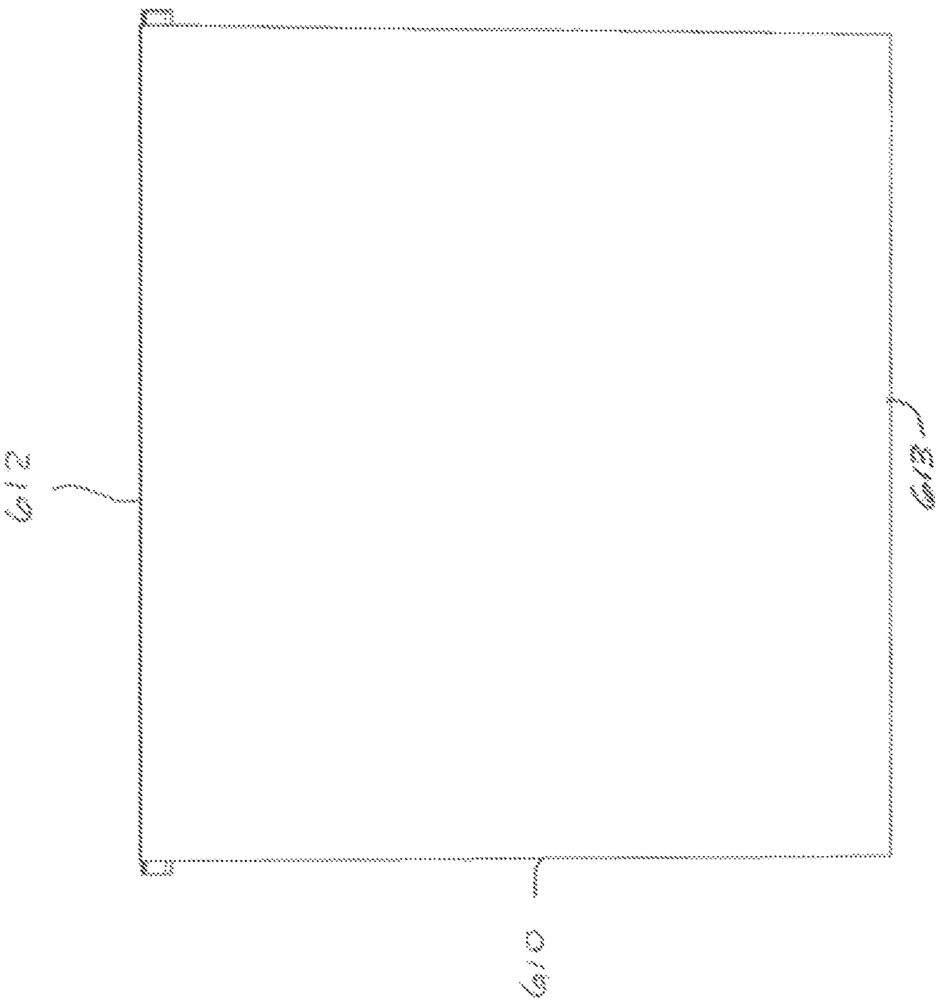
FIG. 42 illustrates an end view of the pan of FIG. 41.
Figure 41:
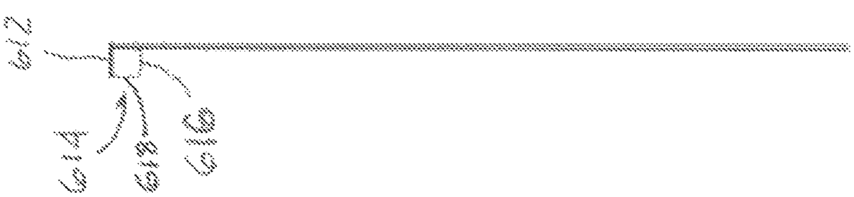
FIG. 41 illustrates a side view of a pan employed in the container assembly for cooking or baking dough of FIGS. 37-41.

Furthermore, the embodiment of FIGS. 35-36 provides the exemplary apparatus 500 being configured for cooking or baking twenty (20) individual containers with dough, positioned in four rows with each row containing five containers. However, the width of the apparatus 500 can be adjusted to accommodate a different quantity of the containers, even to accommodate a single row of containers. In other words, the apparatus 500 can be configured in a combination with the above described conveyor 200. Furthermore, a length of the apparatus 500 can be adjusted to accommodate a single container. In other words, in its minimum form, the apparatus 500 can be configured to cook or bake a single batch of dough.

It is contemplated herewithin that the apparatus 500 can employ various conveyor types. In an embodiment, the conveyor can be a conventional belt or roller type conveyor. In an embodiment, the conveyor can be of an indexing type conveyor so as to incrementally advance the containers from the inlet end 502 of the apparatus 500 to the outlet or discharge end 504 thereof. In an embodiment, the indexing conveyor can be of a bi-directional ratchet conveyor type as disclosed in U.S. Pat. No. 5,320,212 issued to McIntosh et al. on Jun. 14, 1994 and whose teachings are incorporated in its entirety by reference.

In any of the conveyor embodiments, the conveyor is configured to move each container into a position under a pair of devices 450, with one device 450 from the pair of devices 450 connecting positive voltage and another device 450 from the pair of devices 450 connecting negative voltage.

It is not necessary that a length of the conveyor between the inlet end 502 and the outlet end 502 be equal to the length of the frame 508. In other words, the length of the conveyor can be smaller or greater than the length of the frame. It is also contemplated that ends of two distinct conveyors can abut each other within the frame 508. In other words, the conveyor has to be at least partially positioned within the frame 508. The conveyor can be provided as integral to the apparatus 500 or can be provided as a component of a production line with the apparatus 500 being operatively positioned for alignment with the container assemblies 600.

FIGS. 37-42 illustrate an exemplary embodiment of a container assembly 600 that can be used with the apparatus 500 for the purpose of cooking or baking dough. Such exemplary container assembly 600 comprises a container 601 with a bottom member 602, defining a closed end of the container 601, first members 604 upstanding on the bottom 602, at each end thereof, and defining closed ends of the container 601. The bottom member 602 may have an optional exterior void 603. Second members 606 are also provided and define partially open sides of the container 601. Each second member 606 is being rigidly connected at each end thereof to an edge of a respective first member 604. The second members 606 are being disposed in a spaced apart relationship with each other. The second members 606 can be of varying sizes. The container 601 is manufactured from or comprises a non-electrically conductive material. The container assembly 600 further comprises two pans 610, best shown in FIGS. 41-42, that are positioned during use at the opposing sides of the container 601. The pans 610 are sized to cover the partially open sides of the container 601 and define a hollow interior 608 that receives dough to be baked or cooked. Each pan 610 is manufactured from an electrically conductive material and is adapted with one or more flanges 612. A bottom edge of the pan 610 can be smaller than the edge with the one or more flanges 612 for ease of insertion into the container 601, particularly by robotic devices (not shown). In other words, the sides of the pan 610 are tapered toward the bottom edge 613. It will be understood that the container 601 can be configured to taper complimentary to the tapers of the pan 610. The container assembly 600 also comprises two electrodes or electrically conductive members 614. Each electrode 614 is disposed, during use, in a direct contact with a respective pan 610 and defines a generally unobstructed bottom surface 616 and a side surface 618. In an example, the electrode 614 can be manufactured from or comprise a copper or an aluminum material. The electrode 614 can comprise tubular or solid cross-section. The electrode 614 can be welded or spot-welded to the flange 612 or affixed by other mechanical means, for example such as crimping or staking. The electrode 614 can be also caged within the container assembly 600 between the flange 612 and a notch 605 in the first member 604. In an embodiment, the electrode 614 can comprise the flange 612 adapted with two additional flanges 616 and 618 to define a tubular shape of the electrode 614. During use, each electrode 614 conducts or connects voltage to a respective pan 610.

FIGS. 43-46 illustrate operation of the apparatus of FIGS. 30-36 in a combination with the conveyor 10 of FIGS. 1-15 and the container assembly 600 of FIGS. 37-42.

Figure 43:
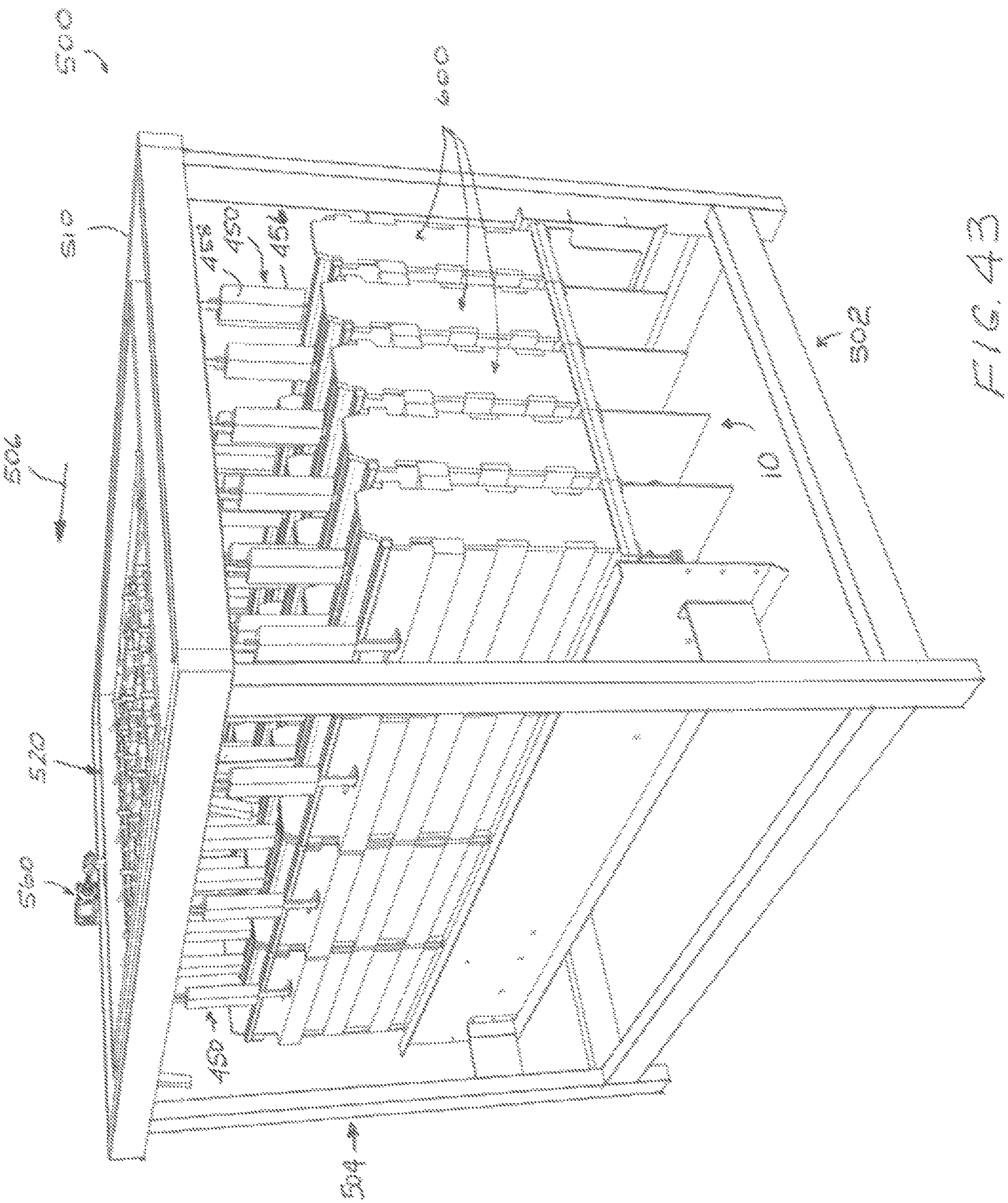
FIG. 43 illustrates a 3-D view of the apparatus of FIGS. 30-36 in a combination with the conveyor of FIGS. 1-15 and the container assemblies of FIGS. 37-42.

As is shown in FIG. 43, the exemplary apparatus 500 is configured to process 20 containers 600 simultaneously with each other. In general, the number of container assemblies 600 depends on the length of the time that dough needs to be cooked or baked and desired production output. The container assemblies 600 are moved by the conveyor 10 into the positions under the devices 450 from the inlet end 502 along the flow path 506. During movement of the container assemblies 600 each force exerting member 150 engages an edge of the void 603 in the closed bottom member 602 of the container 601 and incrementally pushes the container assembly 600 in a flow direction 506 due to operation of the powered member 130. When the stroke of the powered member 130 is completed, the direction of the powered member 130 is reversed, by a control unit 286, and the force exerting members 150 travel opposite the flow path 506 pivoting downwardly under the unvoided portions of the closed bottom 602.

The length or height of the body 454 can be sized such that the bottom surface 464 is disposed below the top of the container 600. The edge 456 on each device 450 can be also positioned to face the inlet end 502 or in a direction opposite to the flow path 506. The tapered surfaces 458 then easily accommodate variances in the spacing between a pair of adjacent container assemblies 600 due movement of the container assemblies 600 due to motion of the conveyor 10, 200 and at least prevent if not eliminate collision of the container assemblies 600 with the devices 450 during movement along the flow path 506.

Figure 44:
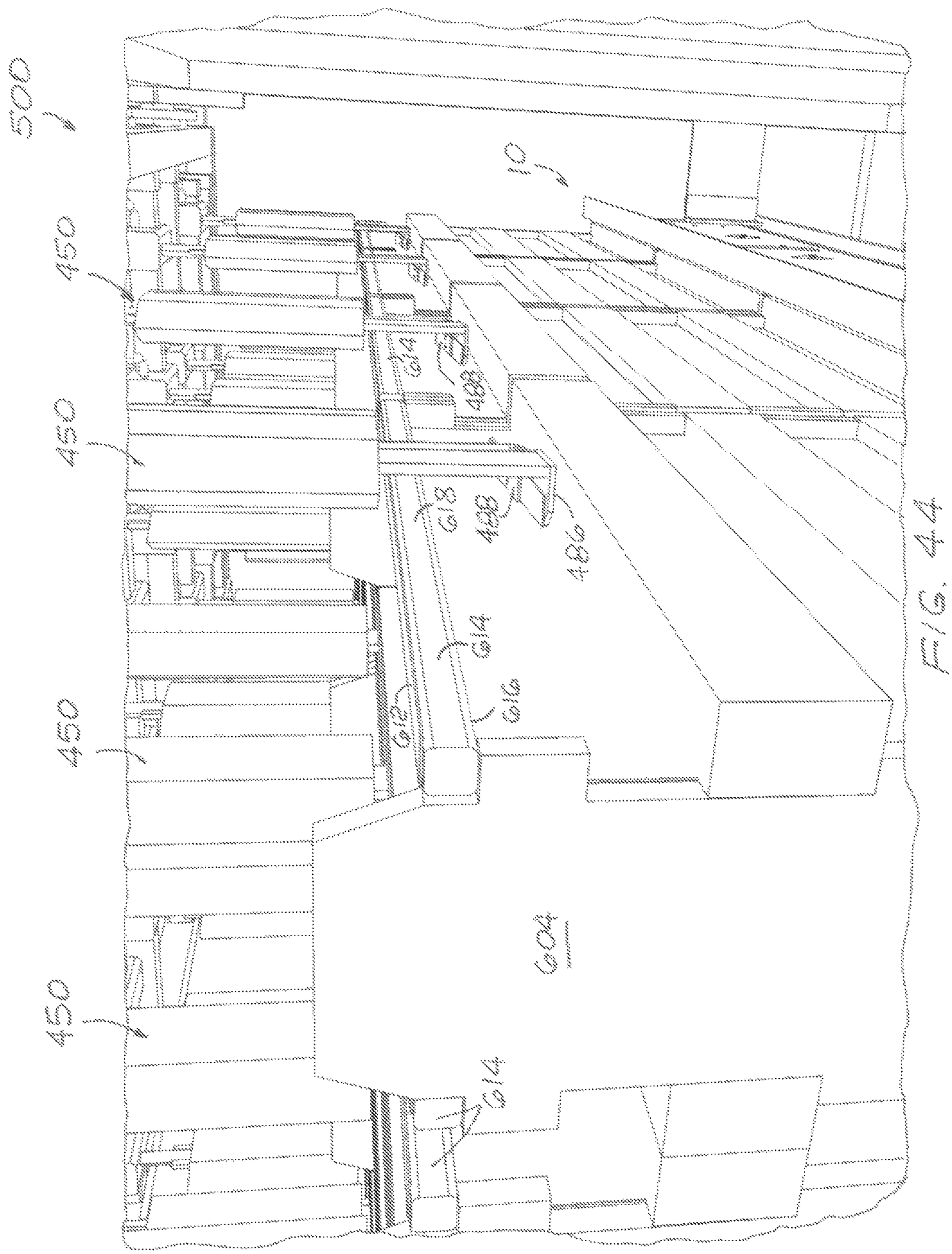
FIG. 44 illustrates a partial enlarged 3-D side view of the apparatus of FIGS. 30-36 in the combination with the conveyor of FIGS. 1-15 and the container assemblies of FIGS. 37-42.
Figure 45:
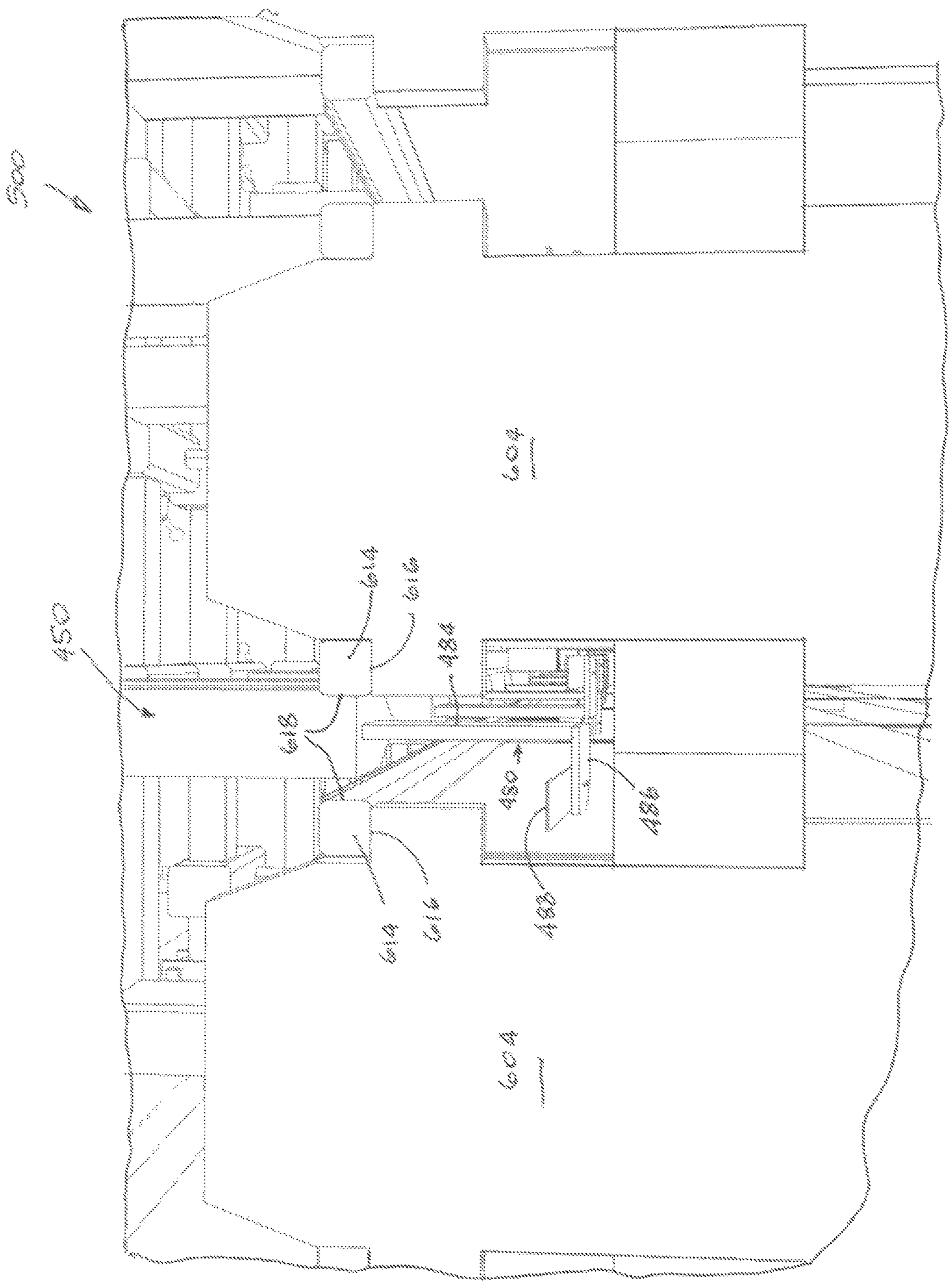
FIG. 45 illustrates a partial enlarged perspective end view of the apparatus of FIGS. 30-36 in the combination with the conveyor of FIGS. 1-15 and the container assemblies of FIGS. 37-42.
Figure 46:
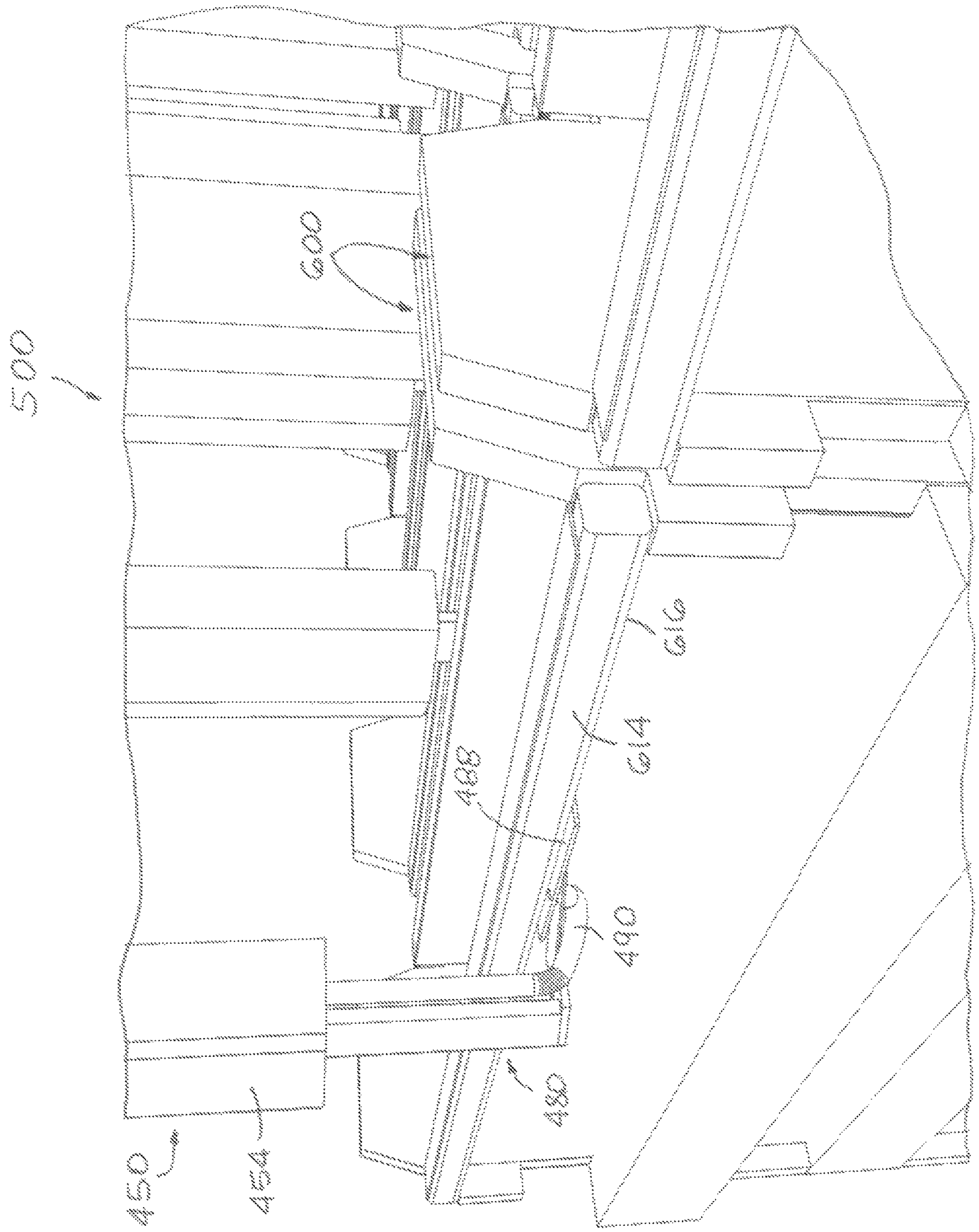
FIG. 46 illustrates a partial enlarged 3-D side view of the apparatus of FIGS. 30-36 in the combination with the conveyor of FIGS. 1-15 and the container assemblies of FIGS. 37-42.

FIG. 44 illustrates a partial 3-D side view of the apparatus of FIGS. 35-36. FIG. 45 illustrates a partial perspective end view of the apparatus of FIGS. 35-36. FIG. 46 illustrates a partial 3-D side view of the apparatus of FIGS. 35-36.

In a further reference to FIGS. 43-45, as container assemblies 600 move in respect to the devices 450, the electrodes 488 are spaced a distance, in a vertical direction, from the electrodes 614. The distance is sufficient to allow unobstructed movement of the container assemblies 600.

When the container assembly 600 is being positioned within the frame 508 of the apparatus 500, by way of the conveyor 10, and aligned with a respective pair of devices 450, the electrodes 488 do not contact the pans 610 and, more particularly, with the electrodes 614. When the positioning or alignment is completed, the powered member 560 is actuated to extend the rod end 564 and lift the third frame 530. Lifting movement of the third frame 530 causes the lifting movement of the devices 450 and further causes a contact between the electrode 480 and a bottom surface 616 of the electrode 614 of a respective pan 610, as is best shown in FIG. 46.

When the electrodes 488 are in a direct contact with the electrode, 614, the voltage is supplied to each electrode 488 through wires 490 and subsequently to the pans 610 through electrodes 614, initiating the cooking or baking process. Thus, when two electrodes 488 connect voltages of different polarities to opposing pans 610, the electrical resistance is generated and passed through the dough, thus enabling baking or cooking thereof. After the dough has been sufficiently basked or cooked, as determined by the dough type, the powered mover 560 is actuated so that the movable portion 564 thereof moves in an opposite direction (opposite of the flow path 506), causing the downward movement of the electrodes 488 and disengagement of the electrodes 488 from the electrodes 614. The container assemblies 600 are now allowed to be moved, by way of the conveyor 10, to and through the outlet or discharge end 504 and the new batch of the container assemblies 600 is moved into the positions underneath or below the devices 450 from the inlet or intake end 502. It must be noted that the voltage can be supplied continuously to the electrodes 488, particularly when the containers 601 are manufactured from an electrically non-conductive material. During cooking or baking process, the dough can rise above the flange 612 and accumulate on the surface thereof. This condition does not affect the operation of the electrodes 488 that contact the container assembly 600 at the surface 616, which is opposite, in a vertical direction, from the surface of the flange 612. This overcomes problems of existing methods where the electrode contacts the top flange that may be covered, partially or completely, with risen dough. If the dough covers a portion of the top flange where the electrode is configured to contact it, the electrode may not establish required contact with the flange, thus resulting in an inconsistent cooking or baking of the dough. In other words, the electrode when contacting the top surface of the flange may have to press through the dough acting as an electrical insulator. Contact of the electrode 488 with the bottom surface 616 of the electrode 614 overcomes this problem. Thus, even when the dough overflows the flange 612 and drips down along the vertical surface 618 of the electrode 614, the contact quality or electrical continuity between the electrode 488 and the surface 616 is unaffected. Contact of the electrodes 488 with a bottom surface 616 of the electrode 614 overcomes disadvantages of electrodes contacting the top surface of the flange 612 that may be covered, either partially or completely, with dough.

In an embodiment, the subject matter provides a device 450.

In an embodiment, the subject matter provides an apparatus 500.

In an embodiment, the subject matter provides an apparatus 500 with a conveyor that can be a conveyor 10 or 200.

In an embodiment, the subject matter provides a container assembly 600.

In an embodiment, the subject matter provides an apparatus 500 with a conveyor, that can be a conveyor 10 or 200, and container assemblies 600.

In an embodiment, an apparatus for cooking or baking dough comprises a first frame mounted stationary and having a hollow interior; a second frame mounted for a movement in a generally horizontal plane and being sized and shaped to fit within the hollow interior of the first frame; a third frame mounted for a movement in a generally horizontal plane and in a generally vertical plane, the third frame being sized and shaped to fit within the hollow interior of the first frame; a powered mover configured to generate a linear motion, the powered mover comprising a first portion thereof affixed to the first frame and having a movable second portion thereof affixed to the second frame; slide or track assemblies mounted stationary on an interior of the first frame in a spaced apart relationship with each other, each slide or track assembly comprising a first track with a generally horizontal working surface and a second track with a working surface that is disposed on an incline to the generally horizontal working surface; and roller assemblies, each roller assembly comprising a first roller affixed for a rotation on an exterior of the second frame, a second roller affixed for a rotation on an exterior of the third frame and a rigid link connecting the first and second rollers.

Although the apparatus 500 has been described above with the frame 508 containing a stationary frame 510 and two moving frames 520, 530 and devices 450 being stationary mounted on rails 570, other embodiments can be used herewithin.

Figure 47:
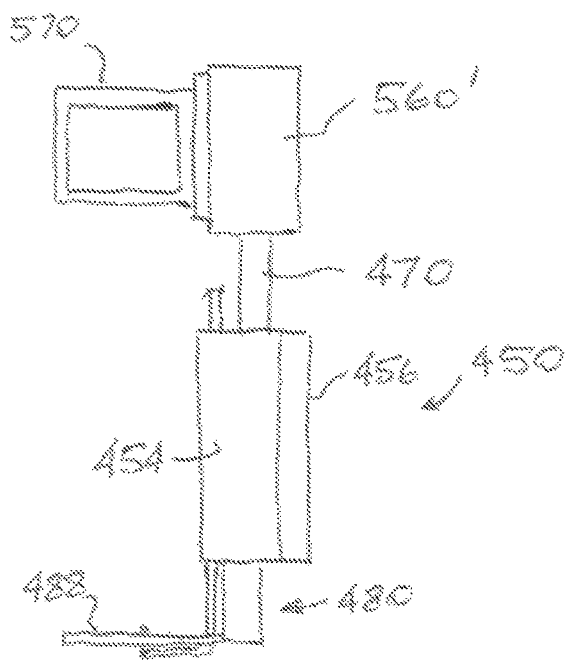
FIG. 47 illustrates a partial diagrammatic end view of an exemplary apparatus configured and operable to move devices of FIG. 30.

FIG. 47 illustrates a partial end view of an embodiment of the apparatus 500, wherein each device 450 is directly coupled to a powered member 560'. Such power member 560' can be a cylinder or a solenoid. The mounting portion 470 can define the movable portion of such powered member 560'. In this embodiment, the apparatus 500 can comprise a single frame, for example such as the above described first frame 510 or the third frame 530 that is stationary mounted. The rail 570 can be rigidly and permanently affixed to the single frame or can be detachably attached with the above described brackets 574. The carriages 550 with rollers 552 and 554 are not required in this embodiment. The powered member 560' can be configured for mounting below the device 450.

Figure 48:
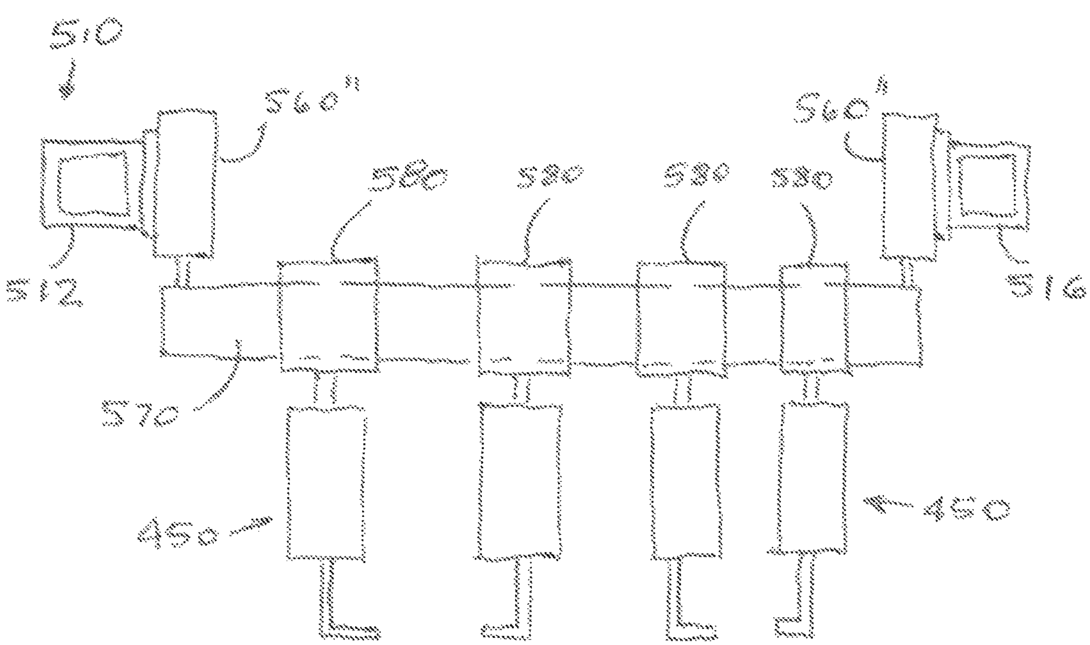
FIG. 48. illustrates a partial diagrammatic end view of an exemplary apparatus configured and operable move devices of FIG. 30.

FIG. 48 illustrates a partial end view of an embodiment of the apparatus 500, wherein the frame 508 is provided as a single frame, for example such as the first frame 510, stationary mounted and wherein each rail 570 is movably mounted to the opposite peripheral members of the frame 510 by way of powered members 560". The devices 450 can be coupled to the rail 570 with the above described clamping member 580. The carriage 550 with rollers 552 and 554 are not required in this embodiment. Powered members 560" can be mounted below the rail(s) 570.

In an embodiment, the rail 570 of FIG. 47 or the peripheral members of the first frame 510 can be suspended, for example with rigid or semi-flexible rods (not shown), from an overhead structure, for example such as roof trusses, essentially eliminating a need for a floor mounted frame.

In an embodiment, the carriage 550 with rollers 552 and 554 can be affixed to each end of the rail 470, thus eliminating a need for the third frame 530.

In an embodiment, a device configured and operable to connect voltage to a container containing dough comprises a body with a bore; a mounting portion extending from one end of the body; an electrode extending from a longitudinally opposite end of the body, the electrode comprising an L-shaped member having one leg thereof secured to the opposite end of the body and an electrically conductive member having one end thereof secured to another leg of the L-shaped member; and wires passed through the bore in the body and coupling the electrically conductive member to a voltage source. In this embodiment, the mounting portion can comprise an elongated member. In this embodiment, the device can further comprise a clamping member comprising a first bore sized and shaped to receive the mounting portion therethrough, a second bore oriented in a direction generally normal to a direction of the first bore, a first clamp configured to secure the mounting portion received within the first bore and a second clamp configured to secure another member received within the second bore. In this embodiment, one edge of the body comprises a pair of beveled portions.

In an embodiment, an apparatus for cooking or baking dough, comprises a first frame mounted stationary and having a hollow interior; a second frame mounted for a movement in a generally horizontal plane and being sized and shaped to fit within the hollow interior of the first frame; a third frame mounted for a movement in a generally horizontal plane and in a generally vertical plane, the third frame being sized and shaped to fit within the hollow interior of the first frame; a powered mover configured to generate a linear motion, the powered mover comprising a first portion thereof affixed to the first frame and having a movable second portion thereof affixed to the second frame; slide or track assemblies mounted stationary on an interior of the first frame in a spaced apart relationship with each other, each slide or track assembly comprising a first track with a generally horizontal working surface and a second track with a working surface that is disposed on an incline to the generally horizontal working surface; and roller assemblies, each roller assembly comprising a first roller affixed for a rotation on an exterior of the second frame, a second roller affixed for a rotation on an exterior of the third frame and a rigid link connecting the first and second rollers.

In an embodiment, an apparatus for cooking or baking dough, comprises a first frame mounted stationary and having a hollow interior; a second frame mounted for a movement in a generally horizontal plane and being sized and shaped to fit within the hollow interior of the first frame; a third frame mounted for a movement in a generally horizontal plane and in a generally vertical plane, the third frame being sized and shaped to fit within the hollow interior of the first frame; a powered mover configured to generate a linear motion, the powered mover comprising a first portion thereof affixed to the first frame and having a movable second portion thereof affixed to the second frame; slide or track assemblies mounted stationary on an interior of the first frame in a spaced apart relationship with each other, each slide or track assembly comprising a first track with a generally horizontal working surface and a second track with a working surface that is disposed on an incline to the generally horizontal working surface; roller assemblies, each roller assembly comprising a first roller affixed for a rotation on an exterior of the second frame, a second roller affixed for a rotation on an exterior of the third frame and a rigid link connecting the first and second rollers; containers containing dough; devices mounted on the third frame and configured to connect voltage to each container; and conveyor positioned and operable to position each container under a pair of devices.

In an embodiment, an apparatus for cooking or baking dough contained within container(s) comprises a frame comprising a stationary portion and at least one movable portion; devices mounted on the movable portion, each device configured to connect voltage to a single container; and a conveyor at least partially disposed within the frame underneath the devices, the conveyor configured to move each container into a position under a pair of devices.

The particular embodiments of the present disclosure generally provide apparatus and method for material handling.

In particular embodiments, the apparatus comprises a conveyor configured to move material from an inlet end to an outlet or discharge end and is further configured to temporarily change elevation of the material prior to and/or after the material movement.

In particular embodiments, the apparatus comprises a conveyor with a pair of frames movable by a powered device.

The particular embodiments of the present disclosure also provide a device configured and operable to change elevation of a material prior to or after conveying operation.

Now referring to the drawings, FIGS. 49-53 illustrate an embodiment of a lifting device or an apparatus 700 configured and operable to move material along a conveying path or a first direction 702 between an inlet end 704 and an outlet or discharge end 706. The apparatus 700 is being further configured to temporarily change elevation of the material prior to and/or after the movement of material and is being further configured to move material in a second direction being disposed generally normal or at an inclined to the first direction. The apparatus 700 can be also referred to as a material handling conveyor.

The exemplary apparatus 700 comprises a first frame 710. The first frame 710 is configured as a stationary frame. The first frame 710 has a hollow interior 711 defined by a pair of side members 712 and 714, spaced apart from each other during use or operation. A length of each side member 712, 714 is disposed or oriented along the first direction 702. Each side member 712, 714 may be configured to define a main portion 716 with a vertically disposed surface 718. Each side member 712, 714 may be also configured to define flanges 720, 722 and 724, although less of more flanges are also contemplated herewithin. Flanges 722 may be configured to support the apparatus 700 on a horizontal surface or any other structure. The side members 712 and 714 may be rigidly connected therebetween with one or more first braces 726. In an example, each end of the first brace 726 can be rigidly coupled to a flange 724 by any one of welding, adhesive and fastening. The side members 712 and 714 may be further rigidly connected with one or more second braces 728, for example having each end thereof rigidly coupled to the main portion 716 by anyone of welding, adhesive and fastening. Apertures 729 may be provided through the thickness of the main portion 716, at one or both end region thereof, to fasten a pair of conveyors 700 along the first direction 702 or fasten the conveyor 700 to any other conveyor or structure. In an example, the end regions with the apertures 702 may be also configured to suspend the apparatus 700 where it does not touch any horizontal surface. In this example, the apparatus 700 may be configured without flanges 722 and 724 and even without first braces 726 and flanges 714. Or, the first brace 726 can be rigidly coupled, at each end thereof, to the main portion 716.

Figure 49:
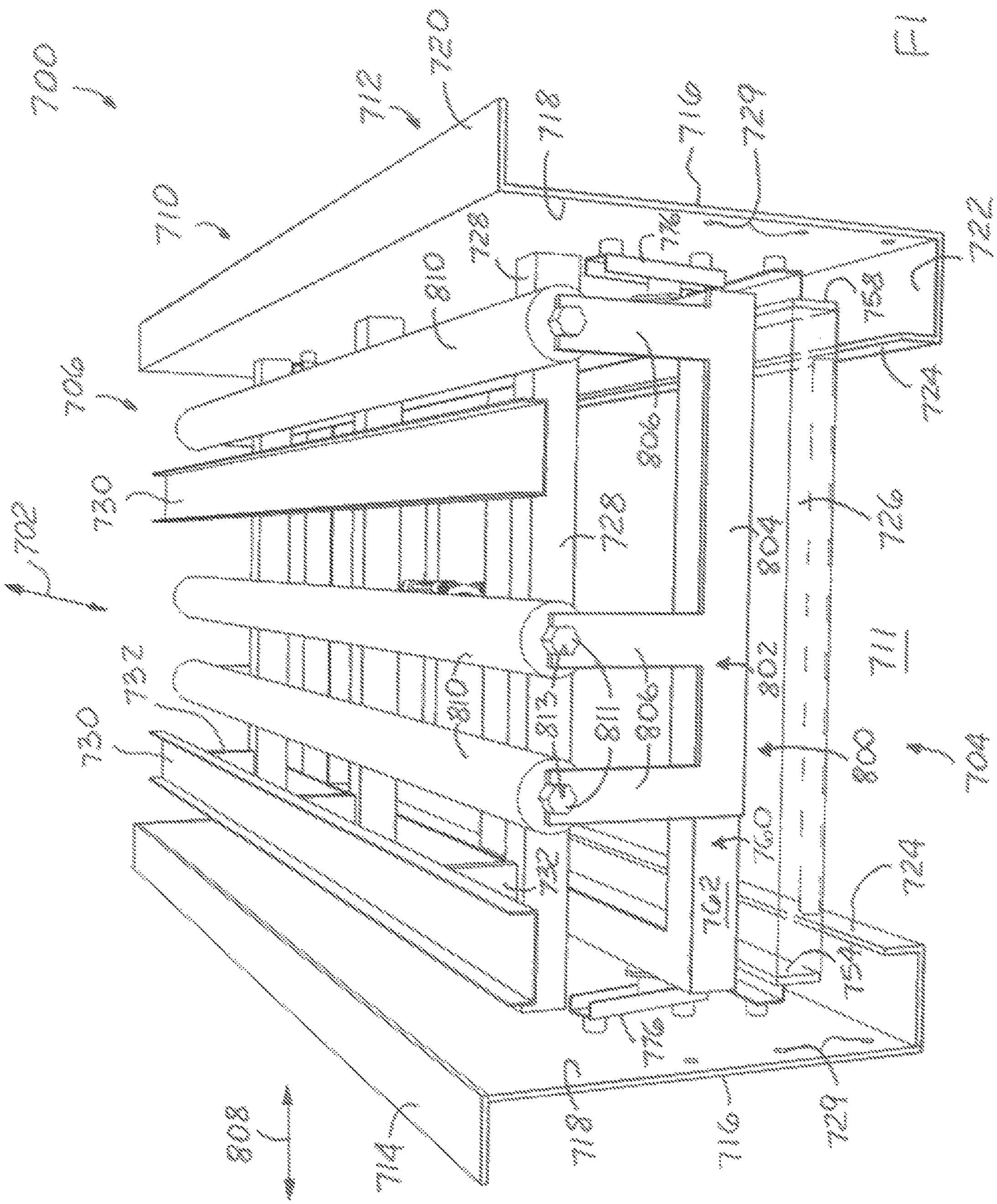
FIG. 49 illustrates an end perspective view of an exemplary material handling conveyors having a material lifting device.
Figure 50:
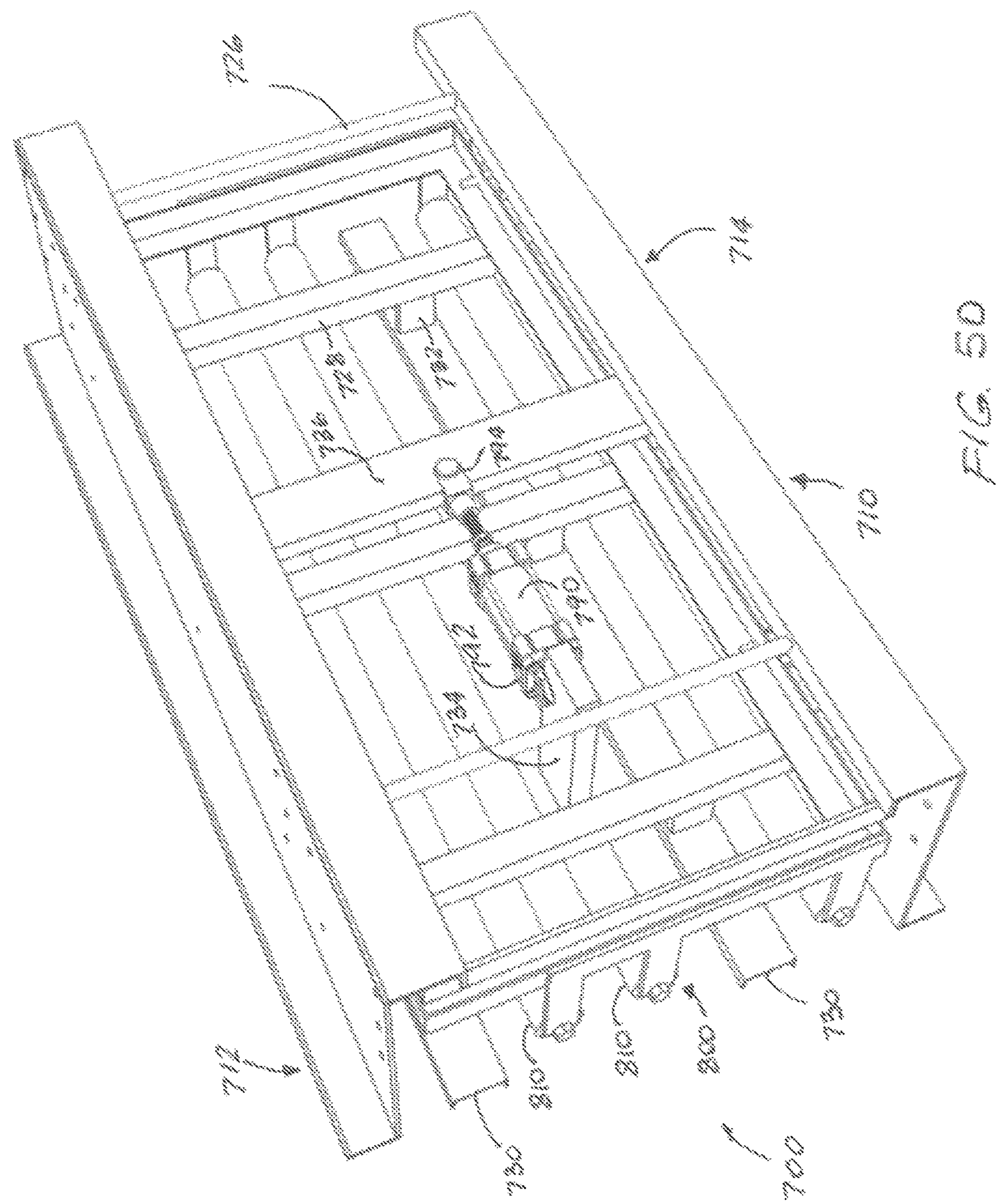
FIG. 50 illustrates a bottom 3-D view of the exemplary conveyor of FIG. 49.
Figure 51:
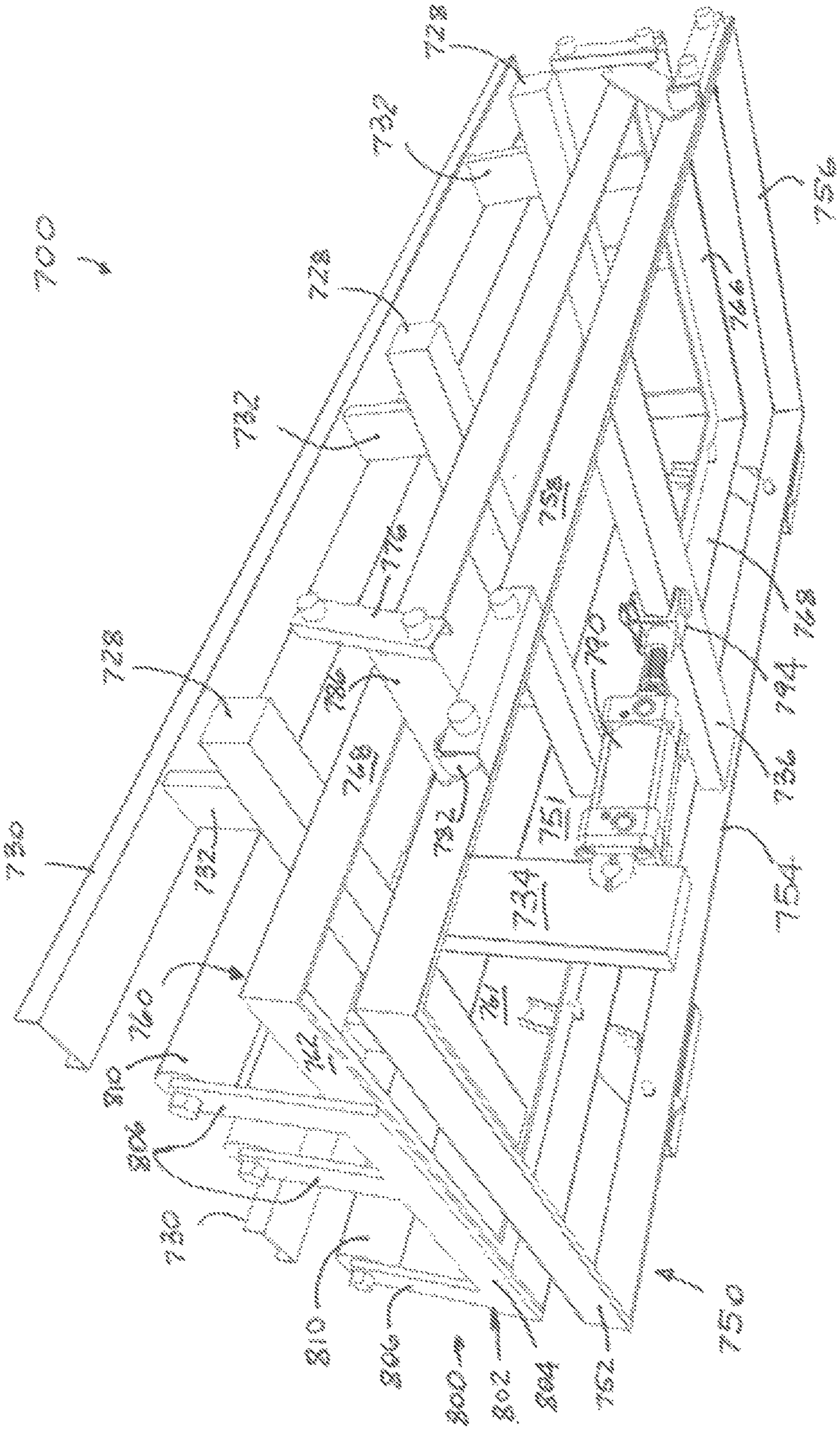
FIG. 51 illustrates a side 3-D view of the exemplary conveyor of FIG. 49 with a first frame removed for clarity.

In an embodiment, the apparatus 700 further comprises a conveying means or a device represented by one or more tracks 730. During operation, one or more tracks 730 receive material for movement along the conveying path or the first direction 702. The one or more tracks 730 may be directly supported on the one or more second braces 728 or may be spaced from the upper surfaces thereof with spacers 732. In the example of FIG. 49, the tracks 730 are shown as having a U-shaped cross-section in a plane normal to a length of the track 730. In such example, each track 730 can be configured to receive a chain of a chain conveyor (not shown). In an example, the tracks 730 can be adapted with rollers to define a roller conveyor. In an example, the tracks 730 can have a smooth upper surface, similar to the above described surface 218 or 228, to define a conveying surface. In other words, the tracks 730 can be components of any above conveying means configured and operable to convey or move material in the first direction 702. In an embodiment, the one or more tracks 700 can be provided as components of an external/independent conveyor and thus can be optional components of the apparatus 700.

The apparatus 700 also comprises a second frame 750. The second frame 750 also has a hollow interior 751 defined by peripheral members 752, 754, 756 and 758. The second frame 750 can be sized and shaped to fit within the periphery of the first frame 710. Such peripheral members 752, 754, 756 and 758 may be provided as hollow tubular members to reduce weight of the second frame 750. Such peripheral members 752, 754, 756 and 758 may be provided as strips or bars. Such peripheral members 752, 754, 756 and 758 may be disposed coplanar (i.e. in the same plane) with each other. As it will be explained later, the second frame 750 is mounted for a movement in a generally horizontal plane during use of the apparatus 700.

The apparatus 700 also comprises a third frame 760. During use, the third frame 760 is positioned above the second frame 720. The third frame 760 also has a hollow interior 761 defined by peripheral members 762, 764, 766 and 768. The third frame 760 can be sized and shaped to fit within the periphery of the first frame 710. The third frame 760 may be sized generally equally to the second frame 750. Such peripheral members 762, 764, 766 and 768 may be provided as hollow tubular members to reduce weight of the third frame 760. Such peripheral members 762, 764, 766 and 768 may be provided as strips or bars. Such peripheral members 762, 764, 766 and 768 may be disposed coplanar (i.e. in the same plane) with each other. As it will be explained later, the third frame 760 is mounted for a movement in both generally horizontal and generally vertical planes during use of the apparatus 700.

Figure 52:
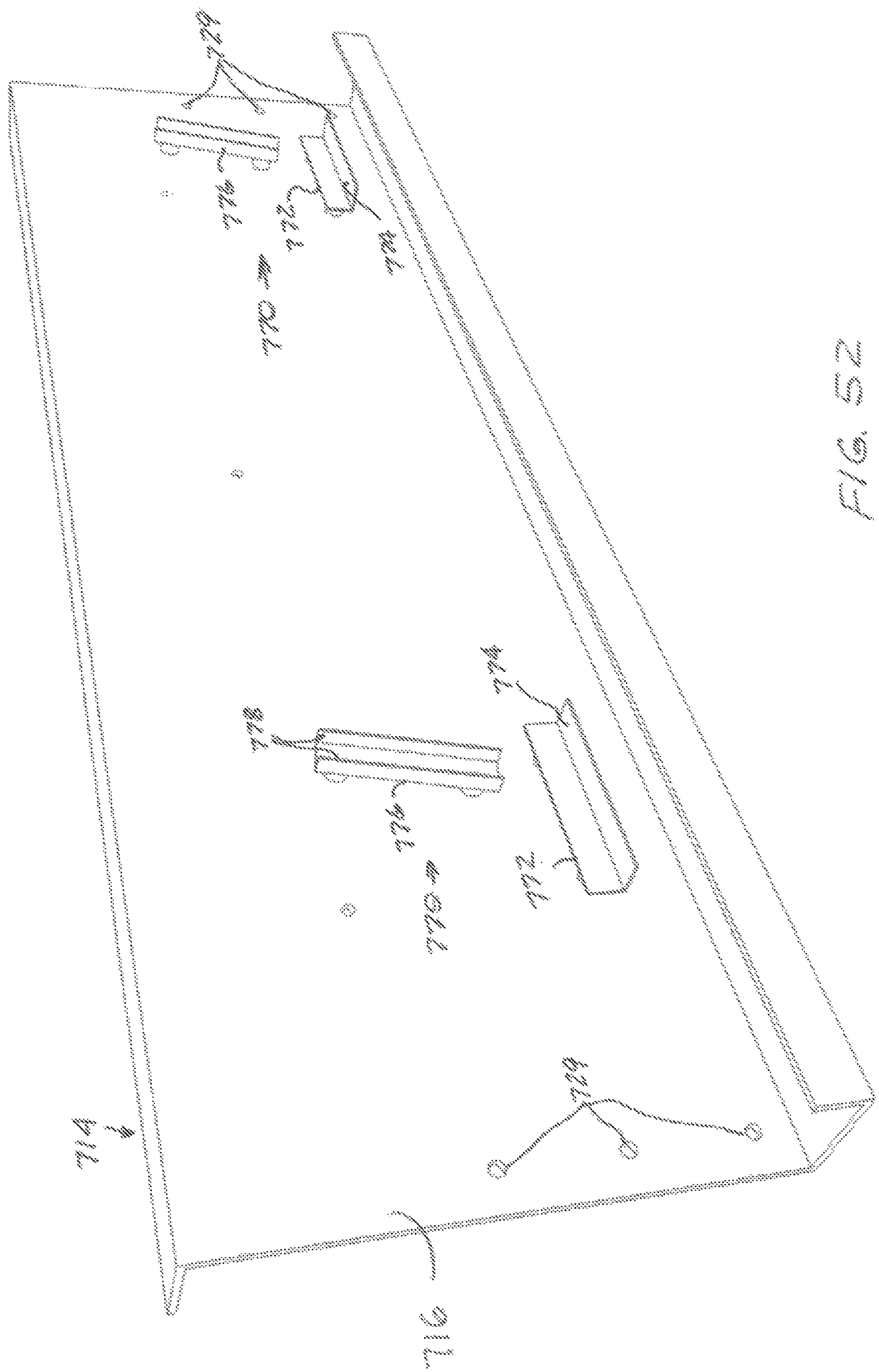
FIG. 52 illustrates a partial perspective view of the exemplary conveyor of FIG. 49.
Figure 53:
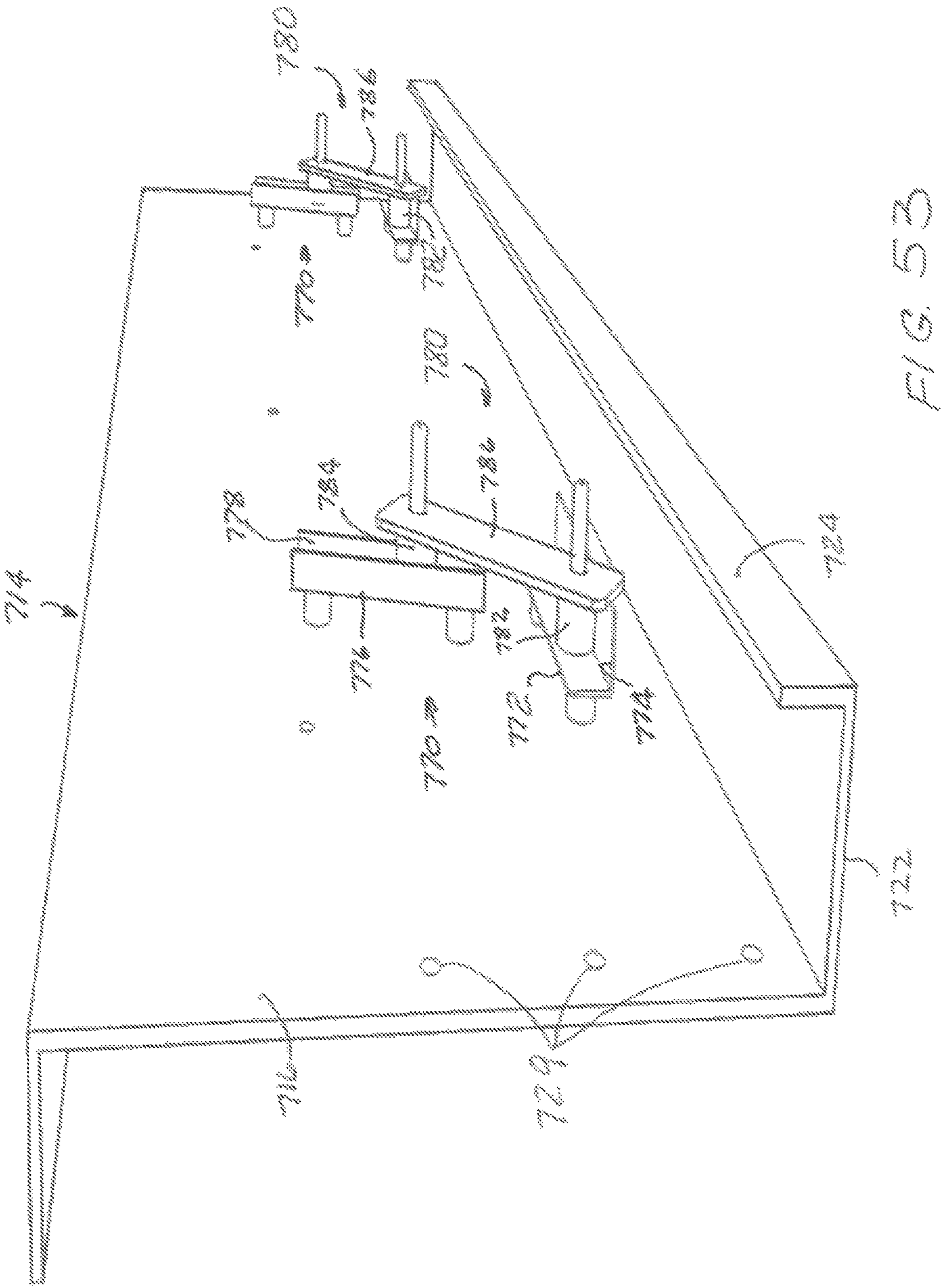
FIG. 53 illustrates another partial perspective view of the exemplary conveyor of FIG. 49.

The first, second and third frames, 720, 750 and 760 respectively, are interconnected in the following manner. In a particular reference to FIGS. 52-53, slide or track assemblies 770 are stationary mounted on the interior of the first frame 710 and, more particularly, on the inner surface 718 of the main portion 716. Four slide or track assemblies 770 can be used. Each slide or track assembly 770 is being positioned adjacent a respective corner or end of the first frame 710. Each slide or track assembly 770 comprises a first member 772 with a working surface 774. The working surface 774 is positioned generally horizontally during use of the apparatus 700. In the examples of FIGS. 52-53, each first member 772 is shown as having an L-shaped cross-section. Other cross-sections are also contemplated, including a U-shaped, solid or tubular cross-section of the first member 772 defining the working surface 774. Since, the working surface 774 is horizontally disposed and supports, in a vertical plane, a weight of at least the second frame 750, a single working surface 774 is sufficient herewithin. However, a second working surface 774, for example being provided by a first member with a U-shaped cross-section can be also employed herewithin. Each slide or track assembly 770 also includes a second member 776 with the working surface 778 that is disposed at an angle or inclined to the working surface 774. In the examples of FIGS. 52-53, each second member 776 is shown as having a U-shaped cross-section with a pair of oppositely positioned working surfaces 778. Such pair of working surfaces 778 helps to accommodate any undesired movement or play of the second frame 720 and maintain a contact between a second roller 784 described below and at least one of the pair of working surfaces 778. However, a single working surface 778 is also contemplated herewithin if, for example, a separation of the roller 784 from the working surface 778 is not an issue. Other cross-sections are also contemplated, including a solid or tubular member defining the working surface 778. The first and second members, 772 and 776 respectively, are illustrated as being provided as separate members. In this example, the first and second members, 772 and 776 respectively, are stationary affixed to the inner surface of the respective side member 712 or 714. Carriage or roller assemblies 780 are also provided. Each carriage or roller assembly 780 comprises a first roller 782 that is rotationally affixed on the exterior of the second frame 750 and is adapted to roll or rotate on the working surface 774 during use of the apparatus 700. The second roller 784 is rotationally affixed on the exterior of the third frame 760 and is adapted to roll on the working surface(s) 778 during use of the apparatus 700. The carriage or roller assembly 780 also comprises a link 786 that is coupled to the first and second rollers, so that both first and second rollers, 782 and 784 respectively, have to move together. In other words, the distance between first and second rollers, 782 and 784 respectively, does not change during operation of the apparatus 700 and the first and second rollers, 782 and 784 respectively, must roll in unison with each other.

The apparatus 700 further comprises a powered member 790 that is configured to generate a linear motion. In an example of FIGS. 49-51, such powered member 790 is illustrated as a hydraulic or pneumatic cylinder, that has a piston end 792 thereof affixed to the first frame 710, for example to a mounting member 734 that is suspended from one of the cross-braces 728 and has a rod end 794 thereof affixed, stationary or pivotally, to a brace 736 of the second frame 750. In operation, the powered cylinder 790 is actuated to extend the rod end 794 and to move the second frame 750 in a horizontal direction, from left to right in FIGS. 50-51. Such movement of the second frame 750 causes each first roller 782 to move horizontally on the respective working surface(s) 774 and further causes each second roller 784 to move on the respective inclined working surface(s) 778. The movement of the second rollers 784 causes the movement of the third frame 760 in both horizontal and vertical directions. The powered cylinder 790 is also actuated to retract the rod end 794 and move the second frame 750 and the third frame 760 horizontally in a direction from right to left in FIGS. 50-51 and also move the third frame downwardly. The powered member 790 can be also an electrically powered drive. In an example, such electrically powered drive can be a solenoid, mounted and coupled essentially in the same manner as the above described powered cylinder 790. In an example, such electrically powered drive can comprise a screw and nut components, with the nut being connected to the second frame 750 and translating on the screw. In an example, such electrically powered drive could comprise of a magnetic rack and pinion type with the pinion rotatably mounted on the first frame 710 and the rack mounted stationary on the second frame 750.

The apparatus 700 further comprises a material carrying assembly 800 configured to enable movement of the material in a second direction 808 being generally normal to the first direction 702. The assembly 800 comprises material carrying members and support member(s) configured to elevate, in a vertical direction, the material carrying members above third frame 760. In an embodiment of FIGS. 49-51, such material carrying members comprise three rollers 810 and such support member(s) comprise a pair of roller mounting members 802 rotatable support the three rollers 810 thereon. The material carrying members define working surfaces 812 of the assembly 800 and of the apparatus 700. In the example of FIGS. 49-51 and 55, such working surface 812 is a peripheral surface of each roller 810. Each roller mounting member 802 is positioned at one end of the apparatus 700. Each roller mounting member 802 can comprise a first portion 804 stationary affixed, either permanently or detachably, to the peripheral members of the third frame 760, for example such as the peripheral member 762. Each roller mounting member 802 can also comprise three second portions 806 that upstand on the first portion 804. Each roller 810 has one end thereof adapted for a rotation on a respective second portion 806 of the roller mounting member 802. Thus, the axis of the rollers 810 are aligned with the first direction 702 and the rollers 810 are positioned and configured to rotate in the second direction 808. The number of rollers 810 can be selected based on at least one of a width of the material to be transported, a particular application, and a type of the conveying device or means. In an embodiment, at least a pair of rollers 810 is contemplated as sufficient to support the material moving in the second direction 808, although more than three illustrated rollers 810 are also contemplated herewithin.

It is to be understood that the first frame 710, the second frame 750, the third frame 760 and the assembly 800 may define a frame movable by a powered member 790 to change an elevation of a material relative to an elevation of the conveying device and enable a movement of the material in a direction being normal to a direction of the conveying device. In other words, such first frame 710, the second frame 750 and the third frame 760 can be referred to as a first frame portion 710, a second frame portion 750 and a third frame portion 760. The frame can be provided with or without the track assemblies 770 and the roller assemblies 780. It is to be further understood that the frame can be comprised of only one frame portion, for example such as the third frame 760. When the frame comprises only one frame portion, the frame also comprises the assembly 800.

Figure 54:
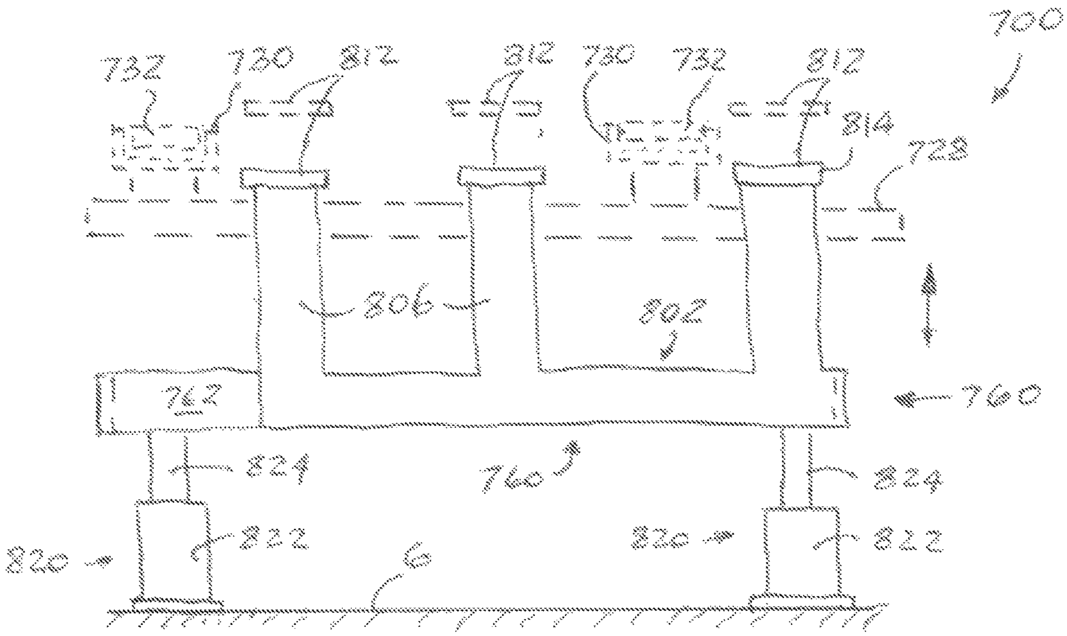
FIG. 54 illustrates an end perspective view of an exemplary material handling conveyors having a material lifting device.

In an example of FIG. 54, each material carrying member comprises a stationary member 814 carrying the working surface 812, being a generally flat surface. The support members can be essentially the above described member 802 modified to mount stationary members 814 thereon. Such stationary member 814 can comprise, either completely or partially, a material with a low coefficient of friction. In an example, such material may comprise UHMW plastic. The stationary member 814 can also be adapted with a coating comprising material with a low coefficient of friction, with the coating defining the working surface 812. In an example, such coating material may comprise UHMW plastic. Furthermore, the exemplary three stationary members 814 may be replaced with a single stationary member 814 comprising a material with a low coefficient of friction. Such single stationary member 814 can be positioned between the tracks 730 and sized sufficient to support the material moving in the second direction 808. The flat working surface 812 can be smooth. The flat working surface 812 can be provided with grooves, cavities or protrusions to minimize surface-to-surface contact between the stationary member(s) 810' and the material to be transported thereon.

Figure 55:
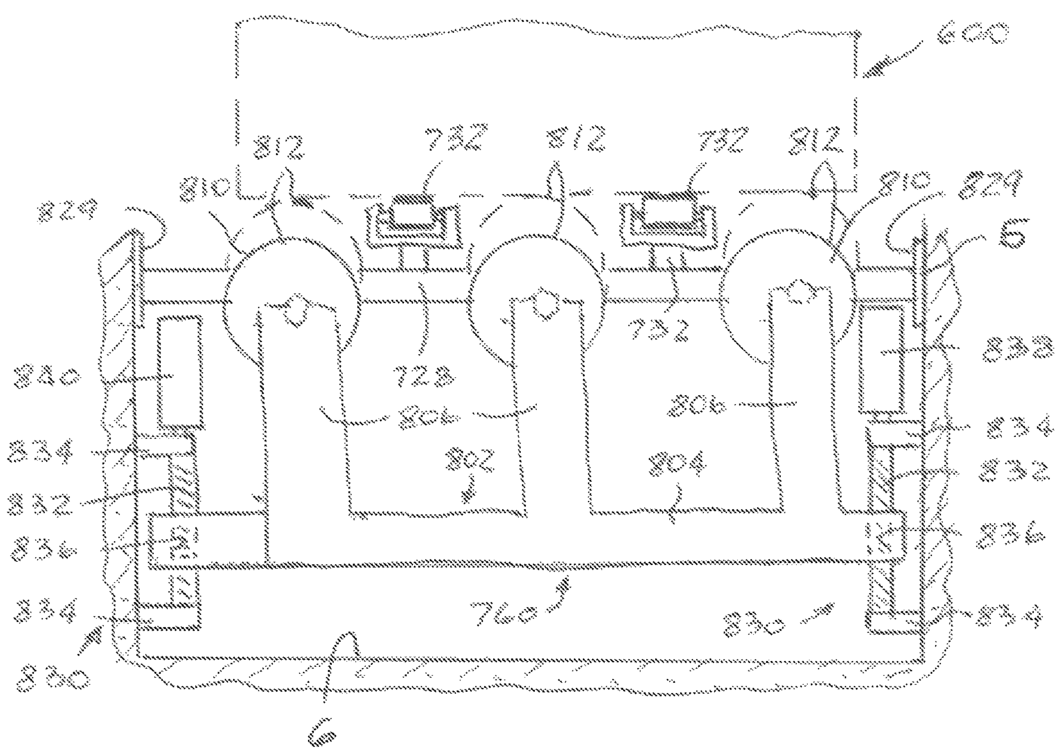
FIG. 55 illustrates an end view of an exemplary material handling conveyors having a material lifting device.

FIGS. 54-55 illustrate embodiment(s) of the apparatus 700 configured without the first frame 710, the second frame 750, the track assemblies 770 and the roller assemblies 780. The apparatus 700 in these embodiments is being further configured to move the third frame 760 (now being the only frame) in a vertical direction only. In an example of FIG. 54, the powered members 820 are provided. Each powered member 820 can be a jack screw drive, a pneumatic cylinder, and a hydraulic cylinder, comprising a stationary portion 822 mounted on a horizontal surface 6 or another suitable structure and a movable portion 824 having a distal end thereof coupled to the third frame 760. Two or more powered members 820 can be provided. Two powered members 820 can be mounted mediate the ends of the frame 760. Four powered members 820 can be mounted at corners of the frame 760. In this embodiment, the optional tracks 730 and braces 728 can be supported independently from the apparatus 700. It will be understood that the powered members 820 can be also mounted above the frame 760. Each powered member 820 can be also an electric solenoid.

In an example of FIG. 55, the apparatus 700 can comprise powered members 830 being electrically powered screw drives. Each powered member 830 can then comprise a screw 832 supported in a vertical direction by end mounts 834, an aperture 836 formed through the frame 760 and configured with a complimentary thread and an electric motor 838. Two powered members 830 can be mounted mediate the ends of the frame 760. Four powered members 830 can be mounted at corners of the frame 760. The threaded aperture 836 can be replaced with a drive nut affixed to the periphery of the frame 760.

FIG. 55 also illustrates an embodiment of the apparatus 700 being positioned and mounted in a floor pit 5 that can comprise the above described surface 6. The required or optional braces 728 can be then affixed to the vertical walls of the floor pit 5, for example with end brackets or plates 829.

The above described powered drives 760 can replace the first members 772 and the rollers 782 in the embodiment of FIGS. 49-53, by being mounted in a horizontal direction on the inner surfaces 718.

Figure 56:
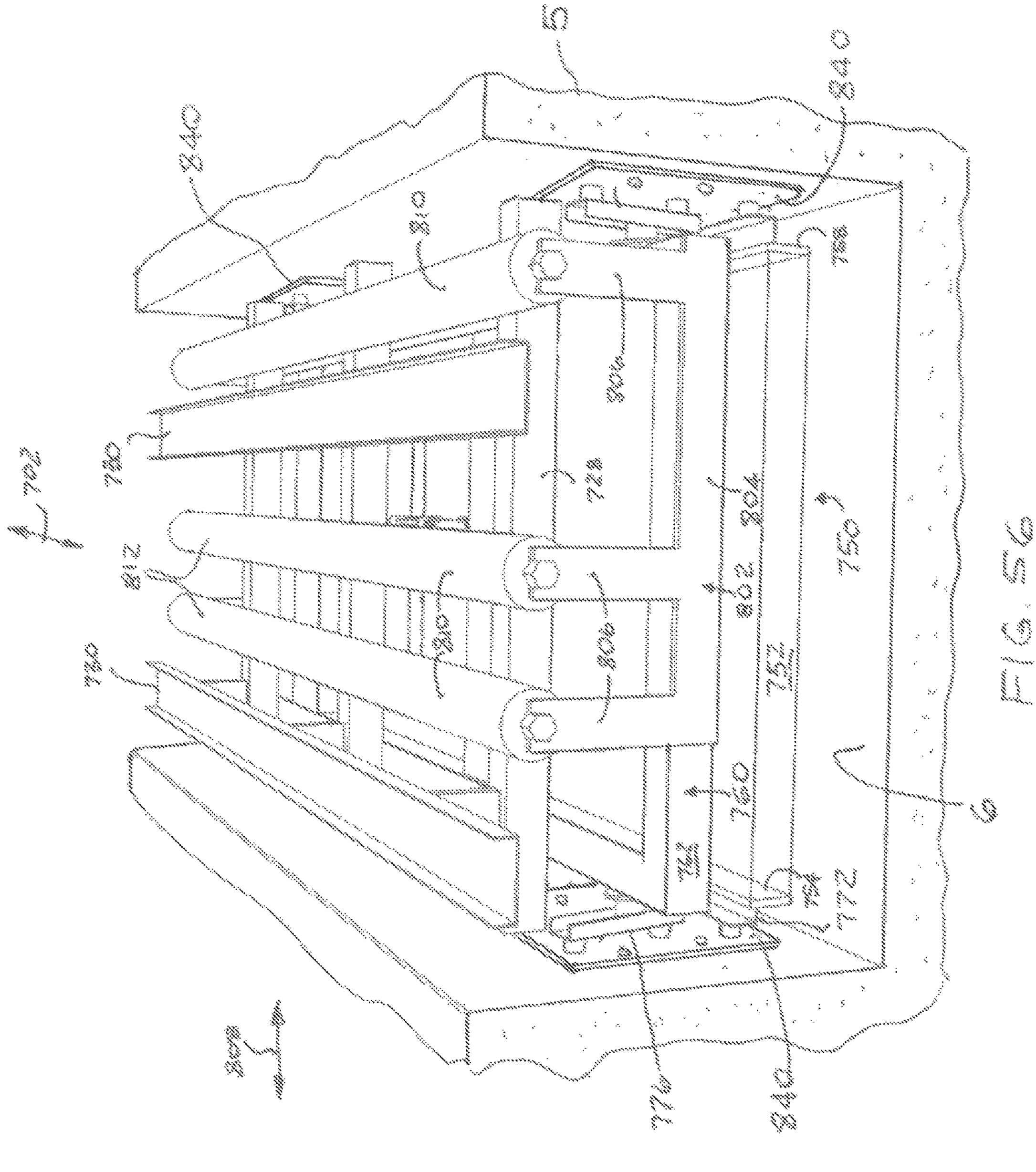
FIG. 56 illustrates an end view of an exemplary material handling conveyors having a material lifting device.

FIG. 56 illustrates an embodiment of the apparatus 700 configured for mounting within the floor pit 5 that replaces the first frame 710. In other words, in the embodiment of FIG. 56, the apparatus 700 is configured without the first frame 710 and can be also configured with or without the conveyor tracks 7230 and braces 728. The first members 772 and the second members 776 can be affixed to the vertical walls of the floor pit 5 either directly or by way of mounting plates 840.

In any of the embodiments, the material carrying members do not interfere with movement of the material along the first direction 702 or along the conveying path.

In any of the embodiments of FIGS. 49-56, the apparatus 700 is configured to position material on or remove material from a conveyor in a direction generally normal to the conveying path 702.

The control of the conveyor 700 is tailored to the type of powered member 790. If the powered member 790 is of a hydraulic cylinder type, the control unit would include valve(s). If the powered member 790 is of a pneumatic cylinder type, the control unit would include valve(s) and an optional air supply source. If the powered member 790 is of an electric type, the control unit would include suitable electrical components, for example, such as a contactor/relay, and even a transformer or other power conversion device. If an electrical control unit is provided, such electrical control unit can be a based logic control unit and any combination thereof.

If the powered member 790 is a cylinder, its stroke can be sized to achieve required vertical movement. Or, positioning switches/sensors can be used to control the stroke.

In either embodiment, sensors and or switches are also contemplated.

In an embodiment, the method of using the conveyor 700 may comprise configuring the conveyor 700 so that material carrying members are positioned below the conveying surfaces on the tracks 730 when the powered member 790 is deenergized. Energizing powered member 790 to move the second frame 750 horizontally (to the right in FIGS. 50-51) and move the third frame 760 both horizontally and vertically, i.e. upwardly, to partially position material carrying members above the conveying surfaces 732 on the tracks 730. When the second frame 750 moves horizontally to the right in FIGS. 50-51, the first rollers 782 moves horizontally to the right in FIGS. 50-51 and each second roller 784 moves upwardly on the inclined second working surface(s) 778. The movement of the rollers 782 and 784 reverses when the third frame 760 moves downwardly. Then, advancing or moving material on the material carrying members, in the second direction, until the material is generally positioned between side members 712, 714. In this position the material is ready to be transported or conveyed in a first direction 702. Next, energizing powered member 790 to move the second frame 750 horizontally (to the left of FIGS. 50-51) and move the third frame 760 both horizontally and vertically, i.e. downwardly, to position material carrying members below the conveying surfaces 732 on the tracks 730 so that the material is rested on the conveying surfaces on the tracks 730. Moving or conveying the material in the first direction 702.

In an embodiment, the method of using the conveyor 700 may comprise configuring the conveyor 700 so that material carrying members are positioned above the conveying surfaces 732 on the tracks 730 when the powered member 790 is deenergized. Then, advancing or moving material on the material carrying members, in the second direction, until the material is generally positioned between side members 712, 714. Next, energizing powered member 790 to move the second frame 750 horizontally (to the left of FIGS. 50-51) and move the third frame 760 both horizontally and vertically, i.e. downwardly, to position material carrying members below the conveying surfaces on the tracks 730 so that the material is rested on the conveying surfaces on the tracks 730. Moving or conveying the material in the first direction 702. Then, advancing or moving material on the material carrying members, in the second direction 808, until the material is generally positioned between side members 712, 714.

In an embodiment, the method of using the conveyor 700 may comprise moving or conveying the material in the first direction 702. Then, energizing powered member 790 to move the second frame 750 horizontally (to the right of FIGS. 50-51) and move the third frame 760 both horizontally and vertically, i.e. upwardly, to partially position material carrying members above the conveying surfaces on the tracks 730 so as to raise the material above the conveying surfaces on the tracks 730. Next, advancing or moving material on the material carrying members, in the second direction 808, until the material is past one of the side members 712, 714. Then, energizing powered member 790 to move the second frame 750 horizontally (to the left of FIGS. 50-51) and move the third frame both horizontally and vertically, i.e. downwardly, to position material carrying members below the conveying surfaces on the tracks 730 so that the next batch of material can be moved in the first direction 702 on the conveyor 700.

Material carrying members, such as rollers 810, are advantageous in reducing friction during movement of the material thereon. Material carrying members can be replaced with other members where application can tolerate a higher amount of friction or where the material is light in weight. For example, the material carrying members can be replaced with flat members 814 comprising either partially or fully, friction reducing material, for example such as UHWM plastic.

It would be understood that the conveyor 700 can be used in any application where the material must be conveyed or moved in two directions, for example being perpendicular or inclined to one another.

In an embodiment, the conveyor 700 can be used in a dough or bread baking applications, for example in a combination with the apparatus or oven 500, being positioned before or after the oven. In this application, the material can be a container assembly 600 of FIGS. 37-42, filled with raw dough at an inlet end of (before) the oven 500 or a cooked/baked dough on the discharge end of (after) the oven 500. In this embodiment, the first direction 702 is disposed normal to the pathway 506 of the apparatus 500, while the second direction 808 is aligned with the direction of the pathway 506. The conveyor 700 can be employed when two or more ovens 500 are positioned across the pathway 506 to move containers 600 with baked or cooked dough discharged from ovens 500. If the conveyor 700 is positioned immediately adjacent the discharge end 504, the oven 500 can comprise the kickback device 180. If the application includes another conveyor 10 positioned intermediate the oven 500 and the conveyor 700, the oven 500 can be provided without the kick back device 180 and such kick back device 180 will be provided within the intermediate conveyor 10.

In an embodiment, the conveyor 700 can be used in a combination with a case packer/bundler/wrapper/shrink wrapper that would group individual products into a group, or an already grouped set of products into a collective group for another larger package. In this application, the material is, for example, a six pack of soda before the inlet side of the bundler and a group of four six packs of soda cased or shrink wrapped after the discharge end of the bundler.

In an embodiment, the conveyor 700 can be used in a combination with a caser, a heat tunnel, a palletizer, a robotic positioner for a robot with a tool head, or other devices.

In an embodiment, each side member 712, 714 of the first frame 710 does not have to be a single continuous member and can be defined by separate members not connected to each other.

In an embodiment, each slide or track assembly 770 can be mounted individually. In other words, a pair of slide or track assemblies 770 does not have to be mounted on one long side member 712 or 714. Each slide or track assembly 770 can be mounted on a vertically disposed post.

In any of the above described embodiments, the conveyor 700 is configured to lift material above the conveying means and/or lower material on such conveying means.

In an embodiment, the apparatus 700 can be configured for a field retrofit in applications using the conveying means. In other words, apparatus 700 can be configured without the conveying means comprising tracks 730. In an example, the first frame 710 can be a component of such existing conveying means and retrofitted to receive the slide or track assemblies 770 and provide attachment for the powered member 790.

In an embodiment, a conveyor, comprises a first frame mounted stationary and having a hollow interior; a conveying device at least partially mounted on the first frame and defining a first direction; a second frame mounted for a movement in a generally horizontal plane and being sized and shaped to fit within the hollow interior of the first frame; a third frame mounted for a movement in a generally horizontal plane and in a generally vertical plane, the third frame being sized and shaped to fit within the hollow interior of the first frame; a powered member configured to generate a linear motion, the powered member comprising a first portion thereof affixed to the first frame and having a movable second portion thereof affixed to the second frame; slide or track assemblies mounted stationary on an interior of the first frame in a spaced apart relationship with each other, each slide or track assembly comprising a first track with a generally horizontal working surface and a second track with working surface(s) disposed on an incline to the generally horizontal working surface; roller assemblies, each roller assembly comprising a first roller affixed for a rotation on an exterior of the second frame and contacting, during use, the generally horizontal working surface, a second roller affixed for a rotation on an exterior of the third frame and contacting, during the use, the working surface(s) disposed on the incline to the generally horizontal working surface; and a rigid link connecting the first and second rollers; and a roller assembly comprising a pair of roller mounting members, each comprising a first portion affixed rigidly to one end of the third frame and one or more second portions upstanding on the first portion and one or more rollers mounted, on each of the one or more second portions, for a rotation in a second direction, the second direction being generally normal to the first direction. The first frame may comprise a pair of elongated members.

In an embodiment, a lifting device for a conveyor configured to move material in a first direction or along the conveying path, the lifting device comprises slide or track assemblies mounted stationary in a spaced apart relationship with each other, each slide or track assembly comprising a first track with a generally horizontal working surface and a second track with working surface(s) disposed on an incline to the generally horizontal working surface; roller assemblies, each roller assembly comprising a first roller contacting, during use, the generally horizontal working surface, a second roller contacting, during the use, the working surface(s) disposed on the incline to the generally horizontal working surface, and a rigid link connecting the first and second rollers; a first frame coupled to the first rollers, the first frame moving in a generally horizontal plane; a second frame coupled to the second rollers, the second frame moving in a generally horizontal plane and in a generally vertical plane; a powered member configured to generate a linear motion, the powered member comprising a first portion thereof affixed to a stationary member and having a movable second portion thereof affixed to the first frame; and a roller assembly comprising a pair of roller mounting members, each comprising a first portion affixed rigidly to one end of the third frame and one or more second portions upstanding on the first portion and one or more rollers mounted, on each of the one or more second portions, for a rotation in a second direction, the second direction being generally normal to the first direction.

In an embodiment, a conveyor comprises a conveying means configured to move material in a first direction; and a device configured to move material in a second direction being generally normal to the first direction, the device configured to change an elevation of the material prior to or after movement of the material in the first direction. In this embodiment, the device may comprise slide or track assemblies 770 mounted stationary in a spaced apart relationship with each other, each slide or track assembly comprising a first track with a generally horizontal working surface and a second track with working surface(s) disposed on an incline to the generally horizontal working surface; carriage or roller assemblies 780, each roller assembly comprising a first roller contacting, during use, the generally horizontal working surface, a second roller contacting, during the use, the working surface(s) disposed on the incline to the generally horizontal working surface, and a rigid link connecting the first and second rollers; a first frame 750 coupled to the first rollers, the first frame moving in a generally horizontal plane; a second frame 760 coupled to the second rollers, the second frame moving in a generally horizontal plane and in a generally vertical plane; a powered member 790 configured to generate a linear motion, the powered member comprising a first portion thereof affixed to a stationary member and having a movable second portion thereof affixed to the first frame; and a material carrying assembly 800 comprising a pair of roller mounting members, each comprising a first portion affixed rigidly to one end of the third frame and one or more second portions upstanding on the first portion and one or more rollers mounted, on each of the one or more second portions, for a rotation in a second direction, the second direction being generally normal to the first direction.

In this embodiment, the device may comprise a frame; powered members coupled to said frame, said powered members configured and positioned to generate a linear motion in a vertical direction; and a roller assembly comprising a pair of roller mounting members, each comprising a first portion affixed rigidly to one end of said frame and one or more second portions upstanding on said first portion and one or more rollers mounted, on each of said one or more second portions, for a rotation in a second direction, said second direction being generally normal to said first direction.

In an embodiment, a conveyor comprises a conveying device configured to move material in a first direction; and a device configured to move material in a second direction being generally normal to the first direction, the device further configured to change an elevation of the material prior to or after movement of the material in the first direction. A feature of this embodiment is that the conveying device is configured to move material in a first direction comprises a pair of tracks disposed in a spaced apart relationship with each other in the second direction and conveyance means mounted on the pair of tracks. A feature of this embodiment is that the device configured to move material in a second direction being generally normal to the first direction comprises a frame; powered members coupled to the frame, the powered members configured and positioned to generate a linear motion in a vertical direction; and an assembly comprising a pair of mounting members, each comprising a first portion affixed rigidly to one end of the frame and one or more second portions upstanding on the first portion and one or more material carrying members mounted on each of the one or more second portions. A feature of this embodiment is that each of the one or more material carrying members comprise rollers, each having axis thereof disposed in the first direction, the rollers mounted for a rotation in the second direction. A feature of this embodiment is that each of the one or more material carrying members comprises a flat surface. A feature of this embodiment is that the powered members are mounted under the frame, each of the powered members comprising a stationary portion mounted and a movable portion having a distal end thereof affixed to a periphery of the frame. A feature of this embodiment is that each of the powered members comprises a drive screw, mounting member attached to ends of the drive screw and affixing the drive screw to a vertical surface, an aperture formed through the frame and shaped complimentary to the drive screw, and an electric motor coupled to one end of the drive screw, the electric motor operable to generate the linear motion in the vertical direction. A feature of this embodiment is that the device configured to move material in a second direction being generally normal to the first direction comprises slide or track assemblies mounted stationary in a spaced apart relationship with each other, each slide or track assembly comprising a first track with a generally horizontal working surface and a second track with working surface(s) disposed on an incline to the generally horizontal working surface; carriage assemblies, each carriage assembly comprising a first roller contacting, during use, the generally horizontal working surface, a second roller contacting, during the use, the working surface(s) disposed on the incline to the generally horizontal working surface, and a rigid link connecting the first and second rollers; a first frame coupled to the first rollers, the first frame moving in a generally horizontal plane; a second frame coupled to the second rollers, the second frame moving in a generally horizontal plane and in a generally vertical plane; a powered member configured to generate a linear motion, the powered member comprising a first portion thereof affixed to a stationary member and having a movable second portion thereof affixed to the first frame; and a roller assembly comprising a pair of roller mounting members, each comprising a first portion affixed rigidly to one end of the second frame and one or more second portions upstanding on the first portion and one or more rollers mounted, on each of the one or more second portions, for a rotation in a second direction, the second direction being generally normal to the first direction. A feature of this embodiment is that the device configured to move material in a second direction being generally normal to the first direction comprises a first frame mounted stationary and having a hollow interior, conveying device at least partially mounted on the first frame; a second frame mounted for a movement in a generally horizontal plane and being sized and shaped to fit within the hollow interior of the first frame; a third frame mounted for a movement in a generally horizontal plane and in a generally vertical plane, the third frame being sized and shaped to fit within the hollow interior of the first frame; slide or track assemblies mounted stationary in a spaced apart relationship with each other, each slide or track assembly comprising a first track with a generally horizontal working surface and a second track with working surface(s) disposed on an incline to the generally horizontal working surface; carriage assemblies, each carriage assembly comprising a first roller contacting, during use, the generally horizontal working surface, a second roller contacting, during the use, the working surface(s) disposed on the incline to the generally horizontal working surface, and a rigid link connecting the first and second rollers; a powered member configured to generate a linear motion, the powered member comprising a first portion thereof affixed to a stationary member and having a movable second portion thereof affixed to the first frame; and a roller assembly comprising a pair of roller mounting members, each comprising a first portion affixed rigidly to one end of the second frame and one or more second portions upstanding on the first portion and one or more rollers mounted, on each of the one or more second portions, for a rotation in a second direction, the second direction being generally normal to the first direction.

In an embodiment, a conveyor comprises a first frame mounted stationary and having a hollow interior; a conveying device at least partially mounted on the first frame and defining a first direction; a second frame mounted for a movement in a generally horizontal plane and being sized and shaped to fit within the hollow interior of the first frame; a third frame mounted for a movement in a generally horizontal plane and in a generally vertical plane, the third frame being sized and shaped to fit within the hollow interior of the first frame; a powered member configured to generate a linear motion, the powered member comprising a first portion thereof affixed to the first frame and having a movable second portion thereof affixed to the second frame; slide or track assemblies mounted stationary on an interior of the first frame in a spaced apart relationship with each other, each slide or track assembly comprising a first track with a generally horizontal working surface and a second track with working surface(s) disposed on an incline to the generally horizontal working surface; carriage assemblies, each carriage assembly comprising a first roller affixed for a rotation on an exterior of the second frame and contacting, during use, the generally horizontal working surface, a second roller affixed for a rotation on an exterior of the third frame and contacting, during the use, the working surface(s) disposed on the incline to the generally horizontal working surface; and a rigid link connecting the first and second rollers; and a roller assembly comprising a pair of roller mounting members, each comprising a first portion affixed rigidly to one end of the third frame and one or more second portions upstanding on the first portion and one or more rollers mounted, on each of the one or more second portions, for a rotation in a second direction, the second direction being generally normal to the first direction. A feature of this embodiment is that the first frame comprises a pair of elongated members.

In an embodiment, a device or means is provided for a conveyor configured to move material in a first direction. The device or means comprises a frame movable to change an elevation of the material relative to an elevation of the conveyor and enable the movement of the material in a direction being normal to the first direction; and one or more powered members configured to move the frame so as to change the elevation of the material relative to elevation of the material on the conveyor.

A feature of this embodiment is that the frame comprises: slide or track assemblies mounted stationary in a spaced apart relationship with each other, each slide or track assembly comprising a first track with a generally horizontal working surface and a second track with working surface(s) disposed on an incline to the generally horizontal working surface; carriage assemblies, each carriage assembly comprising a first roller contacting, during use, the generally horizontal working surface, a second roller contacting, during the use, the working surface(s) disposed on the incline to the generally horizontal working surface, and a rigid link connecting the first and second rollers; a first frame coupled to the first rollers, the first frame moving in a generally horizontal plane; a second frame coupled to the second rollers, the second frame moving in a generally horizontal plane and in a generally vertical plane; a material carrying assembly comprising a pair of mounting members, each comprising a first portion affixed rigidly to one end of the second frame and one or more second portions upstanding on the first portion and one or more material carrying members mounted, on each of the one or more second portions and extending in the first direction; and the one or more powered members is a single powered member configured to generate a linear motion, the powered member comprising a first portion thereof affixed to a stationary member and having a movable second portion thereof affixed to the first frame. A feature of this embodiment is that the one or more material carrying members comprises rollers rotatable in the second direction. A feature of this embodiment is that the frame comprises material carrying assembly comprising a pair of mounting members, each comprising a first portion affixed rigidly to one end of the second frame and one or more second portions upstanding on the first portion and one or more material carrying members mounted, on each of the one or more second portions and extending in the first direction. A feature of this embodiment is that the one or more powered members is two or four powered members disposed under or above the frame and configured to move the frame in a vertical direction. A feature of this embodiment is that the device is configured for mounting in a floor pit.

In an embodiment, a conveyor is provided for incrementally advancing or indexing a plurality of rows of loads with a plurality of loads in each row. The conveyor comprises a conveyance means for incrementally advancing or indexing the plurality of rows of loads with the plurality of loads in each row along a conveyance path, and a single powered member coupled to the conveyance means and operable to move the conveyance means.

A feature of this embodiment is that the conveyance means comprises a pair of outer load supporting members extending between the inlet and outlet ends of the conveyor, each outer load supporting members comprising a first wall coupled to a respective side member and a second wall with a load supporting surface, the load supporting surface being disposed generally horizontally during operation of the conveyor; inner load supporting members extending between the inlet and outlet ends of the conveyor, the load inner supporting members positioned in a spaced apart relationship with each other between the pair of outer load supporting members, each inner load supporting member comprising a first wall and a second wall with a load supporting surface, the first wall of the each inner load supporting member being disposed generally vertically during operation of the conveyor and comprising an aperture, the load supporting surface of the each inner load supporting member being disposed generally horizontally during operation of the conveyor; braces coupled stationary, at each end thereof, to each side member of the frame, in series and in a spaced apart relationship with each other between the inlet and outlet ends of the conveyor, each brace disposed substantially transverse to the load supporting members and passing through aligned apertures in each load supporting member; clamps caging each brace and being disposed in pairs between first walls of a pair of adjacent members, each clamp comprising a pair of portions fastened to each other during operation of the conveyor; biasing members, each biasing member comprising a first portion stationary attached to a surface of the first wall of each member in an alignment with a respective clamp and comprising a second portion movable in a relationship to the first portion and having one end thereof positioned in an abutting relationship with the respective clamp so as to bias each brace with an upper edge of each aperture during use of the conveyor; U-shaped brackets, each U-shaped bracket comprising a pair of flanges, each of the pair of flanges being coupled rigidly to one of the pair of portions of each clamp, each U-shaped bracket further comprising a surface disposed substantially horizontally during use of the conveyor; and an indexing device. A feature of this embodiment is that the apparatus further comprises additional braces stationary disposed mediate the inlet and outlet ends in a direction transverse to a direction therebetween, each additional brace comprising first brace apertures in the first wall of each load supporting members, second brace apertures in the side members of the frame in an alignment with the first brace apertures, spacers disposed between surfaces of the first walls of adjacent load supporting members and having each end in an abutting relationship therewith, third brace apertures in the spacers oriented in the direction transverse to the direction between the inlet and outlet ends and in an alignment with the first and second brace apertures, and an elongated member passed through the aligned first, second and third brace apertures and having each end thereof secured to a respective side member of the frame.

A feature of this embodiment is that the indexing device comprises: receptacles disposed in series with each other between the inlet and outlet ends of the conveyor and in a space between a pair of adjacently disposed load supporting members, each receptacle coupled stationary to a respective U-shaped bracket, the each receptacle comprising a pair of vertically disposed walls; carrying members, each carrying member positioned for a reciprocal linear movement between the pair of vertical surfaces in each receptacle and between a pair of the adjacent members, the carrying member extending between the inlet and outlet ends of the conveyor; force exerting members disposed in series with each other between the inlet and outlet ends of the conveyor, each force exerting member comprising a front end and a rear end, the rear end being heavier than the front end; a pivotal connection between each force exerting member and a respective carrying member; each force exerting member pivotable between a load engaging position and a non-load engaging position on the carrying member and movable with the carrying member in the reciprocal linear movement; stops, each stop rigidly coupled to the carrying member and positioned to maintain the front end of a respective force exerting member in the load engaging position; the front end has at least a portion thereof extending outwardly, in the load engaging position, from load supporting surfaces of the spaced apart members and in a abutting relationship with a portion of the load during operation of the conveyor, the abutting relationship causing an incremental advancement of the load between the inlet and outlet ends during a linear movement of the carrying member in a first direction; the front end and the rear end being at least partially disposed, in the non-load engaging position, below the load supporting surfaces during the linear movement of the carrying member in an opposite second direction; and the reciprocal linear movement in the first direction of the force exerting members advances the load from the inlet end to the outlet end.

A feature of this embodiment is that the conveyor further comprises a device configured to move the load(s) in a reversed or retracted direction from the outlet end to the inlet end when the load(s) is disposed at the outlet end. The device comprises edge slots in the first wall of each of the pair of outer load supporting members and the inner load supporting members; a bearing block coupled to each first wall in an alignment with a respective edge slot; a shaft passed through each bearing block; a pawl secured on the shaft for a rotation thereof; and another powered member coupled with a link to the pawl and operable to pivot the shaft and the pawl in the direction from the outlet end to the inlet end to move the load, disposed at the outlet end in the reversed or retracted direction.

A feature of this embodiment is that the conveyor further comprises a frame and wherein the conveyance means comprises a portion thereof being mechanically fastened to the frame.

A feature of this embodiment is that the conveyor further comprises a sensor positioned and operable to sense a position of the load so as to reverse an operating direction of the powered member.

A feature of this embodiment is that the conveyor further comprises a sensor positioned to sense a presence or an absence of the load moving along the conveyance path.

A feature of this embodiment is that the powered member comprises a pneumatic or hydraulic cylinder.

A feature of this embodiment is that the conveyor further comprises at least one transmitter and at least one receiver aligned across a width of the conveyor with the at least one transmitter.

A feature of this embodiment is that the conveyor further comprises a control member.

In an embodiment, a conveyor is configured to advance a plurality of rows of loads with a plurality of loads in each row. The conveyor comprises a frame defining an inlet end and an outlet end of the conveyor, the frame comprising end members and a pair of side members, each side member coupled to a pair of end members in a direction between the inlet end and the outlet end; a pair of outer load supporting members extending between the inlet and outlet ends of the conveyor, each outer load supporting members comprising a first wall coupled to a respective side member and a second wall with a load supporting surface, the load supporting surface being disposed generally horizontally during operation of the conveyor; inner load supporting members extending between the inlet and outlet ends of the conveyor, the load inner supporting members positioned in a spaced apart relationship with each other between the pair of outer load supporting members, each inner load supporting member comprising, a first wall and a second wall with a load supporting surface, the first wall of the each inner load supporting member being disposed generally vertically during operation of the conveyor and comprising an aperture, the load supporting surface of the each inner load supporting member being disposed generally horizontally during operation of the conveyor; first braces coupled stationary, at each end thereof, to each side member of the frame, in series and in a spaced apart relationship with each other between the inlet and outlet ends of the conveyor, each first brace disposed substantially transverse to the load supporting members and passing through aligned apertures in each load supporting member; clamps caging each first brace and disposed in pairs between first walls of a pair of adjacent members, each clamp comprising a pair of portions fastened to each other during operation of the conveyor; biasing members, each biasing member comprising a first portion stationary attached to a surface of the first wall of each member in an alignment with a respective clamp and comprising a second portion movable in a relationship to the first portion and having one end thereof positioned in an abutting relationship with the respective clamp so as to bias each brace with an upper edge of each aperture during use of the conveyor; U-shaped brackets, each U-shaped bracket comprising a pair of flanges, each of the pair of flanges being coupled rigidly to one of the pair of portions of each clamp, each U-shaped bracket further comprising a surface disposed substantially horizontally during use of the conveyor; receptacles, disposed in series with each other between the inlet and outlet ends of the conveyor and in a space between a pair of adjacently disposed load supporting members, each receptacle comprising a pair of vertically disposed walls, each receptacle coupled stationary to a respective U-shaped bracket; liners, each liner comprising a low friction material and being coupled to an interior of each vertically disposed wall; carrying members, each carrying member positioned for a reciprocal linear movement between liners in each receptacle and between a pair of the adjacent members, the carrying member extending between the inlet and outlet ends of the conveyor; second braces stationary disposed mediate the inlet and outlet ends in a direction transverse to a direction therebetween, each second brace comprising first brace apertures in the first wall of each load supporting members, second brace apertures in the side members of the frame in an alignment with the first brace apertures, spacers disposed between surfaces of the first walls of adjacent load supporting members and having each end in an abutting relationship therewith, third brace apertures in the spacers oriented in the direction transverse to the direction between the inlet and outlet ends and in an alignment with the first and second brace apertures, and an elongated member passed through the aligned first, second and third brace apertures and having each end thereof secured to a respective side member of the frame; a powered member configured to provide the reciprocal linear movement, the powered member having one end thereof coupled to the frame; a linkage comprising a link disposed transverse to the reciprocal linear movement, the link having a pivotal connection with an opposite end of the powered member and a plurality of coupling members, a portion of the plurality of coupling members spaced apart from each other adjacent a respective carrying member, each coupling member comprising one end thereof coupled to a respective carrying member and comprising a second end coupled to the link; force exerting members disposed in series with each other between the inlet and outlet ends of the conveyor, each force exerting member comprising a front end and a rear end, the rear end being heavier than the front end; a pivotal connection between each force exerting member and a respective carrying member; each force exerting member pivotable between a load engaging position and a non-load engaging position on the carrying member and movable with the carrying member in the reciprocal linear movement; stops, each stop rigidly coupled to the carrying member and positioned to maintain the front end of a respective force exerting member in the load engaging position; the front end has at least a portion thereof extending outwardly, in the load engaging position, from load supporting surfaces of the spaced apart members and in a abutting relationship with a portion of the load during operation of the conveyor, the abutting relationship causing an incremental advancement of the load between the inlet and outlet ends during a linear movement of the carrying member in a first direction; the front end and the rear end being at least partially disposed, in the non-load engaging position, below the load supporting surfaces during the linear movement of the carrying member in an opposite second direction; and the reciprocal linear movement in the first direction of the force exerting members advances the load from the inlet end to the outlet end.

A feature of this embodiment is that the load supporting surface of each inner load supporting member or each outer load supporting member comprises a substantially smooth surface.

A feature of this embodiment is that the load supporting surface of each inner load supporting member or each outer load supporting member comprises rollers mounted for a rotation.

In an embodiment, an apparatus is provided for cooking or baking dough contained within container assemblies. The apparatus comprises a frame defining an inlet end and an outlet end of the apparatus; devices mounted on the frame for a movement in a vertical direction during use of the apparatus, each device configured to connect voltage to a respective container assembly; one or more powered members configured to move the devices in the vertical direction; and a conveyor at least partially disposed within the frame underneath the devices, the conveyor configured to incrementally index or advance each container assembly into a position under a pair of devices.

A feature of this embodiment is that the frame comprises a first frame mounted stationary and having a hollow interior; a second frame mounted for a movement in a generally horizontal plane and being sized and shaped to fit within the hollow interior of the first frame; a third frame mounted for a movement in a generally horizontal plane and in a generally vertical plane, the third frame being sized and shaped to fit within the hollow interior of the first frame, the devices being mounted on the third frame; slide or track assemblies mounted stationary on an interior of the first frame in a spaced apart relationship with each other, each slide or track assembly comprising a first track with a generally horizontal, during operation of the apparatus, working surface and a second track with a working surface that is disposed at an incline to the generally horizontal working surface; and roller assemblies, each roller assembly comprising a first roller affixed for a rotation on an exterior of the second frame, a second roller affixed for a rotation on an exterior of the third frame and a rigid link connecting the first and second rollers, and at least one rails coupled to the third frame, the devices being detachably coupled to the at least one rail.

A feature of this embodiment is that the one or more powered members is a single powered member configured to generate a linear motion, the powered member comprising a first portion thereof affixed to the first frame and having a movable second portion thereof affixed to the second frame; the linear motion in one direction causing a movement of the first roller on the generally horizontal working surface and subsequent movement of the second roller on the inclined working surface to move the third frame away from the second frame and move the devices in a direction to connect voltage to the respective container assembly; and the linear motion in an opposite direction causing a returned movement of the first roller on the generally horizontal working surface and a subsequent returned movement of the second roller on the inclined working surface to move the third frame toward the second frame and move the devices in a direction to disconnect connect voltage from the respective container assembly.

A feature of this embodiment is that the frame comprises a stationary mounted frame and at least one rails coupled to opposite peripheral members of the frame.

A feature of this embodiment is that one or more powered members is at least a pair of powered members, each powered member comprising a stationary portion affixed to the at least one rail and a movable portion affixed to a respective device, the each powered member configured to move the respective device in a vertical direction during use of the apparatus.

A feature of this embodiment is that the frame comprises a stationary mounted frame, wherein the one or more powered members comprises at least a pair of powered members, each of the pair of powered members comprises a stationary portion thereof affixed to a peripheral member of the frame and a movable portion thereof affixed to one device.

A feature of this embodiment is that each device comprises a body; a mounting portion extending from one end of the body; an electrode extending from a longitudinally opposite end of the body, the electrode comprising an L-shaped member having one leg thereof secured to the opposite end of the body and an electrically conductive member having one end thereof secured to another leg of the L-shaped member; a clamping member comprising a first bore sized and shaped to receive the mounting portion therethrough, a second bore oriented in a direction generally normal to a direction of the first bore, a first clamp configured to secure or clamp the mounting portion received within the first bore and a second clamp configured to secure or clamp another member received within the second bore; wires coupling the electrically conductive member to a voltage source; and a longitudinal bore in the body configured to pass the wires there through.

A feature of this embodiment is that the conveyor is a ratchet or indexing conveyor.

A feature of this embodiment is that the ratchet or indexing conveyor comprises braces that are affixed stationary, at each end thereof, to the frame in a spaced apart relationship with each other between the inlet end and the outlet end; stationary support brackets, each support bracket being permanently or detachably coupled to a respective brace; channels, each channel being coupled stationary to a respective support bracket and defining an interior space; one or more rails positioned for a reciprocal linear movement within the interior space and extending between the inlet end and the outlet end; a powered member configured to provide a reciprocal linear movement of the one or more rails; coupling members coupling each rail from the one or more rails, to the powered member; load carrying members; force exerting members disposed in series with each other between the inlet end and the outlet end, each force exerting members is in a pivotal connection with the one or more rails, the each force exerting member is pivotable between a load engaging position and a non-load engaging position on the one or more rails and is movable with the one or more rails in the reciprocal linear movement, enabled by the powered member, to move the container assemblies positioned and conveying on the load carrying members; and stops, each stop positioned and mounted to maintain each force exerting member in the load engaging position.

A feature of this embodiment is that the ratchet or indexing conveyor comprises a pair of side members, each side member coupled to the frame and extending in a direction between the inlet end and the outlet end; a pair of outer load supporting members extending in the direction between the inlet and outlet ends of the conveyor, each outer load supporting members comprising a first wall coupled to a respective side member and a second wall with a load supporting surface, the load supporting surface being disposed generally horizontally during operation of the conveyor; inner load supporting members extending in the direction between the inlet and outlet ends of the conveyor, the load inner supporting members positioned in a spaced apart relationship with each other between the pair of outer load supporting members, each inner load supporting member comprising, a first wall and a second wall with a load supporting surface, the first wall of the each inner load supporting member being disposed generally vertically during operation of the conveyor and comprising an aperture, the load supporting surface of the each inner load supporting member being disposed generally horizontally during operation of the conveyor; first braces coupled stationary, at each end thereof, to each side member of the frame, in series and in a spaced apart relationship with each other between the inlet and outlet ends of the conveyor, each first brace disposed substantially transverse to the load supporting members and passing through aligned apertures in each load supporting member; clamps caging each first brace and disposed in pairs between first walls of a pair of adjacent members, each clamp comprising a pair of portions fastened to each other during operation of the conveyor; biasing members, each biasing member comprising a first portion stationary attached to a surface of the first wall of each member in an alignment with a respective clamp and comprising a second portion movable in a relationship to the first portion and having one end thereof positioned in an abutting relationship with the respective clamp so as to bias each brace with an upper edge of each aperture during use of the conveyor; U-shaped brackets, each U-shaped bracket comprising a pair of flanges, each of the pair of flanges being coupled rigidly to one of the pair of portions of each clamp, each U-shaped bracket further comprising a surface disposed substantially horizontally during use of the conveyor; receptacles, disposed in series with each other between the inlet and outlet ends of the conveyor and in a space between a pair of adjacently disposed load supporting members, each receptacle comprising a pair of vertically disposed walls, each receptacle coupled stationary to a respective U-shaped bracket; liners, each liner comprising a low friction material and being coupled to an interior of each vertically disposed wall; carrying members, each carrying member positioned for a reciprocal linear movement between liners in each receptacle and between a pair of the adjacent members, the carrying member extending between the inlet and outlet ends of the conveyor; second braces stationary disposed mediate the inlet and outlet ends in a direction transverse to a direction therebetween, each second brace comprising first brace apertures in the first wall of each load supporting members, second brace apertures in the side members of the frame in an alignment with the first brace apertures, spacers disposed between surfaces of the first walls of adjacent load supporting members and having each end in an abutting relationship therewith, third brace apertures in the spacers oriented in the direction transverse to the direction between the inlet and outlet ends and in an alignment with the first and second brace apertures, and an elongated member passed through the aligned first, second and third brace apertures and having each end thereof secured to a respective side member of the frame; another powered member configured to provide the reciprocal linear movement, the another powered member having one end thereof coupled to the frame; a linkage comprising a link disposed transverse to the reciprocal linear movement, the link having a pivotal connection with an opposite end of the another powered member and a plurality of coupling members, a portion of the plurality of coupling members spaced apart from each other adjacent a respective carrying member, each coupling member comprising one end thereof coupled to a respective carrying member and comprising a second end coupled to the link; force exerting members disposed in series with each other between the inlet and outlet ends of the conveyor, each force exerting member comprising a front end and a rear end, the rear end being heavier than the front end; a pivotal connection between each force exerting member and a respective carrying member; each force exerting member pivotable between a load engaging position and a non-load engaging position on the carrying member and movable with the carrying member in the reciprocal linear movement; stops, each stop rigidly coupled to the carrying member and positioned to maintain the front end of a respective force exerting member in the load engaging position; the front end has at least a portion thereof extending outwardly, in the load engaging position, from load supporting surfaces of the spaced apart members and in a abutting relationship with a portion of the load during operation of the conveyor, the abutting relationship causing an incremental advancement of the load between the inlet and outlet ends during a linear movement of the carrying member in a first direction; the front end and the rear end being at least partially disposed, in the non-load engaging position, below the load supporting surfaces during the linear movement of the carrying member in an opposite second direction; and the reciprocal linear movement in the first direction of the force exerting members advances the load from the inlet end to the outlet end.

A feature of this embodiment is that the apparatus further comprises the container assemblies. Each container assembly comprises a container comprising a bottom member, two first members upstanding on the closed bottom at each end thereof and in a spaced apart relationship with each other, the first members defining closed ends of the container, second members defining partially open sides of the container, each second member is being rigidly connected at each end thereof to an edge of a respective first member, the second members are being disposed in a spaced apart relationship with each other, and an electrically non-conductive material; two pans, each pan comprising an electrically conductive material and being sized to cover the partially open side of the container; and two electrodes, each electrode disposed in a direct contact with a respective pan during use of each container assembly and defines a generally unobstructed surface.

A feature of this embodiment is that each electrode comprises flanges on the pan, arranged to define a generally tubular shape of each electrode.

A feature of this embodiment is that each electrode comprises an electrically conductive material.

It should be appreciated that reference throughout this specification to "an embodiment" means that a particular feature, structure or characteristic described in connection with the embodiment is included in at least one embodiment of the present invention. Therefore, it is emphasized and should be appreciated that two or more references to "an embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The chosen exemplary embodiments of the claimed subject matter have been described and illustrated, to plan and/or cross section illustrations that are schematic illustrations of idealized embodiments, for practical purposes so as to enable any person skilled in the art to which it pertains to make and use the same. As such, variations from the shapes of the illustrations as a result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. It will be understood that variations, modifications, equivalents and substitutions for components of the specifically described exemplary embodiments of the invention may be made by those skilled in the art without departing from the spirit and scope of the invention as set forth in the appended claims.

Furthermore, there is no intention to be bound by any expressed or implied theory presented in the preceding technical field, background, or the following detailed description. It is also to be understood that the specific devices and processes illustrated in the coupled drawings, and described in the following specification, are simply examples of the inventive concepts defined in the appended claims. Hence, any specific dimensions and other physical characteristics relating to the examples disclosed herein are not to be considered as limiting, unless the claims expressly state otherwise.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Anywhere the term "comprising" is used, embodiments and components "consisting essentially of" and "consisting of" are expressly disclosed and described herein."

Furthermore, the Abstract is not intended to be limiting as to the scope of the claimed invention and is for the purpose of quickly determining the nature of the claimed invention.

What is claimed is:

1. An apparatus that cooks or bakes dough contained within container assemblies, said apparatus comprising:

a frame defining an inlet end and an outlet end of said apparatus;

devices mounted on said frame for a reciprocal movement in a vertical direction during use of said apparatus, each device configured, when moving in an upward direction, to connect voltage to a respective container assembly so as to cook or bake the dough with electrical resistance; and one or more powered members configured to move said devices in said vertical direction.

2. The apparatus of claim 1, wherein said frame comprises:

a first frame mounted stationary and having a hollow interior;

a second frame mounted for a movement in a generally horizontal plane and being sized and shaped to fit within said hollow interior of said first frame;

a third frame mounted for a movement in a generally horizontal plane and for a movement in a generally vertical plane, said third frame being sized and shaped to fit within said hollow interior of said first frame, said devices being mounted on said third frame;

slide or track assemblies mounted stationary on an interior of said first frame in a spaced apart relationship with each other, each slide or track assembly comprising a first track with a generally horizontal, during operation of said apparatus, working surface and a second track with a working surface that is disposed at an incline to said generally horizontal working surface;

roller assemblies, each roller assembly comprising a first roller affixed for a rotation on an exterior of said second frame, a second roller affixed for a rotation on an exterior of said third frame and a rigid link connecting said first and second rollers; and at least one rail coupled to said third frame, said devices being coupled to said at least one rail.

3. The apparatus of claim 2, wherein:

said one or more powered members is a single powered member configured to generate said reciprocal movement, said powered member comprising a first portion thereof affixed to said first frame and having a second portion thereof moving in a linear motion and being affixed to said second frame;

said linear motion in one direction causes a movement of each first roller on a respective generally horizontal working surface and subsequent movement of each second roller on a respective inclined working surface to move said third frame away from said second frame and move said devices in said upward direction; and said linear motion in an opposite direction causes a returned movement of said each first roller on said respective generally horizontal working surface and a subsequent returned movement of said each second roller on said respective inclined working surface to move said third frame toward said second frame and move said devices in a direction to disconnect the voltage from said respective container assembly.

4. The apparatus of claim 1, wherein said frame comprises a stationary mounted frame with a hollow interior and at least one rail disposed within said hollow interior and being coupled to opposite peripheral members of said stationary mounted frame.

5. The apparatus of claim 4, wherein said one or more powered members is at least a pair of powered members, each powered member from said at least said pair of powered members comprising a stationary portion affixed to said at least one rail and a movable portion affixed to a respective device, said each powered member configured to move said respective device in said vertical direction.

6. The apparatus of claim 1, wherein said frame comprises a stationary mounted frame with a hollow interior, said one or more powered members comprises at least a pair of powered members, each powered member from said at least said pair of powered members comprises a stationary portion thereof affixed to a peripheral member of said frame and a movable portion thereof affixed to one device.

7. The apparatus of claim 1, wherein said each device comprises:

a body;

a mounting portion extending from one end of said body;

an electrode extending from a longitudinally opposite end of said body, said electrode comprising an L-shaped member having one leg thereof secured to said opposite end of said body and an electrically conductive member having one end thereof secured to another leg of said L-shaped member;

a clamping member comprising a first bore sized and shaped to receive said mounting portion therethrough, a second bore oriented in a direction generally normal to a direction of said first bore, a first clamp configured to secure or clamp said mounting portion received within said first bore and a second clamp configured to secure or clamp another member received within said second bore;

wires coupling said electrically conductive member to a voltage source; and a bore in said body configured to pass said wires therethrough.

8. The apparatus of claim 1, wherein said devices are mounted to accommodate the container assemblies being arranged in a plurality of rows with a plurality of container assemblies in each row.

9. The apparatus of claim 1, further comprising a conveyor disposed under said devices during use of said apparatus, said conveyor configured to selectively move each container assembly into a position under a respective device prior to the voltage being connected thereto and move the each container assembly from said position.

10. The apparatus of claim 9, wherein said conveyor comprises a ratchet or an indexing conveyor.

11. The apparatus of claim 10, wherein said ratchet or indexing conveyor comprises:

a conveyance means for incrementally advancing or indexing the container assemblies along a conveyance path; and another single powered member coupled to said conveyance means and operable to move a portion of said conveyance means so as to incrementally index or advance the each container assembly into a position under a respective pair of devices and move the each container assembly from said position.

12. The apparatus of claim 9, wherein said conveyor comprises any one or a belt, a chain and a roller conveyor.

13. The apparatus of claim 1, further comprising the container assemblies, each container assembly comprising:

a container comprising:

a bottom member defining a bottom of said container, two first members upstanding on said bottom member at each end thereof and in a spaced apart relationship with each other, said two first members defining closed ends of said container, second members defining partially open sides of said container, each second member is being rigidly connected at each end thereof to an edge of a respective first member, said second members are being disposed in a spaced apart relationship with each between said bottom and a top of said container, and an electrically non-conductive material;

two pans, each pan comprising an electrically conductive material and being sized to cover one partially open side of said container; and two electrodes, each electrode disposed in a direct contact with a respective pan during use of said each container assembly.

14. The apparatus of claim 13, wherein each electrode comprises flanges on said pan, arranged to define a generally tubular shape of said each electrode.

15. The apparatus of claim 13, wherein each electrode comprises an electrically conductive material.

16. The apparatus of claim 1, wherein said devices are disposed in pairs in a relationship to each respective container assembly, each pair of devices connects voltages of different polarity to electrically conductive members in the each respective container assembly.

17. An apparatus that cooks or bakes dough contained within container assemblies, the container assemblies being arranged in a plurality of rows with a plurality of container assemblies in each row, said apparatus comprising:

a first frame mounted stationary and comprising four peripheral members defining a hollow interior of said first frame, said first frame defining an inlet end and an outlet end of said apparatus;

a second frame mounted for a movement in a generally horizontal plane and being sized and shaped to fit within said hollow interior of said first frame, said second frame comprising four peripheral members defining a hollow interior of said second frame;

a third frame mounted for a movement in a generally horizontal plane and for a movement in a generally vertical plane, said third frame being sized and shaped to fit within said hollow interior of said first frame, said third frame comprising four peripheral members defining a hollow interior of said third frame;

rails disposed in a spaced apart relationship with each other within said hollow interior of said third frame between said inlet end and said outlet end of said apparatus;

U-shaped brackets affixed rigidly on interior surfaces of opposite peripheral members of said third frame, said U-shaped brackets aligned in pairs, with each pair of said U-shaped brackets configured to receive ends of a respective rail;

locking members, each locking member removably engages a respective U-shaped bracket to prevent an unintentional disengagement of a respective end of each rail from said respective U-shaped bracket;

devices mounted on said rails for a reciprocal movement in a vertical direction during use of said apparatus, each device comprising:

a body, a mounting portion extending from one end of said body, an electrode extending from a longitudinally opposite end of said body, said electrode comprising an L-shaped member having one leg thereof secured to said opposite end of said body and an electrically conductive member having one end thereof secured to another leg of said L-shaped member, a clamping member comprising a first bore sized and shaped to receive said mounting portion therethrough, a second bore oriented in a direction generally normal to a direction of said first bore, a first clamp configured to secure or clamp said mounting portion received within said first bore and a second clamp configured to secure or clamp a rail received within said second bore, wires coupling said electrically conductive member to a voltage source, and a bore in said body configured to pass said wires therethrough, said each device configured, when moving in an upward direction, to contact, with a respective electrode, a portion of a respective container assembly so as to connect voltage to the respective container assembly and cook or bake the dough with electrical resistance;

slide or track assemblies mounted stationary on interior surfaces of opposite peripheral members of said first frame in a spaced apart relationship with each other, each slide or track assembly comprising a first track with a generally horizontal, during operation of said apparatus, working surface and a second track with a working surface that is disposed at an incline to said generally horizontal working surface;

roller assemblies, each roller assembly comprising a first roller affixed for a rotation on exterior surface of opposite peripheral members of said second frame, a second roller affixed for a rotation on exterior surface of said opposite peripheral members of said third frame and a rigid link connecting said first and second rollers; and a single powered member configured to generate said reciprocal movement, said powered member comprising a first portion thereof affixed to said first frame and having a second portion thereof moving in a linear motion and being affixed to said second frame;

said linear motion in one direction causes a movement of each first roller on a respective generally horizontal working surface and a subsequent movement of each second roller on a respective inclined working surface to move said third frame away from said second frame and move said devices in said upward direction into a position to connect the voltage to the respective container assembly;

said linear motion in an opposite direction causes a returned movement of said each first roller on said respective generally horizontal working surface and a subsequent returned movement of said each second roller on said respective inclined working surface to move said third frame toward said second frame and move said devices in a downward direction into a position to disconnect the voltage from the respective container assembly;

said devices when moved into said position to disconnect the voltage from the respective container assembly allow unobstructed passage of the container assemblies through said apparatus.

18. An apparatus for cooking or baking dough contained within container assemblies arranged in a plurality of rows of container assemblies with a plurality of container assemblies in each row, said apparatus comprising:

a frame defining an inlet end and an outlet end of said apparatus;

devices mounted, in pairs, on said frame for a reciprocal movement in a vertical direction during use of said apparatus, each pair of devices connects voltages of different polarity to electrically conductive members in each container assembly so as to cook or bake the dough contained therewithin with electrical resistance;

a powered member configured to move said devices in said vertical direction; and a conveyor, comprising:

a conveyance means for incrementally advancing or indexing the plurality of rows of container assemblies with the plurality of container assemblies in each row along a conveyance path, and another single powered member coupled to said conveyance means and operable to move a portion of said conveyance means so as to move each container assembly into a position under a respective pair of devices.

19. An apparatus that cooks or bakes dough contained within container assemblies, said apparatus comprising:

a frame defining an inlet end and an outlet end of said apparatus;

electrodes coupled to said frame for a reciprocal movement in a vertical direction during use of said apparatus, each electrode configured, when moving in an upward direction, to connect voltage to a respective container assembly so as to cook or bake the dough with electrical resistance; and one or more powered members configured to move said electrodes in said vertical direction.

20. The apparatus of claim 19, further comprising at least one rail coupled to said frame, said electrodes being coupled to said at least one rail.

* * * * *